(12) United States Patent
Jang et al.

(10) Patent No.: US 9,380,280 B2
(45) Date of Patent: Jun. 28, 2016

(54) RECORDING MEDIUM, REPRODUCING DEVICE FOR PROVIDING SERVICE BASED ON DATA OF RECORDING MEDIUM, AND METHOD THEREOF

(71) Applicants: SAMSUNG ELECTRONICS CO., LTD., Gyeonggi-do (KR); GANGNUNG-WONJU NATIONAL UNIVERSITY INDUSTRY ACADEMY COOPERATION GROUP, Gangwon (KR)

(72) Inventors: Yong-seok Jang, Hwaseong-si (KR); Sung-wook Park, Gangneung-si (KR); Hong-seok Park, Ansan-si (KR); Tae-yun Chung, Gangneung-si (KR); Jae-hyun Kim, Seoul (KR); Bong-gil Bak, Suwon-si (KR); Jae-jun Lee, Suwon-si (KR)

(73) Assignees: SAMSUNG ELECTRONICS CO., LTD., Suwon-si (KR); GANGNUNG-WONJU NATIONAL UNIVERSITY INDUSTRY ACADEMY COOPERATION GROUP, Gangneung-si (KR)

( * ) Notice: Subject to any disclaimer, the term of this patent is extended or adjusted under 35 U.S.C. 154(b) by 0 days.

(21) Appl. No.: 14/069,455

(22) Filed: Nov. 1, 2013

(65) Prior Publication Data

US 2014/0119712 A1    May 1, 2014

Related U.S. Application Data

(60) Provisional application No. 61/721,148, filed on Nov. 1, 2012.

(30) Foreign Application Priority Data

Jun. 3, 2013    (KR) .......................... 10-2013-0063630

(51) Int. Cl.
*H04N 9/80* (2006.01)
*G11B 27/00* (2006.01)
(Continued)

(52) U.S. Cl.
CPC ................ *H04N 9/80* (2013.01); *G11B 27/005* (2013.01); *G11B 27/105* (2013.01); *G11B 27/322* (2013.01); *G11B 2220/2541* (2013.01)

(58) Field of Classification Search
None
See application file for complete search history.

(56) References Cited

U.S. PATENT DOCUMENTS

2005/0135783 A1    6/2005   Crinon
2007/0098068 A1*  5/2007   Kimata et al. ........... 375/240.12

(Continued)

FOREIGN PATENT DOCUMENTS

EP    1763240 A1    3/2007
EP    1819158 A1    8/2007

(Continued)

OTHER PUBLICATIONS

Communication dated Jul. 3, 2014 issued by the European Patent Office in counterpart European Application No. 13191302.2.

(Continued)

*Primary Examiner* — Eileen Adams
(74) *Attorney, Agent, or Firm* — Sughrue Mion, PLLC

(57) ABSTRACT

A reproducing device is provided. The reproducing device includes: a driver configured to load a recording medium in response to the recording medium being attached, wherein the recording medium records video data and additional information encoded according to a High Efficiency Video Coding (HEVC) method; a data processor configured to process the video data; a controller configured to provide a service corresponding to the additional information. The service includes at least one of a trick play service, an interested region enlargement service, and an object adjusting service.

17 Claims, 46 Drawing Sheets

(51) Int. Cl.
*G11B 27/10* (2006.01)
*G11B 27/32* (2006.01)

(56) References Cited

U.S. PATENT DOCUMENTS

| | | | |
|---|---|---|---|
| 2008/0131091 A1* | 6/2008 | Mae | G11B 27/034 |
| | | | 386/241 |
| 2010/0246954 A1 | 9/2010 | Kim et al. | |
| 2010/0318467 A1* | 12/2010 | Porter et al. | 705/51 |
| 2011/0129198 A1 | 6/2011 | Toma et al. | |
| 2012/0200668 A1 | 8/2012 | Maruyama et al. | |
| 2013/0169762 A1* | 7/2013 | Kanemaru | H04N 13/0452 |
| | | | 348/51 |
| 2013/0251333 A1* | 9/2013 | Berbecel | H04N 5/783 |
| | | | 386/230 |
| 2014/0003534 A1* | 1/2014 | Hague | H04N 19/597 |
| | | | 375/240.25 |

FOREIGN PATENT DOCUMENTS

| | | |
|---|---|---|
| EP | 2665259 A1 | 11/2013 |
| JP | 2007-158778 A | 6/2007 |
| KR | 10-2011-0072846 A | 6/2011 |
| WO | 98/46016 A1 | 10/1998 |
| WO | 2004/036575 A1 | 4/2004 |

OTHER PUBLICATIONS

International Search Report dated Feb. 28, 2014 issued in International Application No. PCT/KR2013/009801 (PCT/ISA/210).
Written Opinion dated Feb. 28, 2014 issued in International Application No. PCT/KR2013/009801 (PCT/ISA/237).
Communication dated Mar. 26, 2014 issued by the European Patent Office in counterpart European Patent Application No. 13191302.2.

* cited by examiner

FIG. 4

TRICLY PLAY-RELATED INFORMATION THAT MAY BE OBTAINED
FROM FRAME RATE INFORMATION AND GOP STRUCTURE INFORMATION

| PROVIDED INFORMATION (1) | | | TRICK PLAY-RELATED INFORMATION ANALYZED BY PLAYER | |
|---|---|---|---|---|
| # of consecutive Bs (mandatory) | existence of Br (optional) | position of Br among consecutive Bs (optional) | SPEED PLAY METHOD | WHETHER REORDERING IS TO BE PERFORMED DURING LOWEST SPEED REPRODUCTION |
| 3 | Y | 1/2/3 | 2x, 4x, 8x ... | Y (SINCE Br FRAME IS REPRODUCED) IF POSITION OF Br=2, REALIZE 2X, IF NOT, REALIZE PSEUDO 2X |
| 3 | N | 0 | pseudo2x, 4x, 8x ... | Y (SINCE Br FRAME IS REPRODUCED) |
| 2 | Y | 1/2 | 3x, 6x, 12x ... | N (SINCE B FRAME IS NOT REPRODUCED) |
| 2 | N | 0 | 3x, 6x, 12x ... | N (SINCE B FRAME IS NOT REPRODUCED) |
| 1 | N | 0 | 2x, 4x, 8x ... | N (SINCE B FRAME IS NOT REPRODUCED) |
| 1 | N | 0 | 2x, 4x, 8x ... | N (SINCE B FRAME IS NOT REPRODUCED) |

FIG. 41

| | No. of bits | Mnemonic |
|---|---|---|
| STN_table_UHD() { | | |
| // defines information for UHD video on HD display | | |
| 4110 — Video_output_mode | 1 | bslbf |
| Reserved_for_future_use | 7 | bslbf |
| For(pi_id=0; pi_id<number_of_PlayItems; pi_id++) { | | |
| STN_table_UHD_for_PlayItem(pi_id) { | | |
| Length[pi_id] | 16 | uimsbf |
| For(primary_video_stream_id=0; primary_video_stream_id< number_of_primary_video_stream_entries[pi_id]; primary_video_stream_id ++ ) { | | |
| 4120 — Is_there_interesting_region | 1 | bslbf |
| Reserved_for_future_use | 7 | bslbf |
| 4130 — Num_of_tiles_of_IR | 8 | bslbf |
| If (is_there_interesting_region == 1 && Num_of_tiles_of_IR != 0) { | | |
| For (t_id=0; t_id<num_of_tiles_of_IR; t_id ++) { | | |
| 4140 — Tile_num_of_IR[t_id] | 8 | bslbf |
| } | | |
| } | | |
| } // end of for | | |
| | | |
| //defines information for UHD non-video content on HD display | | |
| For (PG_textST_stream_id=0; PG_textST_stream_id< number_of_PG_textST_stream_entries[pi_id]; PG_textST_steam_id ++) { | | |
| 4150 — Is_subtitle_for_HD_viewing_env | 1 | |
| Reserved_for_future_use | 7 | |
| If (is_IG_for_HD_viewing_env == 1) { | | |
| Stream_entry_for_HD_viewing_env_IG() { | | |
| Stream_entry() | | |
| } | | |
| } | | |
| } // end of for PG_textST_stream_id | | |
| For (IG_stream_id=0; IG_stream_id<number_of_IG_stream_entries[pi_id]; IG_steam_id ++) { | | |
| 4160 — Is_IG_for_HD_viewing_env | 1 | |
| Reserved_for_future_use | 7 | |
| If (is_IG_for_HD_viewing_env == 1) { | | |
| Stream_entry_for_HD_viewing_env_IG() { | | |
| Stream_entry() | | |
| } | | |
| } | | |
| } // end of for IG_stream_id | | |
| } // end of STN_table_UHD | | |
| } // end of pi_id | | |
| | | |
| } | | |

FIG. 42

| Syntax | No. of bits | Mnemonic |
|---|---|---|
| CPI_UHD() { | | |
|   length | 32 | uimsbf |
|   If (length != 0 ) { | | |
|     Reserved_for_word_aligh | 12 | bslbf |
|     CPI_type | 4 | bslbf |
|     Number_of_frames_in_GOP | 8 | uimsbf |
|     Is_Br_present | 1 | bslbf |
|     Number_of_B_frames | 2 | bslbf |
|     Reserved_for_future_use | 5 | bslbf |
|     EP_map_UHD() | | |
|   } | | |
|   For(j=0; j<N1; j++) { | | |
|     Padding_word | 16 | bslbf |
|   } | | |
| } | | |

FIG. 43

| Syntax | No. of bits | Mnemonic |
|---|---|---|
| EP_map_UHD() { | | |
|     reserved_for_word_align | 8 | bslbf |
|     number_of_stream_PID_entries | 8 | bslbf |
|     for (k=0; k<number_of_stream_PID_entries; k++) { | | |
|         stream_PID[k] | 16 | bslbf |
|         reserved_for_word_align | 10 | bslbf |
|         EP_stream_type[k] | 4 | bslbf |
|         number_of_EP_coarse_entries[k] | 16 | uimsbf |
|         number_of_EP_fine_entries[k] | 18 | uimsbf |
|         EP_map_for_one_stream_PID_start_address[k] | 32 | uimsbf |
|     } | | |
|     for (i=0; i<X; i++) { | | |
|         padding_word | 16 | bslbf |
|     } | | |
|     for (k=0; k<number_of_stream_PID_entries; k++) { | | |
|         EP_map_for_one_stream_PID(EP_stream_type[k],<br>                      number_of_EP_coarse_entries[k],<br>                      number_of_EP_fine_entries[k]) | | |
|         Trick_paly_info | 1 | bslbf |
|         Reserved_for_future | 7 | bslbf |
|         If (EP_stream_type[k]=1 &&<br>            stream_PID[k] = HEVC &&<br>            trick_play_info = 1<br>        ) {<br>        // video type1 && HEVC stream | | |
|         EP_map_for_UHD_trickplay(number_of_EP_fine_entries[k]) | | |
|     } | | |
|     for (i=0; i<Y[k]; i++) { | | |
|         padding_word | 16 | bslbf |
|     } | | |
|     } | | |
| } | | |

FIG. 44

| Syntax | No. of bits | Mnemonic |
|---|---|---|
| EP_map_for_UHD_trickplay(Nf) { | | |
|   // EP_stream_type is video | | |
|   length | 32 | uimsbf |
|   If (length != 0 ) { | | |
|     For (EP_fine_id=0;<br>        EP_fine_id<Nf;<br>        EP_fine_id ++) { | | |
|       Position_of_Br | 4 | bslbf |
|       For (i=0; i<N_of_key_frames_in_GOP; i++) { | | |
|         Temporal_ids[i] | 4 | bslbf |
|         Immediately_following_key_frame_offset | 22 | bslbf |
|         key_frame_size | 22 | bslbf |
|       } | | |
|     } | | |
|   } | | |
| } | | |

FIG. 45

| B31 | | | | | | | B24 |
|---|---|---|---|---|---|---|---|
| reserved | | | | | | | |
| B23 | | | | | | | B16 |
| reserved | | | | | | | |
| B15 | | | | | | | B8 |
| reserved | | | | | | | |
| B7 | B6 | B5 | B4 | B3 | B2 | B1 | B0 |
| reserved | | | | | | HD-portion preference | Output mode |

Horizontal display size connected display's horizontal size

RECORDING MEDIUM, REPRODUCING DEVICE FOR PROVIDING SERVICE BASED ON DATA OF RECORDING MEDIUM, AND METHOD THEREOF

CROSS-REFERENCE TO RELATED APPLICATION(S)

This application claims priority from U.S. Provisional Patent Application No. 61/721,148, filed on Nov. 1, 2012, in the United States patent and Trademark Office, and Korean Patent Application No. 10-2013-0063630, filed on Jun. 3, 2013, in the Korean Intellectual Property Office, the entire disclosure of which is hereby incorporated by reference.

BACKGROUND

1. Field

Exemplary embodiments relate to providing a recording medium, a reproducing device, and a method of providing a service thereof. In particular, exemplary embodiments relate to providing a recording medium that records data, a reproducing device for providing various types of services based on the data, and a method thereof.

2. Description of the Related Art

With the development of electronic technology, various types of products have been developed and sold to consumers.

According to user needs for various types of contents, size requirements of contents processed in electronic devices have greatly increased. Further, a mass of contents, such as various types of 3-dimension (3D) contents or Ultrahigh Definition (UHD) contents, have been used.

These various types of contents may be recorded and provided on various types of recording media. If a recording medium is loaded, a reproducing device may reproduce and output data recorded on the recording medium. Examples of the recording medium may include a Blue-ray disc (BD), a digital versatile disc (DVD), a compact disc (CD), etc.

A user may enjoy the data recorded on the recording medium by using the reproducing device. The user may want an additional function for conveniently using the data. For example, the user may want to rapidly and easily search for a desired portion, and enlarge and see a portion of a screen or subtitles. Accordingly, there is a need for a technique to provide various types of services in a reproducing device.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a recording medium, a reproducing device for providing various types of services by using data recorded on the recording medium, and a method thereof.

According to an aspect of the exemplary embodiments, there is provided a reproducing device including: a driver configured to load a recording medium in response to the recording medium being attached, wherein the recording medium records video data and additional information encoded according to a High Efficiency Video Coding (HEVC) method; a data processor configured to process the video data; a controller configured to provide a service corresponding to the additional information. The service may include at least one of a trick play service, an interested region enlargement service, and an object adjusting service.

The recording medium may be a blue-ray disc (BD) which is divided into four layers including an index table, an object/BD-J object, a playlist, and a clip file. The additional information may be recorded in at least one of a STN-table_UHD table comprised in the playlist, CPI_UHD( ) recorded in the clip file, and EP_map_for_UHD_trickplay recorded in the clip file.

The controller may be configured to selectively perform the at least one of the trick play service, the interested region enlargement service, and the object adjusting service according to a user selection.

According to another aspect of the exemplary embodiments, there is provided a method of providing a service. The method may include: loading a recording medium in response to the recording medium being attached, wherein the recording medium records video data and additional information encoded according to an High Efficiency Video Coding (HEVC) method; providing a service corresponding to the additional information. The service may include at least one of a trick play service, an interested region enlargement service, and an object adjusting service.

The recording medium may be a blue-ray disc (BD) which is divided into four layers including an index table, an object/BD-J object, a playlist, and a clip file. The additional information may be recorded in at least one of a STN-table_UHD table comprised in the playlist, CPI_UHD( ) recorded in the clip file, and EP_map_for_UHD_trickplay recorded in the clip file.

The method may further include: detecting additional information corresponding to a selected service from the recording medium in response to the at least one of the trick play service, the interested region enlargement service, and the object adjusting service being selected according to a user selection.

According to yet another aspect of the exemplary embodiments, there is provided a trick play method of a reproducing device. The trick play method may include: loading a recording medium which stores video data and additional information of a plurality of frames; determining whether a trick play command has been input; detecting the additional information of the plurality of frames in response to determining that the trick play command has been input; selecting at least one layer of the plurality of frames based on the additional information of the plurality of frames; decoding data of the at least one layer and outputting at least a portion of the decoded data; and performing a trick play in response to the at least a portion of the decoded data being output.

BRIEF DESCRIPTION OF THE DRAWINGS

The above and/or other aspects will be more apparent by describing certain exemplary embodiments with reference to the accompanying drawings, in which:

FIGS. 2 through 7 are views illustrating a reproducing device for performing a trick play service, according to various exemplary embodiments;

FIGS. 41 through 46 are views illustrating a method of recording additional information according to various exemplary embodiments.

DETAILED DESCRIPTION OF THE EXEMPLARY EMBODIMENTS

Figure 1:
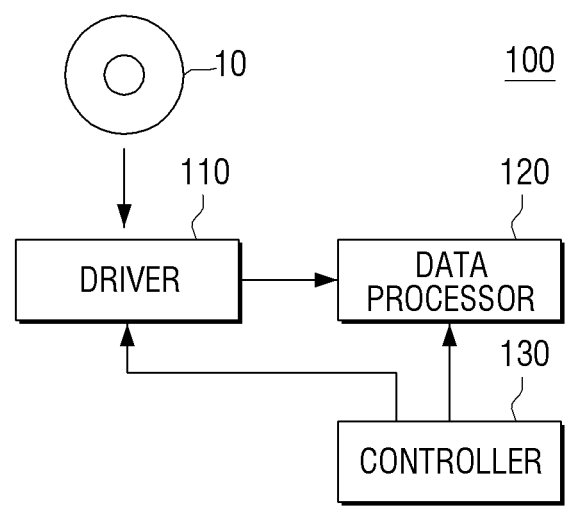
FIG. 1 is a block diagram illustrating a structure of a reproducing device according to an exemplary embodiment.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a block diagram illustrating a structure of a reproducing device 100 according to an exemplary embodiment. The reproducing device 100 refers to an apparatus that detects and reproduces data recorded on a recording medium 10.

The recording medium 10 may be various types of media such as a Blue-ray disc (BD), a holographic disc, a digital versatile disc (DVD), a compact disc (CD), a universal serial bus (USB) memory stick, an external hard disc, etc. The reproducing device 100 may be realized as one independent device as shown in FIG. 1, but is not limited thereto. For example, the reproducing device 100 may be realized as a type that is loaded into a display device such as a TV, etc. In exemplary embodiments, a device that reproduces data from a BD and provides the reproduced data to a display device will be described as an example.

Referring to FIG. 1, the reproducing device 100 includes a driver 110, a data processor 120, and a controller 130.

The driver 110 is an element that, if the recording medium 10 is attached, drives the recording medium 10 to detect data. If the reproducing device 100 is realized as a device that performs reproduction with respect to an optical disc such as the BD, the driver 110 may include a tray, a motor, a connector, a power connector, an optical pickup unit, an object lens, a Digital Signal Processor (DSP), a Front End Processor (FEP), etc. The tray loads the optical disc thereon, the motor rotates the optical disc, and the connector is connected to a main board to transmit or receive various types of data. The power connector is supplied with power from a power supply unit, and the optical pickup unit records a signal on the optical disc or reads a reflected signal. The DSP controls an overall operation of the driver 110 and operates the driver 110, and the FEP controls a laser emission operation of the optical pickup unit and interprets a received signal.

Video data and various types of additional information may be recorded on the recording medium 10 attached in the driver 110. If the recording medium 10 is attached in the driver 110, the driver 110 may detect the video data and the additional information. Detected data may be provided to the data processor 120 or the controller 130.

The video data may be encoded by using a High Efficiency Video Coding (HEVC) encoding method and then recorded on the recording medium 10. HEVC refers to a next generation video coding standard that has been discussed by Joint Collaborative Team on Video Coding (JCT-VT) that is organized by ISO/IEC Moving Picture Experts Group (MPEG) and ITU-T Video Coding Experts Group (VCEG). HEVC may code an image having a size of 8K*4K (7680×4320) at a compression performance about 2 times higher than existing MPEG4-AVC.

An intra frame (I frame), a previous or predicted frame (P frame), and a Bidirectional frame (B frame) are included in a video stream that is coded by using the HEVC coding method. The I frame is a key frame that is directly compressed and transmitted from a source. The I frame may be independently decoded without referring to another frame. The P frame is a frame that is constituted based on information of a previous key frame. The B frame is a frame that is constituted based on information of the I and P frames positioned before and after B frame.

The data processor 120 processes the video data that is read by the driver 110. The data processor 120 may include a multiplexer, a video decoder, a scaler, an audio decoder, a filter, a signal amplifier, a data decoder, a renderer, a mixer, etc. The multiplexer detects video data, audio data, additional data, etc. of contents recorded on the recording medium 10, and the video decoder decodes the video data. The audio decoder decodes the audio data, the filter filters noise, and the signal amplifier amplifies an audio signal. The data decoder processes the additional data, and the renderer generates an object according to the decoded additional data. The data processor 120 may decode the video data read from the driver 110 by using a codec corresponding to an encoding method of data recorded on the recording medium 10. An illustration and a description of a process of processing audio data are omitted herein.

The controller 130 provides various types of services using the data read from the driver 110. The services may include at least one of a trick play service, an interested region enlarging service, and an object adjusting service.

The trick play service refers to a service that is to reproduce video data at various speeds (2×, 3×, 4×, . . . ) in a forward direction or a backward direction. The interested region enlarging service refers to a service that is to partially enlarge only a region of a frame and discriminately display the enlarged region. The object adjusting service refers to a service that is to enlarge objects, such as subtitles, a menu, etc., displayed on a screen, and discriminately display the enlarged objects.

The controller 130 may appropriately use the video data and the additional information recorded on the recording medium 10 to provide these services. In other words, various types of additional information are to be recorded on the recording medium 10 to support services described above.

In this case, data is to be recorded in a format matching with a standard applied to the recording medium 10. If the video stream stored in the recording medium 10 is an HDMV HEVC video stream, the following constraints may be applied:

A first size per one slice is one largest coding tree block row. The slice may be formed of one largest coding tree block row. The largest coding tree block row may refer to a whole largest coding tree block row in a horizontal row of a largest coding tree block.

A horizontal boundary of a tile may be aligned by a horizontal boundary of the slice.

The HDMV HEVC video stream may have a multiple temporal sub layer. If trick_play_info of extended data of clip information is set to 1, vps_max_sub_layers_minus 1 may be 1 or 2, but may be 0 if not so.

sps_max_sub_layers_minus 1 may be 1 or 2, but may be 0 if not so.

vps_temporal_id_nesting_flag may be set to 1.

A temporal ID of the I frame may be equal to 0. A temporal ID of the P frame may be equal to 0 or 1. A temporal ID of the B frame may be greater than the temporal ID of the P frame of a Group of Pictures (GOP). Temporal IDs of the B frame of the GOP may be the same. A temporal ID of a reference B frame may be greater than the temporal ID of the P frame and smaller than the temporal ID of the B frame of the GOP. Also, temporal IDs of a reference B frame of the GOP may be the same. If there exist three consecutive B frames, one of the three consecutive B frames may be a reference B frame.

If "is_there_interesting_region" of the extended data of the clip information is set to 1, "tiles_enabled_flag" of a PPS may be set to 1, and may be set to 0 if not so.

"entropy_slice_enabled_flag" of the PPS may be set to 1.

"dependent_slice_enable_flag" of a slice header may be set to 1.

"loop_filter_across_tiles_enabled_flag" of the PPS may be set to 0.

If a boundary of a slice is shared with a boundary of a tile, "loop_filter_across_slices_enabled_flag" of the PPS may be set to 0.

Permitted values of parameters of a VPS may be as follows:

If a value of "vps_max_sub_layers_minus1" is greater than 0, a value of "vps_temporal_id_nesting_flag" may be equal to 1. In other words, a temporal sub layer exists and may be used for a trick play. If not used for the trick play, a value of "vps_temporal_id_nesting_flag" may be equal to 0.

A value of "vps_max_sub_layers_minus1" may be 0, 1, or 2.

A value of "vps_num_hrd_parameters" may be set to 0.

Permitted values of parameters of "profile_and_level( )" referred by the VPS and an SPS may be as follows:

A value of "general_profile_space" may be set to 0.

A value of "general_profile_idc" may be set to 1.

A value of "general_profile_compatible_flag[i]" may be set to 1.

A value of "general_level_idc" may be one of 90, 93, 120, 123, and 150.

A value of "sub_layer_profile_present_flag[i]" may be set to 0.

A value of "sub_layer_level_present_flag[i]" may be set to 0.

Attributes "sub_layer_profile_space[i]", "sub_layer_tier_flag", "sub_layer_profile_idc[i]", "sub_layer_profile_compatibility_flag[i][j]", and "sublayer_level_idc[i]" may be regarded as respectively having the same values as "general_profile_space", "general_layer_tier_flag", "general_layer_profile_idc", "general_layer_profile_compatibility_flag[i]", and "general_layer_level_idc".

Permitted values of parameters of the SPS are as follows:

A value of "sps_max_sub_layers_minus1" may be one of 0, 1, and 2 and may be equal to a value of "vps_max_sublayers_minus1".

If a value of "vps_temporal_id_nesting_flag" is equal to 1, a value of "sps_temporal_id_nesting_flag" may be 1.

A value of "vui_parameters_present_flag" may be set to 1.

Permitted values of parameters of the PPS are as follows:

A value of "entropy_slice_enabled_flag" may not be changed.

If "tiles_enabled_flag" is set to 1, a value of "entropy_slice_enabled_flag" may be ser to 1 in order to comfortably view a UHD content on a HD display. Also, "dependent_slice_enabled_flag" in the slice header may be set to 1.

If "tiles_enabled_flag" is set to 1, values of "loop_filter_across_tiles_enabled_flag" and "loop_filter_across_slices_enabled_flag" may be set to 0.

As described above, the controller 130 may detect video data and additional information from the recording medium 10 that records data satisfying the above-described various constraints, to provide various services. Exemplary embodiments for providing these services will now be described.

As described above, various types of recording media are currently used. A reproducing device that performs reproduction with respect to such a recording medium may reproduce a normal video and provide a trick play function of playing a video at a fast speed in a forward or backward direction for user convenience.

Therefore, in the present exemplary embodiment, an accurate and detailed trick play service may be provided using layers and additional information of a frame of video data.

In other words, as described above, video data recorded on the recording medium 10 may be coded by using an HEVC coding method. Thus, the video data recorded may include I, P, B, etc. frames.

The I, P, and B may be divided into a plurality of layers. The division of the layers may be determined according to a decoding order. In other words, frames that may be independently decoded or may be decoded with reference to other minimum frames may be set to lower layers, and the other frames may be set to upper layers. The division of the layers will be described in detail later.

The additional information that may be used for a trick play may be recorded together on the recording medium 10. The additional information may include GOP structure information, HEVC information, offset information, etc. The GOP structure refers to information about whether a Br picture exists in a GOP, the number of B pictures existing between the I and P frames, a position of a Br picture among consecutive Bs pictures, etc. One picture may refer to one frame or one field of a pair of complementary fields, and one frame may be the one frame, a pair of complementary reference fields, or a pair of complementary non-reference fields. The I frame is formed of only I slices, the B frame and the Br frame are formed of only B slices, and the P frame is formed of only P slices.

Also, the Br frame refers to a reference frame that may be referred to by another B frame of B frames that are decoded with reference to another frame. For convenience, a non-reference B frame except the Br frame is referred to as a B frame.

The HEVC information may include temporal IDs, etc., of the I, P, and B pictures. The temporal IDs may be set differently according to layers. If a temporal ID of a lowermost layer is 0, temporal IDs of upper layers may be set in order of 1, 2, . . . , and n.

The offset information may include information about offset of an immediately following I, P, or B frame according to a decoding order, coding size information of I, P, and B frames to be read, etc.

The user may input a trick play command using a button (not shown) provided on the body of the reproducing device 100 or an additional remote controller. The trick play command is a command to determine at what time speeds reproduction is to be performed with respect to a recording medium. A trick play speed may be determined by the trick play command. In detail, if a button matching with the trick play command input by the user is selected one time, the controller 130 may determine that a 2× trick play command has been input. However, if the button is selected two times, the controller 130 may determine that a 3× trick play command has been input. If the button is selected three times, the controller 130 may determine that a 4× trick play command has been input. In other words, the controller 130 may differently determine a speed according to the number of times selecting the button. Alternatively, the controller 130 may differently determine the speed according to times when the button matching with the trick play command is selected. In other words, as the button is pressed for a long time, the controller 130 may set the speed to be faster. Different buttons may match with the trick play command according to speeds, and a UI screen for selecting speeds may be displayed to allow the user to determine a speed on the UI screen.

If the trick play command is input, the controller 130 may perform a trick play corresponding to a trick play speed determined by the trick play command. Further, the controller 130 selects a layer that is to be decoded, within a video stream by using additional information. The controller 130 controls the data processor 120 to decode video data of the selected layer. If the video data is decoded, the controller 130 performs a trick play corresponding to a trick play speed selected by the user, by using all or a portion of the decoded data. If the reproducing device 100 is realized as a Blue-ray (BD) disc reproducing device or a DVD reproducing device, the controller 130 selectively outputs a frame corresponding to the all or the portion of the decoded data to an external display device. The external display device receives and displays the output frame. Therefore, the trick play may be achieved.

The reproducing device 100 described above may be realized as a display device including a display unit (not shown). In this case, the controller 130 may directly output the selected frame through the display unit to perform the trick play.

A layer structure of video data may be variously realized. For example, the video data may be divided into a first layer including I and P frames, a second layer including a reference Br frame, and a third layer including other B frames except a Br frame.

The controller 130 checks a form of a GOP using GOP structure information included in the additional information. In other words, the controller 130 checks whether a Br frame exists, a position of the Br, the number of B frames existing between I and P frames, etc. Also, the controller 130 selects a layer that may realize a trick play performed at a determined speed. For example, if I and P frames are arranged at every four frame intervals, and the user selects a 4× trick play, the controller 130 may select only a first layer. Therefore, if the I and P frames are decoded and output, a 4× trick play may be accurately performed. If the user performs a 2× trick play, the controller 130 may select first and second layers together. Therefore, if the I, P, and Br frames are all decoded and output, a 2× trick play may be performed.

The controller 130 variously combines a layer that is to be decoded, according to a trick play speed selected by the user and selectively output only a portion of a frame of the decoded layer to perform a trick play at a determined speed. The controller 130 may selectively read, decode, and output only frames necessary for a trick play (fast forward or fast reverse) using the above-described additional information. In particular, if reproduction is performed at 4× or more, frames that are read and decoded but are not output may exist. The controller 130 may omit reading and decoding with reference to a temporal ID according to a structure of a video stream. Therefore, a precise trick play may be performed by using P, B, and Br that may not be used as random access points. The controller 130 may also check length information of the I, P, and B frames according to the offset information of the additional information. Therefore, the controller 130 may check start positions of the I and P frames using the offset information and read data necessary for a trick play without parsing using lengths of the I and P frames in order to perform the trick play.

Figure 2:
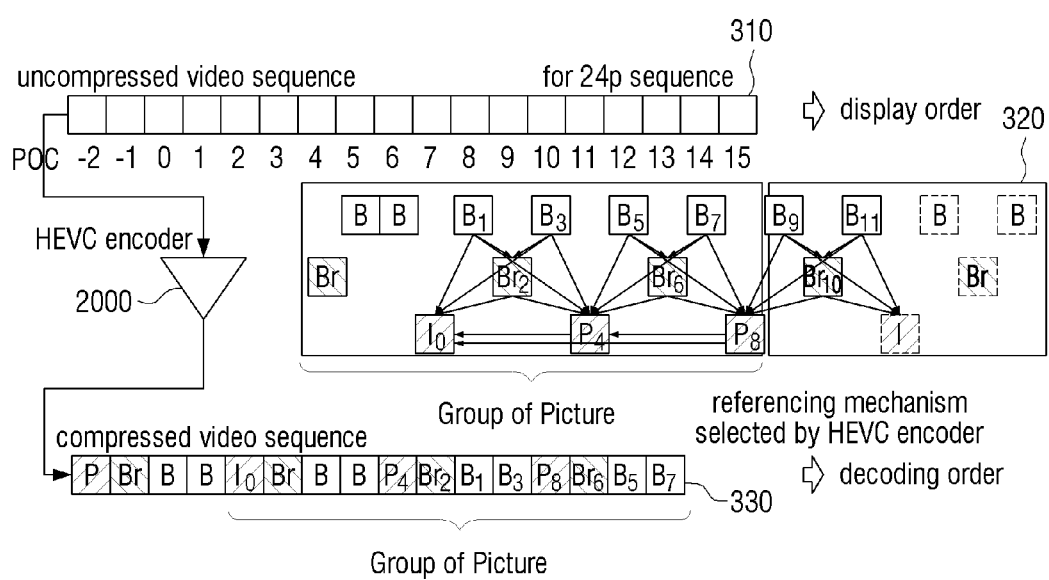

FIG. 2 is a view illustrating a process of generating a video stream including frames, each of which is divided into three layers, according to an exemplary embodiment. In detail, FIG. 2 illustrates a process of generating a video stream that includes 24 frames per 1 second according to a progressive method, and is coded and compressed by an HEVC encoder 2000.

As shown in FIG. 2, video data stored on the recording medium 10 may be coded according to an HEVC standard. However, in the present specification, the terminology of an MPEG-2 video coding standard and the terminology of an MPEG-4 AVC video coding standard may be used and described together. For example, 24 p means that the video stream has 24 frames as a progressive video, and 48i means that the video stream has 48 fields as an interlace video.

FIG. 2 illustrates a process of generating a 24 p video stream that is to be decoded by an HEVC decoder having a decoded picture buffer (DPB) with a size of 3.

Referring to FIG. 2, a non-compressed video sequence 310 including a plurality of frames arrayed in a display order is encoded by the HEVC encoder 2000 to be converted into a compressed video sequence 330. In FIG. 2, a picture order count (POC) refers to an order of outputting frames that are to be reproduced.

In FIG. 2, each of the frames is divided into three layers. In other words, each of the frames is divided into a first layer formed of I and P frames, a second layer formed of Br frames, and a third layer formed of B frames. In a layer FIG. 320 of the frames, arrows denote referencing, I, P, and B respectively denote I, P, and B frames, and B frames denote B frames that may be referred to. Also, subscripts denote display orders.

This video stream may be generated by a content producing device, a transmitting device, etc. Hereinafter, a device that generates a video stream will be referred to as a stream generating device. The stream generating device may variously realize layers of the frames according to exemplary embodiments. The stream generating device may also generate a stream that satisfies the following conditions:

I and P pictures have the same display and decoding orders.
If a decoding order of a B picture (i.e., a non-reference B picture) is ahead of a decoding order of another B picture, a display order of the B picture is ahead of a display order of the another B picture.

The P picture does not refer to the B picture.

The B picture may refer to complementary field pairs of I frames or P frames or I and P pictures right before or after the B picture in the display order. Also, the B picture may refer to complementary field pairs of a Br picture or a B picture positioned between I and P frames.

A Br picture (i.e., a reference B picture) may refer to complementary field pairs of an I or P frame or I and P pictures right before or after the Br picture. Also, a Br field may refer to a Br field constituting complementary reference field pairs.

The maximum number of consecutive B frames, the maximum number of complementary reference field pairs of a B picture, or the maximum number of complementary non-reference field pairs of the B picture is 3 in the display order.

The stream generating device including the HEVC encoder 2000 encodes a stream according to the above-described conditions and transmits the encoded stream. If the stream is a stream of a broadcasting program that is used in a broadcasting system, the GOP structure information and the HEVC information of the above-described additional information may be uniformly maintained with respect to the entire stream, and offset information may be variably transmitted.

Therefore, if a reproducing device receiving a video stream secures GOP structure information and HEVC information of the video stream and offset information of an I or P frame, a trick play may be performed in a forward or backward direction.

Figure 3:
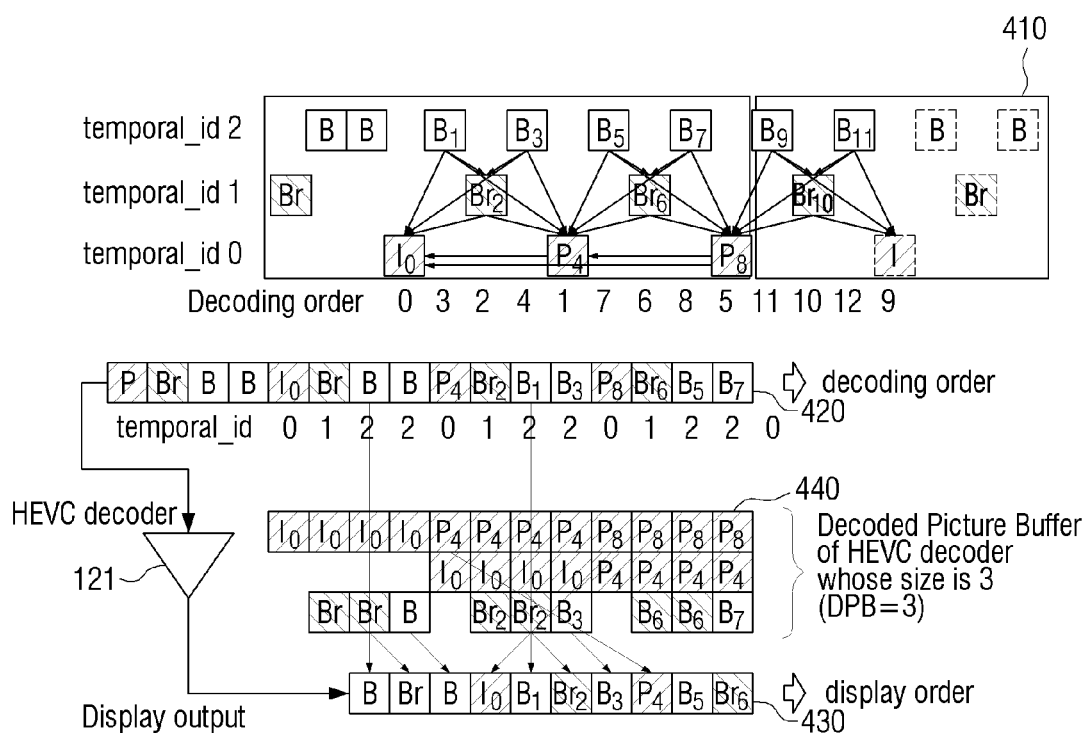

FIG. 3 is a view illustrating a process of decoding a 24 p video stream generated as described in the exemplary embodiment of FIG. 2, using an HEVC decoder having a DPB with a size of 3, according to an exemplary embodiment.

Referring to FIG. 3, a video stream 410 includes frames, each of which is divided into three layers, and is input into the reproducing device 100. A temporal ID is set with respect to each of the layers. In other words, a temporal ID of a first layer is set to 0, a temporal ID of a second layer is set to 1, and a temporal ID of a third layer is set to 2. The controller 130 may read and decode data of each frame according to decoding order.

In FIG. 3, a second stream 420 includes frames that are arrayed according to decoding order. An HEVC decoder 121 of the data processor 120 sequentially decodes data according to the decoding order. Here, frames are sequentially buffered in a DPB 440 of an HEVC. The controller 130 may control the data processor 120 to array and output the decoded frames according to a display order.

A last stream 430 of FIG. 3 is arrayed according to the display order.

If a trick play command is input, the controller 130 may read, decode, and output only an appropriate frame using additional information to perform a trick play at a speed corresponding to the trick play command.

If the stream 410 having a structure as illustrated in FIG. 3 is input, additional information may have the following values:

—GOP Structure Information—

Whether a Br picture exists in a GOP: YES

The number of B pictures between I or P pictures right before or after the B pictures: 3:

A position of a Br picture among consecutive Bs pictures: 2

—HEVC Information—

Temporal IDs of I and P pictures: 0, 0

—Offset Information—

Offset of an immediately following I, P, or B frame in a decoding order: offset 1, offset 2, offset 3

Coding size information of I, P, and B frames to be read: 1.3 Mbyte (including I and Br), 800 Kbyte (including P and Br), 800 Kbyte (including P and Br)

The controller 130 may check a structure of a GOP based on the above-described GOP structure information, and selectively read, decode, and output a layer corresponding to a trick play speed selected by the user based on HEVC information and the offset information The reproducing device 100 may acquire various types of information related to the trick play from the additional information. The GOP may be generated in various structures. Therefore, various types of trick plays may be performed according to the structure of the GOP.

FIG. 4 is a table illustrating GOP information of additional information and information acquired from the additional information, according to various exemplary embodiments. Referring to FIG. 4, the number of consecutive Bs pictures may be various set to 1, 2, or 3. Br pictures may be included or omitted. Therefore, a value indicating whether a Br picture exists in the GOP structure information may be recorded as "YES" or "NO". Also, a position of the Br picture may be variously set.

The reproducing device 100 may check a supportable trick play speed based on the GOP structure information and determine whether reordering is to be performed during a lowest speed reproduction. The reordering refers to a job that is to newly determine a buffering order of a DPB since a decoding order and a display order of a recording medium do not match with each other.

As shown in FIG. 4, the trick play speed may be variously realized like 2×, pseudo 2×, 3×, 4×, 6×, 8×, 12×, 16×, etc. Here, the pseudo 2× is not accurate 2× but refers to a trick play speed having a level similar to 2×. In other words, if the number of consecutive B frames is 1 and 2, only I and P frames are reproduced. However, if the number of consecutive B frames is 3, P and Br are also reproduced. In this case, the trick play speed may be accurate 2× or pseudo 2×. The reproducing device 100 may determine whether reordering is needed, according to whether a B or Br frame is to be reproduced.

As described above, various types of trick plays may be supported according to a structure of a GOP. The reproducing device 100 may selectively output data about a decoded frame to perform a trick play corresponding to a trick play speed selected by the user.

Figure 5:
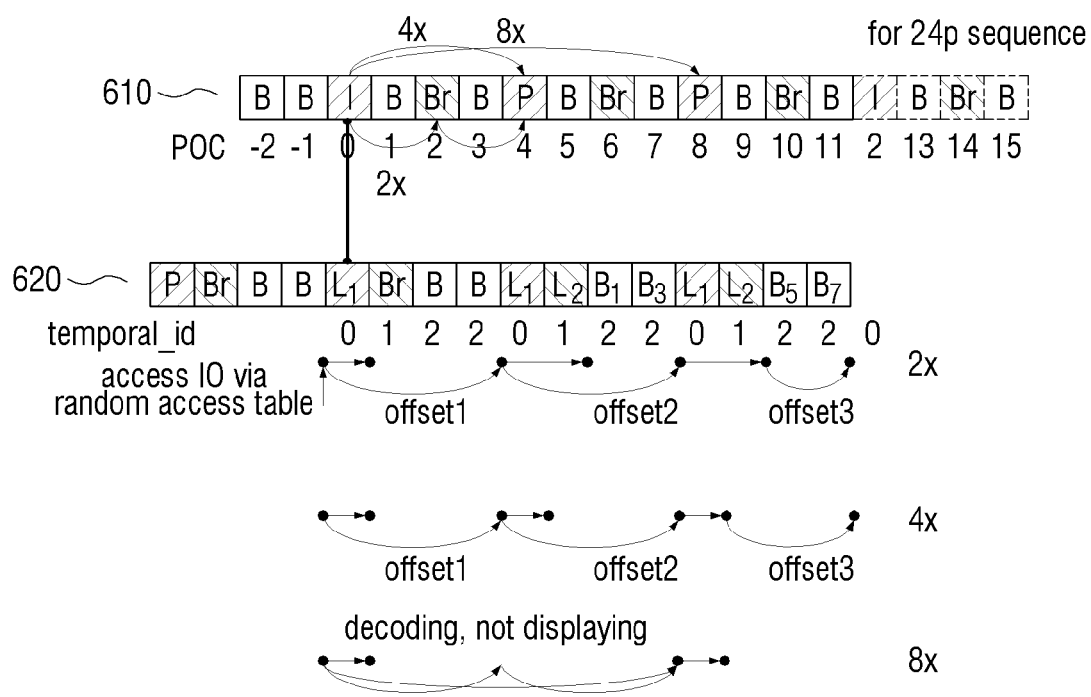

FIG. 5 is a view illustrating a method of performing a trick play based on offset information if a 24 p video stream is input, according to an exemplary embodiment.

In FIG. 5, a first stream 610 denotes a structure of a stream according to an output order, and a second stream 620 denotes a structure of a stream according to a decoding order.

According to the first stream 610, if a user selects a 2× reproduction, the controller 130 performs reproduction in order of I0, Br2, P4, P8, Br6. When Br2 and Br6 frames are displayed, the Br2 and Br6 frames are to be displayed prior to P4 and P8 frames. Therefore, the data processor 120 performs reordering in the DPB of the HEVC decoder 121. In other high-speed reproductions, all of P frames are read, decode, and selectively displayed to perform a trick play.

If a 2× trick play command is input, the reproducing device 100 reproduces only an I frame (I0). Also, the reproducing device 100 reads and reorders a P frame (P4) and a B frame (Br2) one by one from a position at a distance of offset 1, and outputs the B frames (Br2) and the P frames (P4). The reproducing device 100 jumps a position of a next P frame (P8) at a distance of offset 1+offset 2 to read and reproduce the P frame (P8). If a next GOP is input when reproduction is performed according to the above-described method, the reproducing device 100 reads and reorders an I frame and a B frame, and outputs the B frame and the I frame. The controller 130 repeatedly performs this operation until a user command to stop the trick play is input or reproduction is performed to a last content time In the case of 4x trick play, the reproducing device 100 reproduces only the I frame (I0) at first. Also, the reproducing device 100 reads and outputs only the P frame (P4) at the position at the distance of offset 1. The reproducing device 100 jumps to the next P frame (P8) at the distance of offset 1+offset 2. If a next GOP is input when the reproduction is performed according to the above-described method, the reproducing device 100 reads and outputs an I frame. The controller 130 repeatedly performs this operation when the trick play is performed In the case of 8x trick play, the reproducing device 100 reproduces only the I frames at first. Also, the reproducing device 100 reads and decodes only the P frame (P4) at the distance of offset 1, and stores the decoded P frame (P4) in the DPB. The data processor 120 decodes and outputs the next P frame (P8) with reference to the current P frame (P4). Since the 8x trick play is performed, the P frame (P4) is only decoded but is not output. As a result, the I frame and the P8 frame are output. Thus, 8x trick play may be achieved. The controller 130 repeatedly performs this operation when the trick play is performed. If a next frame to be output is the I frame, the controller 130 does not need to read the current P frame. In this case, the controller 130 skips reading of the P frame.

A trick play may be performed at various speeds according to the above-described method.

If a 4x or more trick play is realized by using only a P frame, and all of P frames are decoded, the 4x or more trick play becomes possible. Some of the P frames that do not need to be displayed do not need to be decoded. Therefore, decoding of a P frame that is to be decoded may be omitted to reduce a burden of a decoder. In this case, the P frame may be divided into first and second layers.

According to another exemplary embodiment, a plurality of frames may be divided into a first layer including I frames and some of P frames, a second layer including the others of the P frame, and a third layer including B frames.

Figure 6:
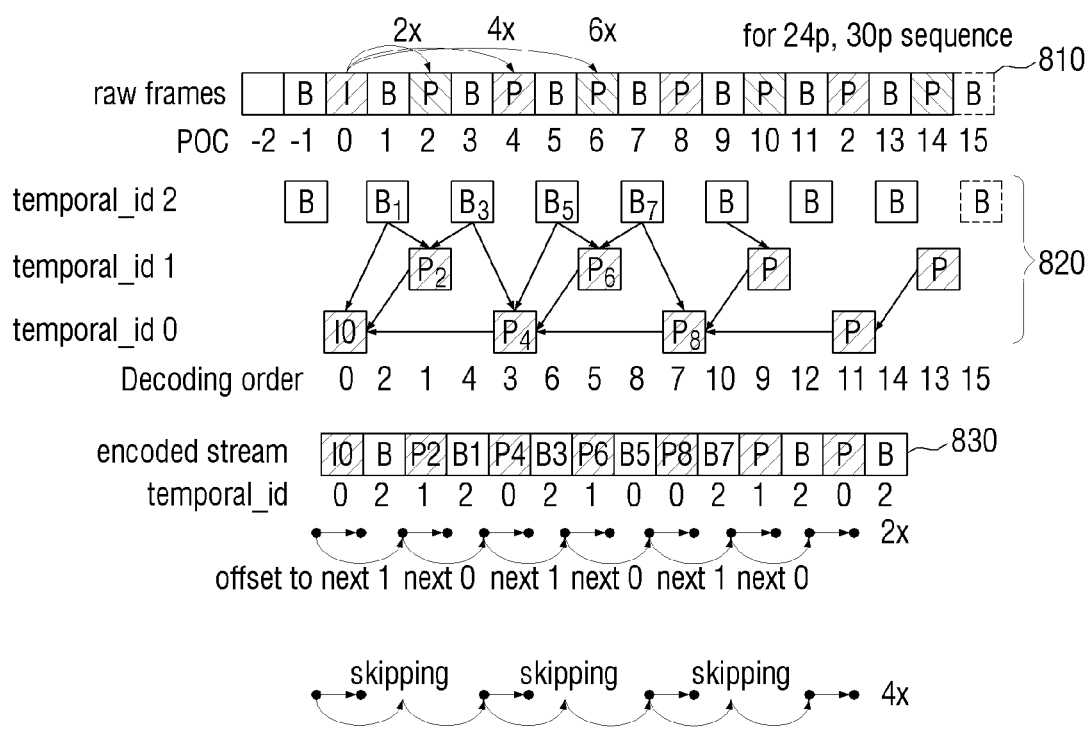

FIG. 6 is a view illustrating a method of reproducing a video stream having a structure described in the above-described exemplary embodiment, according to an exemplary embodiment. In detail, FIG. 6 illustrates a process of performing a trick play with respect to a video stream formed of 24 pictures or 30 pictures per second according to a progressive method, through an HEVC decoder having a DPB with a size of 2. The reproducing device 100 may determine necessity of decoding by using HEVC information of additional information, i.e., temporal IDs In FIG. 6, an original frame 810 is arrayed in order of, B, P, B, P, B, P, B, P, B, P, B, P, B, P, B, P, and B. According to a layer diagram 820, a frame I0 and frames P4, P8, and P12 are classified as a first layer (whose temporal ID is 0). Frames P2, P6, and P10 are classified into a second layer (whose temporal ID is 1), and B frames are classified into a third layer (whose temporal ID is 2).

The stream generating device encodes the original frame 810. Frames of an encoded stream 830 are arrayed in order of I0, P2, B1, P4, B3, P6, B5, P8, B7 . . . , etc.

If a temporal ID of a P frame that does not need to be displayed during a speed reproduction is greater than a temporal ID of a next P frame, the reproducing device 100 may omit a decoding process. In other words, if a 4X trick play is performed based on a stream of FIG. 8, frames are to be output in order of I0, P4, P8, and P12. The reproducing device 100 reads and decodes the I0 frame, and jumps to a next P fame P2 using offset information. Since a temporal ID of the P frame P2 is 1, and a temporal ID of the next P frame P4 is 0, the controller 130 skips decoding a P frame P2. FIG. 6 illustrates a section that is skipped if the 4x trick play is performed.

A trick play method performed with respect to the stream of FIG. 6 is similar to that described with reference to FIG. 3. Thus, repeated description is omitted.

As described above, the reproducing device 100 may perform a trick play at various speeds based on various types of additional information. The additional information may be useful when reading a video stream stored on an optical disc on which a speed is limited.

Figure 7:
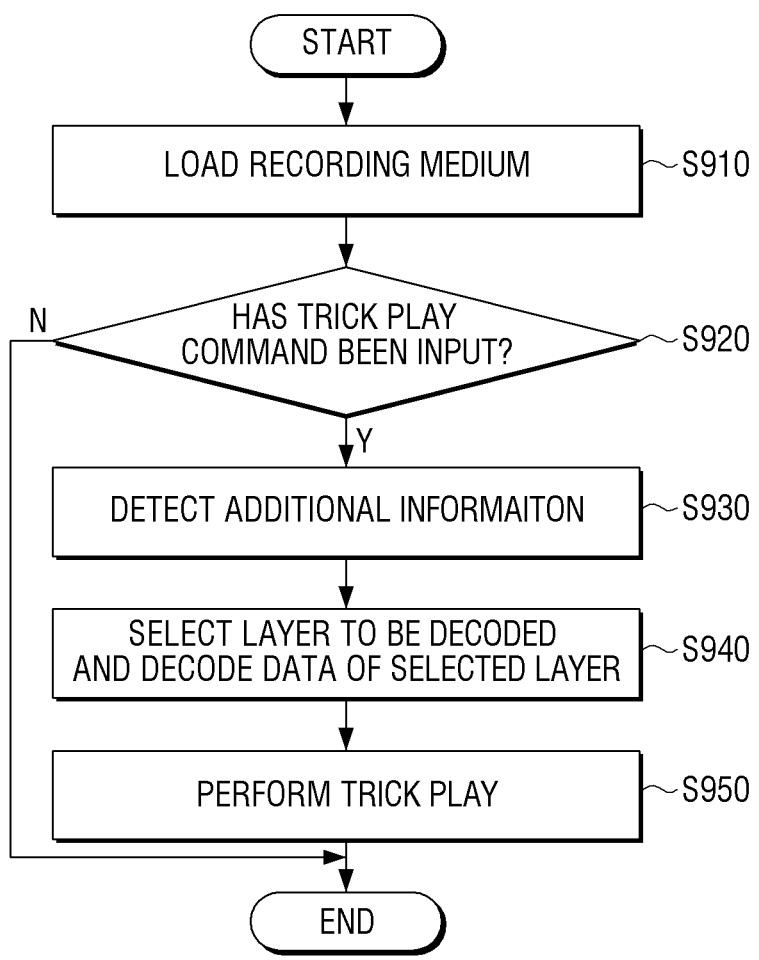

FIG. 7 is a flowchart illustrating a trick play method of a reproducing device according to an exemplary embodiment. Referring to FIG. 7, in operation S910, the reproducing device loads a recording medium that stores video data and additional information of a plurality of frames that are classified into layers. If a trick play command is input in operation S920, the reproducing device detects the additional information from the recording medium in operation S930.

In operation S940, the reproducing device selects a layer that is to be decoded, based on the additional information and the trick play command and decodes data of the selected layer. In operation S950, the reproducing device outputs at least some of the decoded data to perform a trick play having a trick play speed designated by the trick play command.

A detailed method of performing a trick play using a layer of a frame recorded in video data or an example of additional information and the additional information is as described above with reference to FIGS. 2 through 6. Thus, repeated description is omitted.

As described above, the recording medium may be realized as various types such as a BD disc, a holographic disc, a DVD, a CD, a USB memory stick, an external hard, etc.

Figure 8:
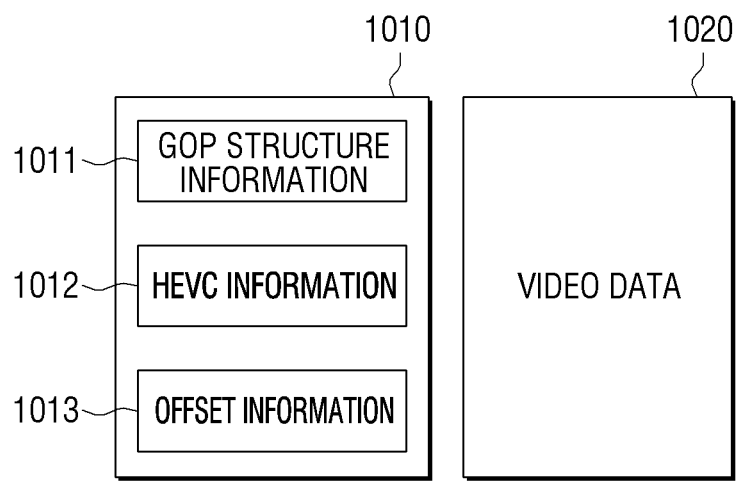
FIGS. 8 through 12 are views illustrating a data structure of an optical disc including video data and additional information, according to various exemplary embodiments.

FIG. 8 is a view illustrating a structure of data stored on a recording medium according to an exemplary embodiment. Referring to FIG. 8, the recording medium is divided into a plurality of areas 1010 and 1020. An optical disc, such as a BD disc, etc., may be divided into areas according to the preset number of tracks. Video data of a plurality of frames divided into layers may be recorded in the second area 1020, and additional information may be recorded in the first area 1010.

As described above, layers of frames may be variously determined according to exemplary embodiments. The layers of the frames may be divided into three layers in the above-described exemplary embodiments, but may be divided into two layers or four or more layers.

The additional information recorded in the first area 1010 may include GOP structure information 1011 about a structure of a video stream of a GOP, HEVC information 1012 about temporal IDs differently determined with respect to layers, and offset information 1013 for determining a subsequent position that is to be decoded. The trick play method using the additional information has been described in detail in the above-described various exemplary embodiments. Thus, repeated description is omitted.

Figure 9:
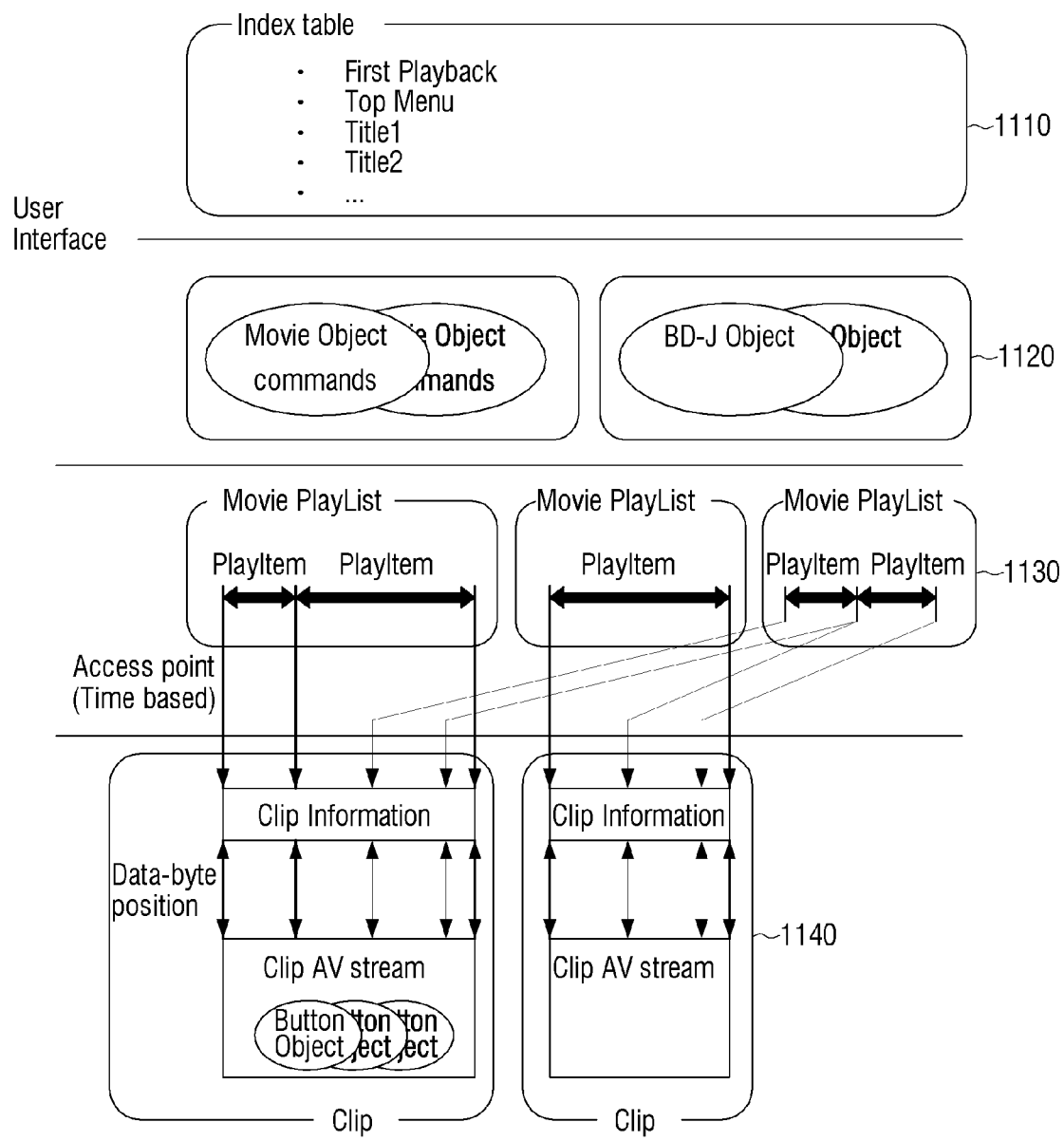

FIG. 9 is a view illustrating a structure of data stored on a recording medium that is realize das a BD disc, according to an exemplary embodiment.

Referring to FIG. 9, the BD disc includes four layers such as an index table 1110, a movie object/BD-J object 1120, a play list 1130, and a clip 1140.

The clip 1140 includes a clip AV stream file that is a video stream file and a clip information file that is a database (DB) type attribution file related to the clip AV stream file. The clip information file stores a time stamp of an access point (AP). A reproducing device may detect a position of a video stream that is to be read, by using AP information of the clip information file.

The play list 1130 is an information structure that is to inform of a play order of bit streams used during reproduction and includes a plurality of play items. In general, the play list 1130 constitutes one content such as a piece of movie or drama, and a play item constitutes one chapter of the one content. The play items of the play list 1130 indicate what types a video stream, an audio stream, a subtitle stream, a menu stream, etc., are. Further, the play items indicate which stream ID (or a stream number) and which stream attribute the stream has. For example, the play items indicate a video format, a frame rate, subtitles, etc., of a video and a stream attribute such as a language code of an audio.

Various types of additional information stored on a recording medium according to the above-described exemplary embodiments are recorded in appropriate positions of the recording medium according to their attributes.

Figure 10:
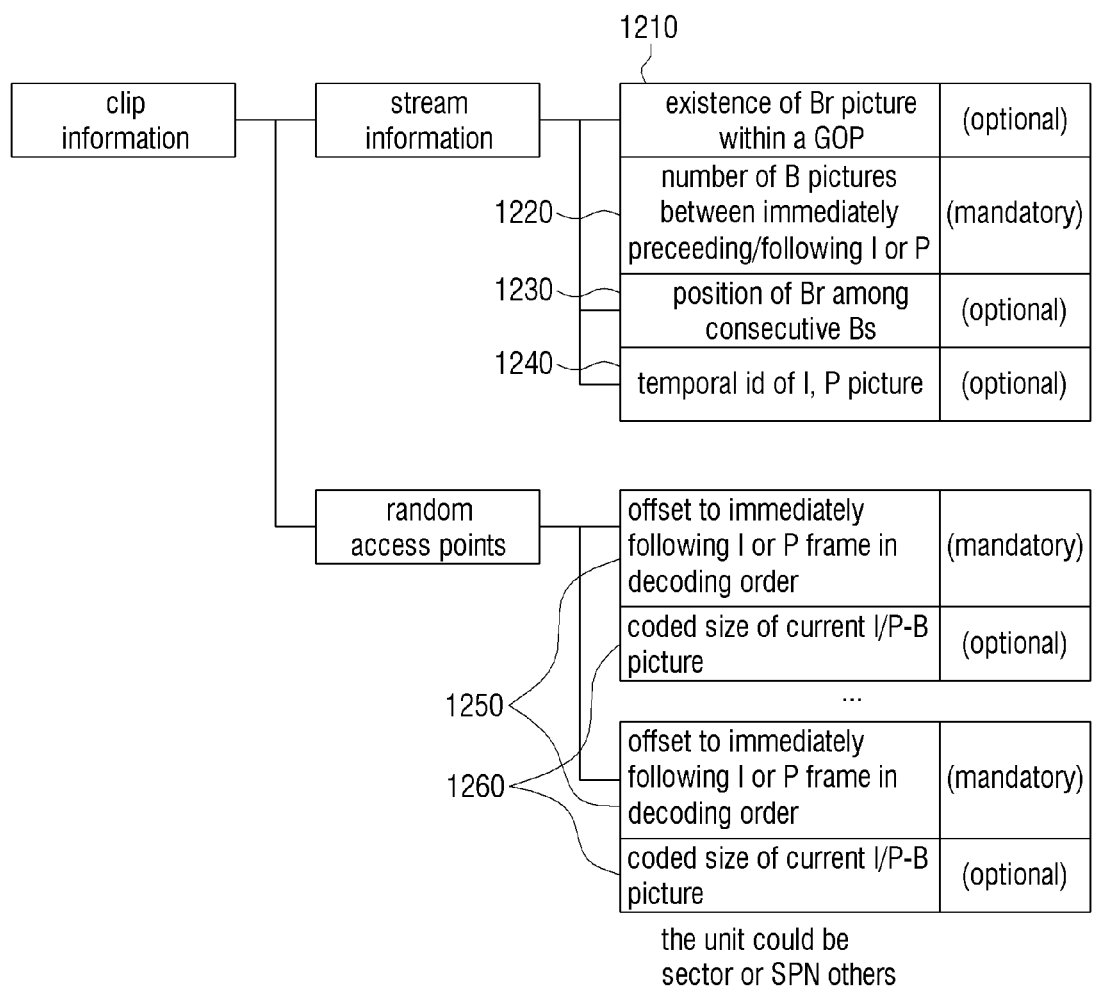

FIG. 10 is a view illustrating a structure of additional information of clip information according to an exemplary embodiment. Referring to FIG. 10, the clip information is divided into stream information and a random access point. GOP structure information and HEVC information are recorded in the stream information, and offset information is recorded in the random access point.

Information 1220 about the number of Br pictures and offset 1250 to an immediately following I or P frame in decoding order may be set to mandatory data that is mandatorily written, and other data 1210, 1230, and 1240 may be set to optional data that is selectively written.

Temporal ID information 1240 is used to read a frame and determine an I or P picture that does not need to be decoded, when a high-speed trick play is performed. Also, the coding size information 1260 of a current picture is used to determine how much data is to be read after a data approach is performed using an offset. If the coding size information 1260 is used, whether reading is to be performed may be determined without data parsing. Information 1210 indicting whether a Br picture exists or Br position information 1230 may be used for an accurate speed calculation (i.e., 2× or pseudo 2×).

A structure of a GOP may not be changed in a whole video stream. In this case, as shown in FIG. 10, the GOP structure information may be displayed as a portion of stream information that displays information about a video stream.

Also, the offset information is information about I and P pictures of a stream, such as the random access point information. Thus, the offset information may be displayed as a portion of the random access point information. Offsets of the I and P frames are recorded in FIG. 10, but the offset of only the P frame may be displayed.

Figure 11:
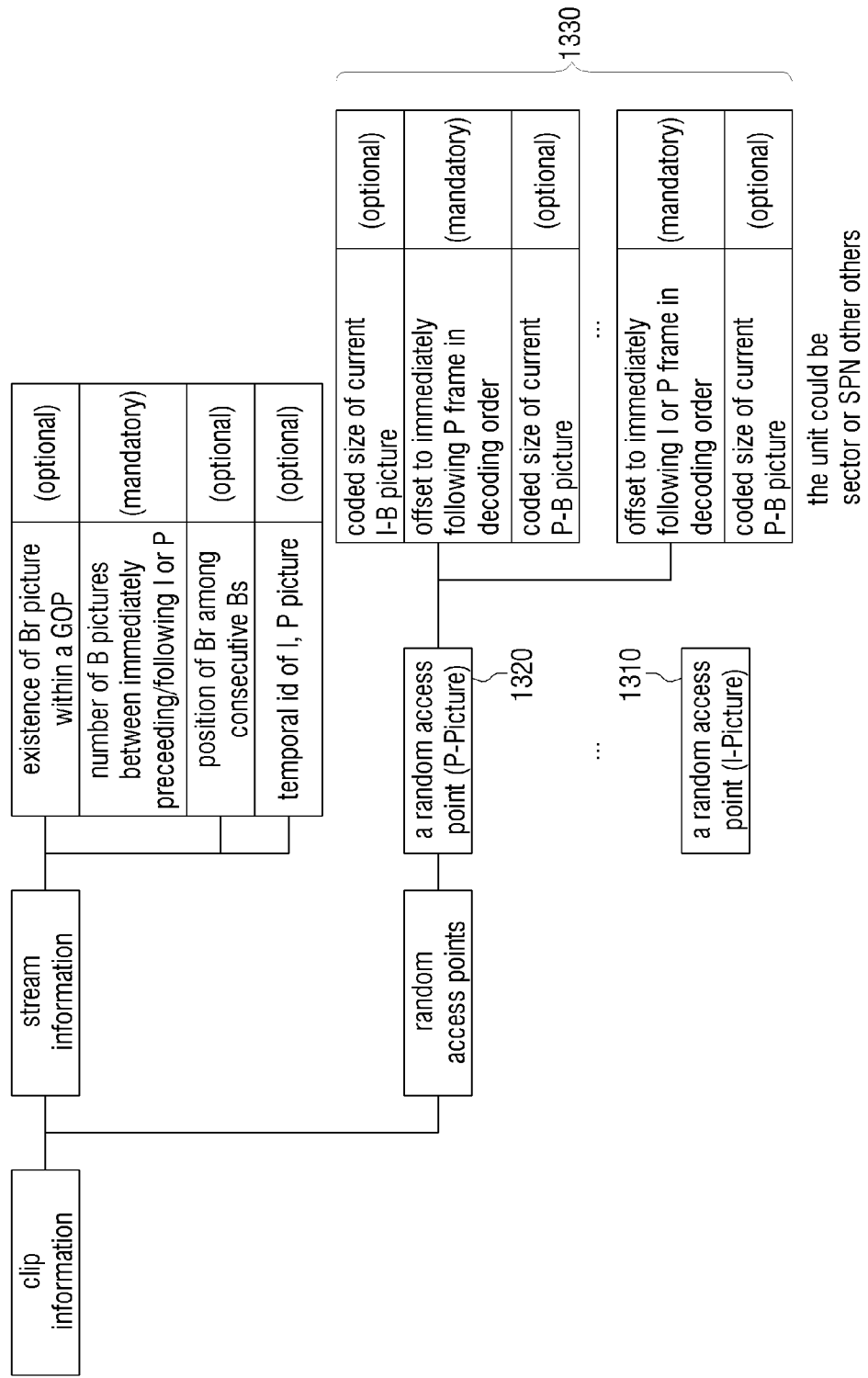

FIG. 11 is a view illustrating a structure of offset information according to another exemplary embodiment. Referring to FIG. 11, GOP structure information and HEVC information are recorded in stream information, and offset information is recorded in a random access point. The random access point is divided into a random access point 1310 of an I picture and a random access point 1320 of a P frame. Various types of offset information 1330 is recorded in the random access point 1320 of the P frame.

If the structure of the offset information as illustrated in FIG. 11 is used, the I frame may be expressed using existing random access point information. Therefore, a capacity used for storing additional information may be reduced.

As described above, the offset information may be displayed as a portion of random access point information in clip information but may be inserted into a stream. In other words, if the offset information is inserted as SEI information before a GOP starts, a reproducing device may read and play the offset information when performing a trick play.

In the above-described exemplary embodiment, a method of recording additional information if a structure of a GOP is not changed in a whole video stream has been described. In this case, various types of additional information may be included in a random access point.

Figure 12:
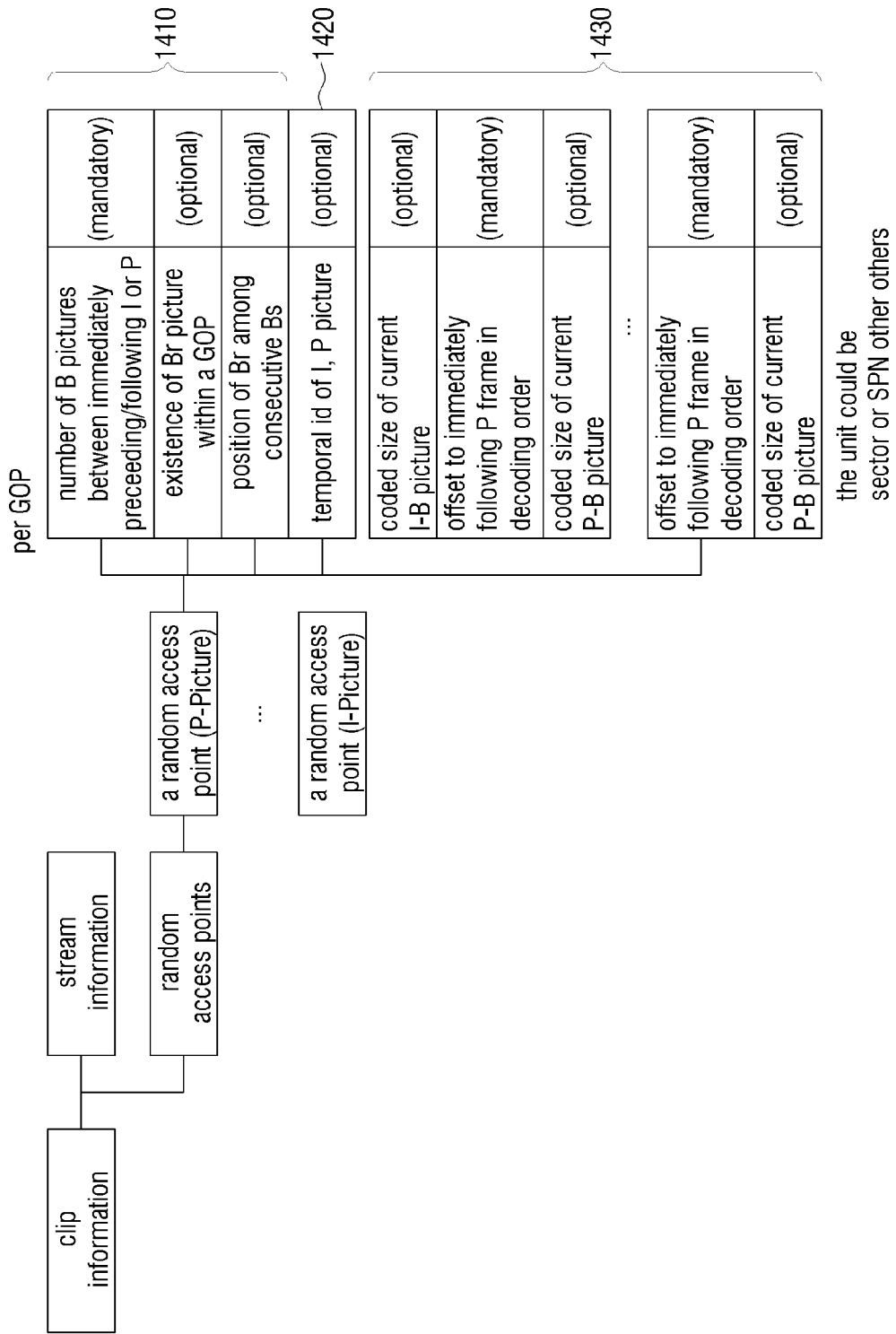

FIG. 12 is a view illustrating a data structure if various types of additional information are included in a random access point, according to an exemplary embodiment Referring to FIG. 12, the random access point is divided into a random access point of an I picture and a random access point of a P picture. The random access point of the P frame includes GOP structure information 1410, HEVC information 1420, and offset information 1430 per GOP.

A unit for displaying offset and coding size information may be a byte, a source packet number (SPN), a sector, etc. Alternatively, the unit may be 3 sectors that is the least common multiple (LCM) the SPN and the sector. A unit and an amount of the offset information may be determined according to various criteria such as a type, a size, etc., of content.

As described above, the additional information may be stored on a recording medium according to various methods. The reproducing device may perform a trick play as described above using the additional information. The reproducing device may perform an interested region enlargement service besides the trick play.

Figure 13:
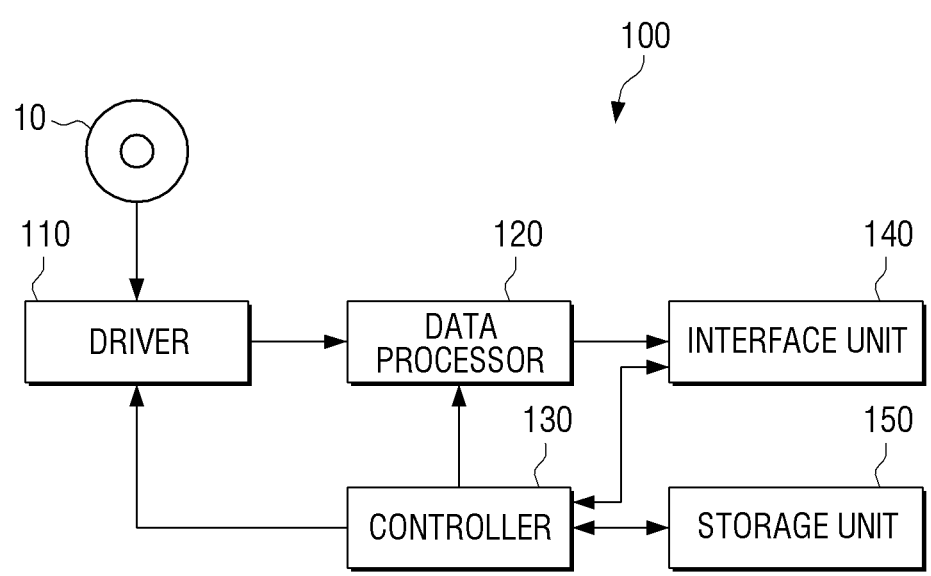
FIGS. 13 through 22 are views illustrating a reproducing device for performing an interested region enlarging service, according to various exemplary embodiments.

FIG. 13 is a block diagram illustrating a structure of a reproducing device 100 that provides an interested region enlargement service, according to another exemplary embodiment.

Referring to FIG. 13, the reproducing device 100 includes a driver 110, a data processor 120, a controller 130, an interface unit 140, and a storage unit 150.

If a recording medium is attached, the driver 110 drives the recording medium to detect data. As described above, the recording medium may be various types of media such as an optical disc such as a BD, a holographic disc, or the like, a USB memory stick, an external hard, etc. A high-resolution content may be recorded on the recording medium. If the recording medium on which the high-resolution content is recorded is attached, the driver 110 detects the high-resolution content from the recording medium. The high-resolution content refers to a content having a relatively higher resolution than an output resolution of a display device. For example, the high-resolution content may refer to ultra high definition (UHD) content. Hereinafter, the reproducing device 100 will be described as a device that may perform reproduction with respect to a BD 10 on which the UHD content is recorded.

The data processor 120 processes the high-resolution content detected by the driver 110 to generate a video frame.

The interface unit 140 transmits the video frame, an audio signal, etc. generated by the data processor 120 to a display device. In detail, the interface unit 140 may be realized as a high definition multimedia interface (HDMI).

The storage unit 150 stores an operation system (O/S) necessary for an operation of the reproducing device 100, various types of programs or data, etc. The controller 130 may store various types of data, which are received from the display device through the interface unit 140, or various types of information and data detected from the BD 10 in the storage unit 150.

If a recording medium such as a disc is attached in the driver 110, the controller 130 controls the driver 110 and the data processor 120 to process the high-resolution content. The controller 130 determines a characteristic of the display device connected to the interface unit 140, using display characteristic information stored in the storage unit 150.

The display characteristic information may be acquired and stored in the storage unit 150 according to various exemplary embodiments. For example, the controller 130 may receive the display characteristic information from the display device through the interface unit 140. The display characteristic information may include various types of information such as an output resolution of a display panel of the display device, a pixel count, a display size, a viewing distance, a device model name, etc. If the interface unit 140 is realized as the HDMI as described above, the controller 130 may acquire extended display identification data (EDID). The controller 130 may estimate whether the currently connected display device is a low-resolution display device, using a maximum horizontal image size, a maximum vertical image size, an established timing bitmap, etc., of the EDID. The display characteristic information may be referred to as various names such as viewing environment information, resolution information, the EDID, etc., but will be commonly referred to the display characteristic information.

As another example, the display characteristic information may be directly input by a user. Further, the reproducing device 100 may display a user interface (UI) for determining an output resolution through a touch screen panel of the reproducing device 100, an external display device, etc. The user may input an output resolution such as, UHD, HD, etc., through the UI. The controller 130 stores the display characteristic information such as the input output resolution in the storage unit 150. If the display device and the reproducing device 100 are connected to each other using a method such as a HDMI, the controller 130 may automatically acquire display characteristic information, such as screen size information, and store the display characteristic information as viewing environment information in the reproducing device 100. If analog connection method is used or the display characteristic information may not be acquired due to other reasons, the viewing environment information may be generated as a value set in the manufacturer or a value set by the user and stored in the storage unit 150.

As described above, the viewing environment information of the high-resolution content may be stored in the storage unit 150. The controller 130 determines a characteristic of the display device connected to the interface unit 140, using information stored in the storage unit 150.

If it is determined that the display device is a low-resolution display device, the controller 130 controls the data processor 120 to replace at least a portion of video frames of the high-resolution content with an interested region image. A low resolution refers to a relatively lower resolution than a resolution of a content. For example, if the content is a UHD content having a resolution between 4000 (3840×2160) and 8000 (7680×4320), an output resolution of an HD display device having a resolution of 1920×1080 corresponds to a low resolution. Hereinafter, the high-resolution content will be described as a UHD content, and a low-resolution display panel or device will be described as a display panel or device having an HD resolution. However, the exemplary embodiments are not limited thereto. Thus, if a resolution of a content is higher than a resolution of the display panel or device, the present exemplary embodiment may be applied as is.

The interested region image refers to an image of a local region of one video frame. In other words, a video frame of a UHD content may be generated to be displayed on a UHD display device 4 times larger than an HD display device. Therefore, detailed image regions of a whole image are formed in sizes that may be identified at a viewing distance of a user based on a UHD viewing environment. However, the detailed image regions are scaled down by 1/4 times to be displayed on the HD display device. Therefore, sizes of the detailed image regions are extremely reduced. Thus, it is difficult for the user to identify the detailed image regions at the same viewing distance. Although the user is able to identify the detailed image regions, it is difficult to convey feeling intended by a maker. For example, even if the display device displays the detailed image regions, and talking of characters is a main content, the characters occupy only a small portion, not a whole screen, according to a related art. In this case, the user may not identify expressions or eyes of the characters who talk with one another. Therefore, it is difficult for the user to recognize the feeling that the maker wants to convey.

Therefore, a content maker may select a portion of detailed image regions of video frames to which the user is to pay attention, as an interested region. The content maker may provide interested region information indicating the interested region to the reproducing device 100.

The controller 130 may control the data processor 120 to check an interested region of a video frame of a high-resolution content based on the interested region information, generate the interested region in a frame size, and replace the video frame with the interested region. According to exemplary embodiments, the interested region information may be recorded on the BD 10, may be provided through an external server device, or may be provided according to various methods.

Detailed descriptions and illustrations of the same elements of the reproducing device 100 of FIG. 13 as those of the reproducing device 100 of FIG. 1 are omitted.

Cropping information may be provided along with the interested region information. The cropping information refers to information that defines a portion to be deleted in consideration of a size constraint of a largest coding unit (LCU). In other words, if an interested region is defined in each LCU within an image frame, an image having a size of 1920×1088 may be extracted from a UHD image. Cropping is required to display the image on a display device having a size of 1920×1080. Therefore, if cropping information that has determined a position to be cropped is provided, an image having an appropriate HD size may be output through the display device. The cropping information may also be provided through a recording medium such as the disc 10 or through an external server device.

According to an exemplary embodiment, one of video frames of a high-resolution content including an interested region may be divided into a plurality of tiles. Sizes, position, and shapes of the tiles may be adaptively selected according to a size of the interested region.

A title refers a coding unit in a UHD video encoder.

Figure 14:
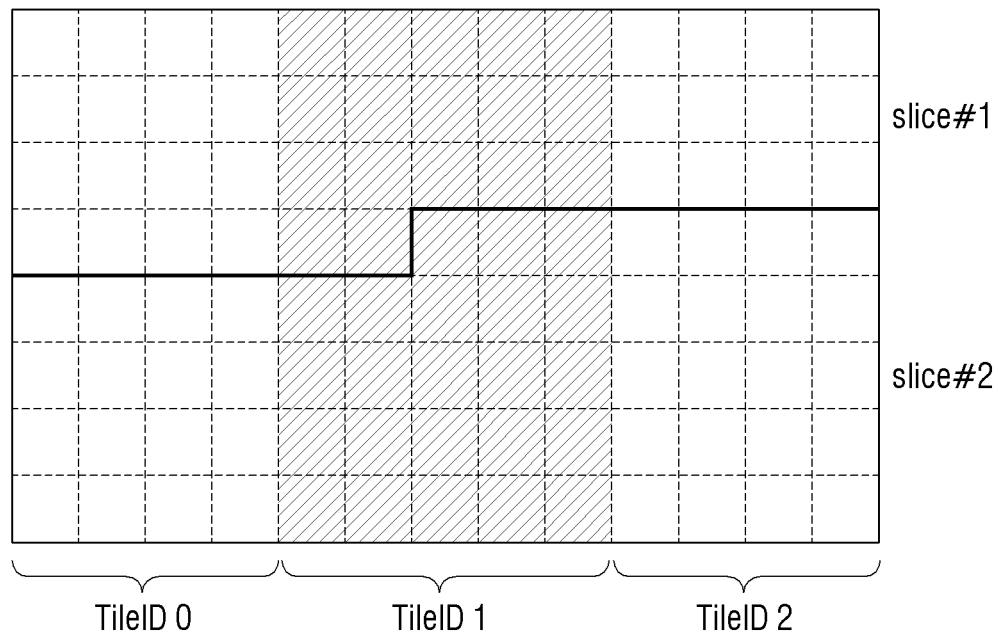

FIG. 14 is a view illustrating slices and titles of a coding unit in a UHD video encoder, according to an exemplary embodiment. Slices and tiles as illustrated in FIG. 14 are defined in HEVC that is a next generation video coding standard that has been discussed by JCT-VC that is organized by ISO/IEC MPEG and ITU-T VCEG.

Referring to FIG. 14, one picture, i.e., one video frame, includes slices each including the fixed number of coding tree blocks having consecutive raster scan orders and tiles including the fixed number of coding tree blocks and having square shapes. Coding tree blocks constituting one slice may belong to several other tiles. A plurality of tiles constituting one picture may be independently decoded by a plurality of decoders in a condition in which a filter improving image qualities of tile boundaries is not used.

As described above, one video frame may be divided into a plurality of tiles, and tile data of each of the tiles may be independently decoded.

Therefore, if interested region information that has designated tile data corresponding to an interested region is provided, the controller 130 may control the data processor 120 to selectively decode tile data corresponding to the interested region among a plurality of pieces of tile data according to the interested region information and generate an image of the decoded tile data in a frame size.

Figure 15:
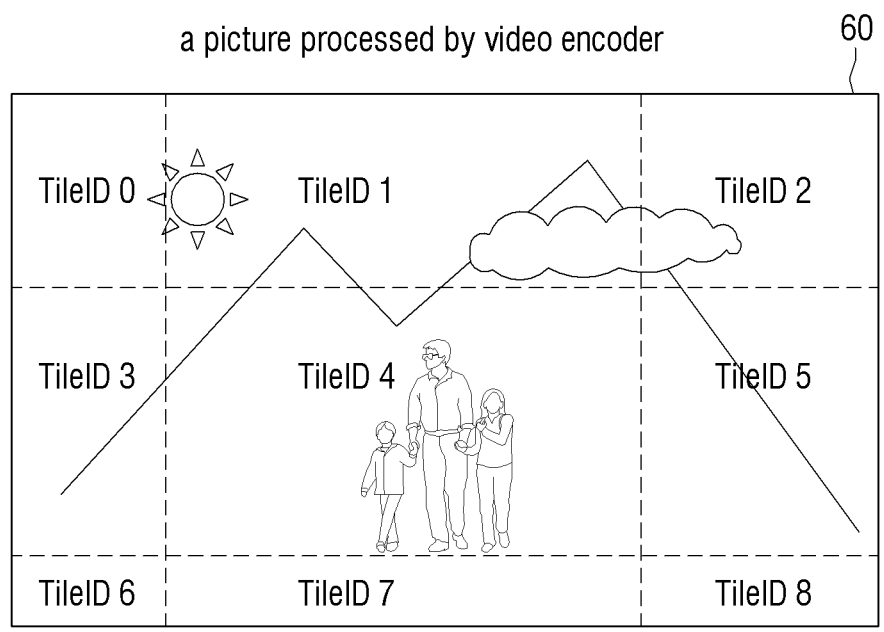

FIG. 15 is a view illustrating an interested region that is expressed as a tile, according to an exemplary embodiment. As shown in FIG. 15, one video frame may be divided into a plurality of tiles. The tiles have coding tree blocks as basic unit and have rectangular shapes. Therefore, if a center of a screen is an interested region, one screen is divided into 9 titles.

Referring to FIG. 15, a whole region of a video frame 60 is divided into nine tiles TileID 0 through TileID 8. If the fifth tile of the nine tiles, i.e., TileID 4, is designated as an interested region, interested region information may include an TileID 4 that is an identifier for designating the corresponding tile. The controller 130 controls the data processor 120 to enlarge an image of a tile corresponding to TileID 4 in a whole frame size to replace the video frame 60 with the image of the enlarged portion TileID 4.

Figure 16:
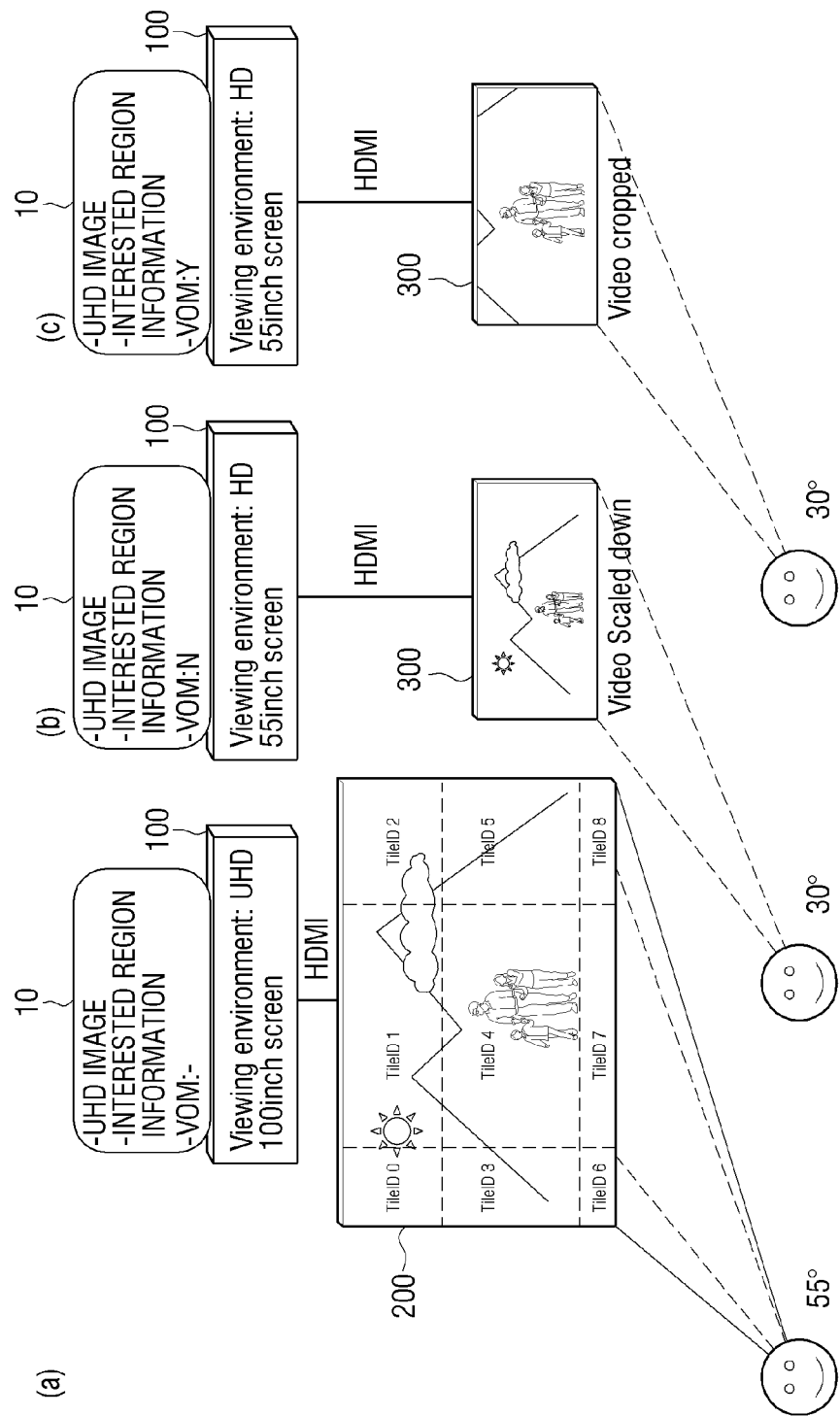

FIGS. 16A through 16C are views illustrating an operation of a reproducing device that provides an interested region enlargement service, according to an exemplary embodiment.

Referring to FIGS. 16A through 16C, interested region information may be stored along with a high-resolution content on a disc, i.e., a recording medium. According to an exemplary embodiment, the disc may store the high-resolution content, type information indicating a type of the high-resolution content, the interested region information, notification information for notifying whether interested region information exists, a video output mode information for permitting whether a video frame is to be changed by using the interested region, etc. The disc may further store subtitles to be added to the high-resolution content or various types of information about menus.

The high-resolution content refers to a content such as a UHD image described above. Video data of the high-resolution content may include a plurality of pieces of tile data.

As described above, the reproducing device 100 requires display characteristic information to check whether a screen for displaying a content is a high-resolution screen or an HD screen. The display characteristic information may be regarded as information necessary for selecting and outputting an object appropriate for the screen, but the type information may be information that may be selectively recorded.

The interested region information is information that is to define an interested region of each video fame. According to exemplary embodiments, the interested region information may have various values. If a video frame is divided into a plurality of tiles, and thus a plurality of pieces of tile data are included in video data as in the present exemplary embodiment, the interested region information may be information that designates at least one of the tile data. According to an H.264 standard, the interested region information may be recorded as supplemental enhancement information (SEI) or additional navigation information.

The video output mode information is information that is to determine whether an original picture is to be replaced or is to be output as it is by using an image of the interested region. The video output mode information may include a first value corresponding to "Yes" or a second value corresponding to "No". The video output mode information may be determined by an intention of a content maker. In other words, a maker may not want to determine and process a difference between a content and a viewing environment. An element for controlling not to arbitrarily change a vide frame is to be provided to the maker in consideration of this, and the video output mode information operates as the element.

As described above, various types of information may be stored on the disc 10. If the disc 10 is attached, the controller 130 checks a viewing environment of a display device connected to the reproducing device 100 using the display characteristic information stored in the storage unit 150.

FIG. 16A illustrates a UHD display device 200 that is connected to the reproducing device 100. In this case, the controller 130 decodes video data of a high-resolution content as it is to provide an original video frame. Therefore, the UHD display device 200 displays original video frames of the high-resolution content as they are.

FIGS. 16B and 16C illustrating an HD display device 300 that is connected to the reproducing device 100. If it is determined that the HD display device 300 has been connected, the controller 130 scales down a video frame of the high-resolution content in a display size of the HD display device 300. The controller 130 checks video output mode information.

If it is checked that the video output mode information has a value "No", the controller 130 scales down the video frame of the high-resolution content according to the display size of the HD display device 300. Therefore, as shown in FIG. 16B, an original video frame is scaled down and displayed.

If it is checked that the video output mode information has a value "Yes", the controller 130 checks the above-described notification information of the information detected by the driver 110. Therefore, the controller 130 determines whether interested region information is included. If the interested region information is not included, the controller 130 processes video data of the high-resolution content to generate a plurality of video frames as they are and provides the plurality of video frames to the display device through the interface unit 140. If the interested region information is included, the controller 130 controls the data processor 120 to selectively process tile data designated by the interested region information to generate the title data in a video frame size. Therefore, as shown in FIG. 16C, the HD display device 300 displays an image corresponding to TileID 4 in a frame size.

If processing is performed as described above, a user may view an important portion of the high-resolution content in an identifiable size even in a viewing environment in which the video frames of the high-resolution are scaled down and displayed in display sizes.

In the above-described exemplary embodiment, the type information is option information that may be selectively written. Thus, a content maker may not record type information of a content. If the content maker does not record the type information of the content, the controller 130 may check a type of the content based on information reflecting a characteristic of the display device and perform the above-described operation.

Figure 17:
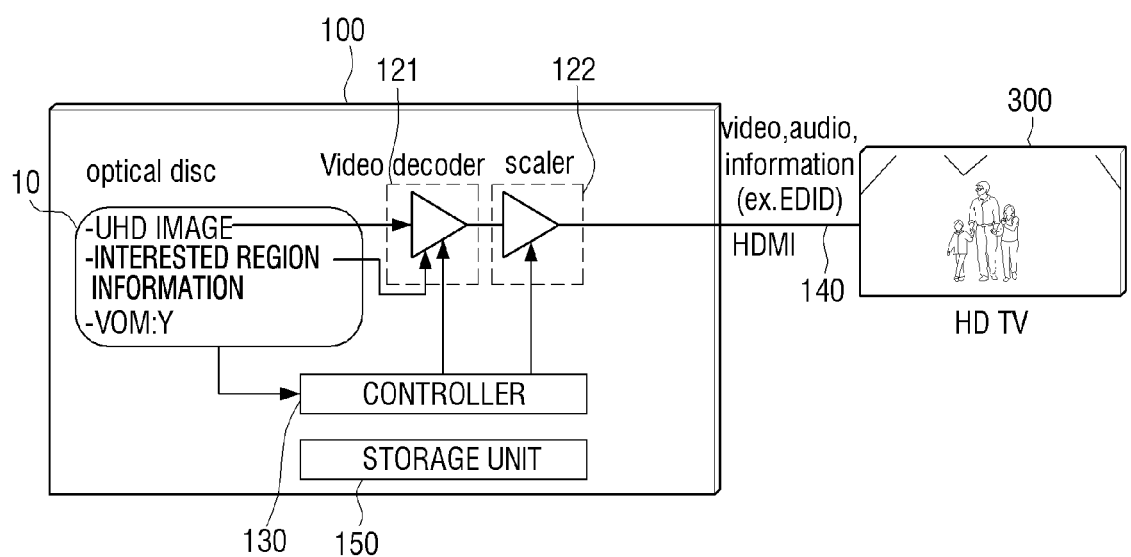

FIG. 17 is a view illustrating an operation of the reproducing device 100 of the above-described exemplary embodiment. Referring to FIG. 17, the data processor 120 of the reproducing device 100 includes a video decoder 121 and a scaler 122.

The video decoder 121 decodes video data of a high-resolution content stored on the disc 100.

If the disc 10 is attached, the controller 130 drives the driver 110 to detect various types of data stored on the disc 10. The controller 130 compares information about a viewing environment of the HD display device 300 with type information stored on the disc 10, wherein the information about the viewing environment is stored in the storage unit 150. If the high-resolution content is stored on the disc 10 or the viewing environment is a low resolution according to the comparison result, the controller 130 controls an operation of the video decoder 121 based on interested region information and video output mode information stored on the disc 10.

As in the above-described exemplary embodiment, a video frame including an interested region may be divided into a plurality of tiles. In this case, a bitstream of the video frame may be divided into a plurality of pieces of tile data.

If the video output mode information has a value "Yes", the controller 130 controls the video decoder 121 to selectively decode only tile data designated by the interested region information. If the video frame does not include the interested region or the video output mode information has a value "No", the controller 130 controls the video decoder 121 to decode all of data of the corresponding video frame.

The scaler 122 forms a video frame using the data decoded by the video data. As a result, a video frame including the interested region is replaced with an interested region image that is generated in a frame size, and a video frame not including the interested region is scaled down in a display size of the HD display device 300. The video frame, scaled by the scaler 122, is transmitted to the HD display device 300. Although not shown in FIG. 17, if graphic objects such as subtitles or menus exist, a mixer that mixes the graphic objects with a video frame may be further included in the data processor 120.

If a portion that a content maker wants to highlight, i.e., an interested region, exists in a particular video frame, the content maker may divide the corresponding video frame into a plurality of tiles according to a position, a size, and a shape of the interested region. For example, as shown in FIG. 15, if the interested region is positioned in a central region of the video frame, the video frame may be divided into nine tiles.

Figure 18:
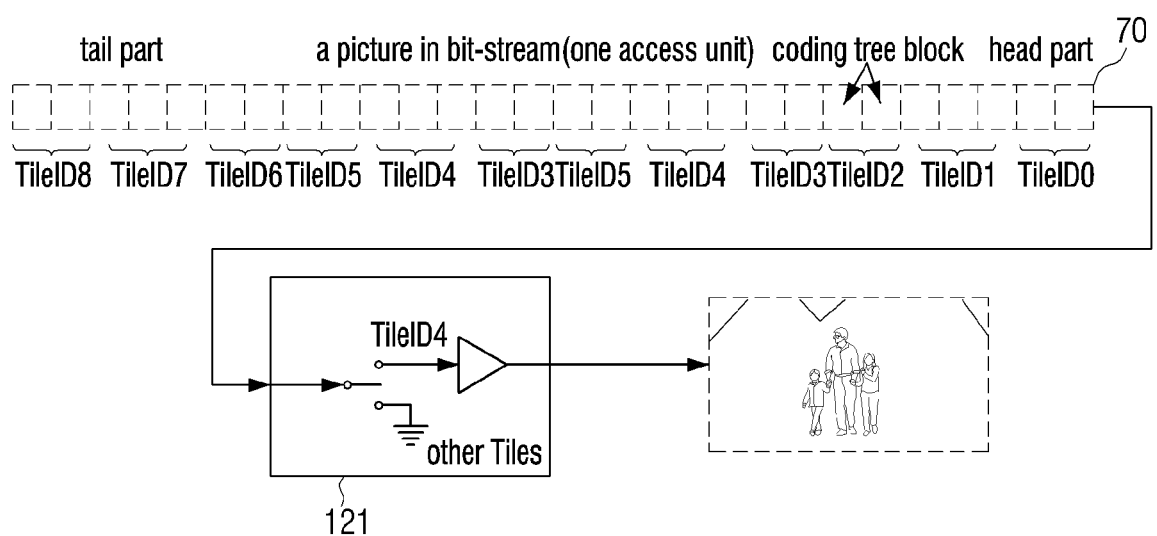

FIG. 18 is a view illustrating a bitstream for expressing a picture formed of one slice and nine tiles. The content maker divides a video frame including an interested region, i.e., a picture, into a plurality of pieces of tile data and encodes the plurality of pieces of tile data. An HEVC encoder may be used to perform encoding. A grammar of HEVC expresses coding tree blocks of the slice as a raster scan order. Thus, the bitstream is formed in an order as illustrated in FIG. 18. In other words, 0th through eighth tile data are sequentially arranged in an order from a head part that is first input to a tail part that is lastly input. In FIG. 18, each of TileID 0, 2, 6, and 8 includes two coding tree blocks, each of TileID 3 and 5 includes four coding tree blocks, each of TileID 1 and 7 includes three coding tree blocks, and TileID 4 includes six coding tree blocks.

If TileID 4 is designated by interested region information, the video decoder 121 selectively detects and decodes the corresponding tile data TileID 4, and does not decode the other tile data. The scaler 122 scales the decoded tile data to generate an image having a frame size.

As described above, a reproducing device may decode and process only a portion of a particular video frame. In this case, a process of dividing a video frame into a plurality of pieces of tile data and encoding the plurality of pieces of tile data is required.

According to another exemplary embodiment, a reproducing device may extract and display an interested region from data that is not divided in an encoding process.

Figure 19:
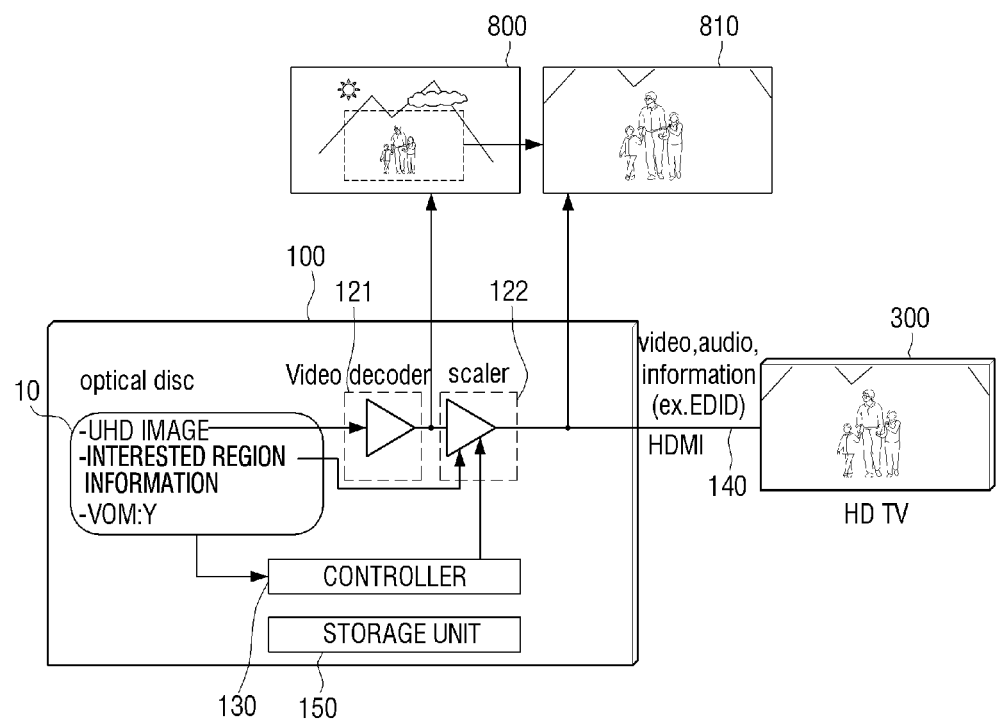

FIG. 19 is a view illustrating an operation of a reproducing device that provides an interested region enlargement service, according to another exemplary embodiment. In the present exemplary embodiment, a recording medium, i.e., the disc 10, may store a high-resolution content that is not divided into tiles or includes one video frame having one tile, type information, notification information indicating whether an interested region exists, interested region information, video output mode information, etc. The interested region information includes information that is to designate a position of the interested region within a video frame of the high-resolution content. For example, if the interested region is designated in a rectangular shape, the interested region information may include information about a pixel coordinate value, a width, and a height of one of four corners of the rectangular shape.

If the disc 10 is attached, the controller 130 controls the data processor 120 to detect and decode corresponding video data to generate a video frame and crop a region defined by the interested region information from the video frame to enlarge the region in a video frame size.

For example, if a left upper corner is set to a reference point, and a coordinate value of the reference point is (x, y), a width of the reference point is w, and a height of the reference point is h, the controller 130 recognizes a rectangle having pixel coordinates (x, y), (x+w, y), (x, y+h), (x+w, y+h) as corners, as an interested region. The controller 130 controls the scaler 122 to generate a video frame according to the video data decoded by the video decoder 121, and crops and scales an image of a portion recognized as an interested region. Therefore, the HD display device 300 displays an original video frame and a cropped image, i.e., an interested region image.

Referring to FIG. 19, an image 810 of a region of a video frame 800 is enlarged and output in a frame size In the above-described exemplary embodiments, interested region information is stored on a recording medium to be provided to the reproducing device 100. However, the interested region information may be provided according to other methods. In other words, the interested region information may be provided through an additional server device.

Figure 20:
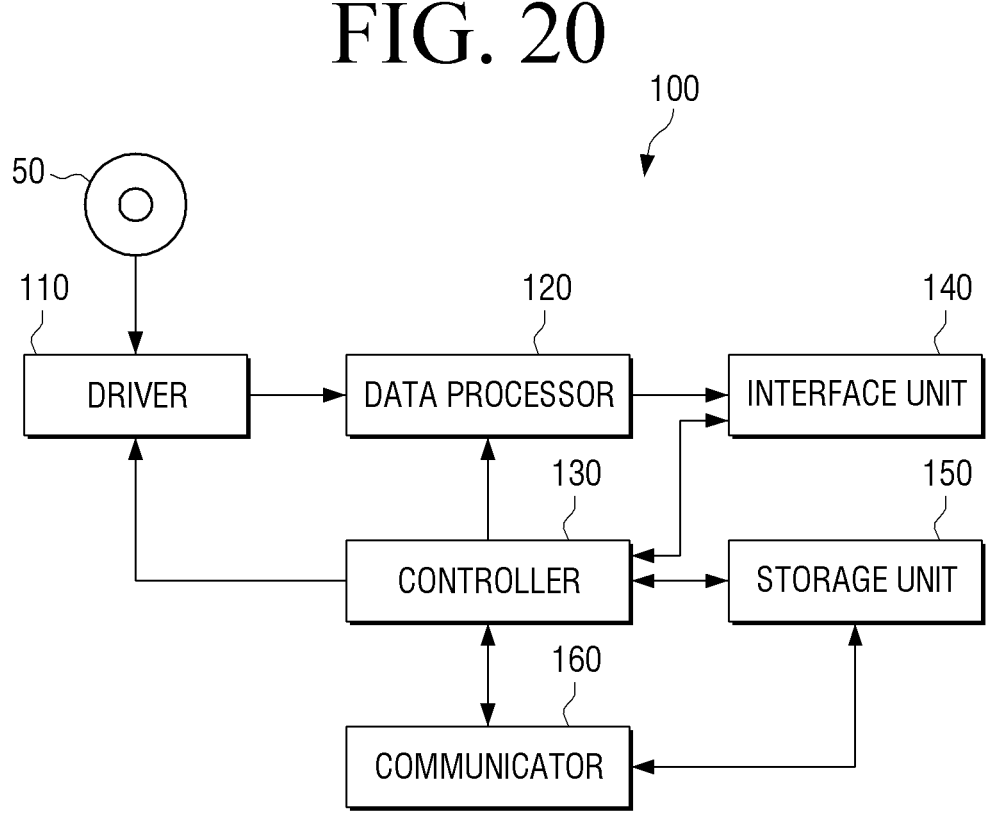

FIG. 20 is a block diagram illustrating a structure of the reproducing device 100 that provides an interested region enlargement service, according to another exemplary embodiment. Referring to FIG. 20, the reproducing device 100 includes the driver 110, the data processor 120, the controller 130, the interface unit 140, the storage unit 150, and a communicator 160.

According to the present exemplary embodiment, a recording medium, i.e., the disc 10, may store address information about a server device that may provide interested region information.

The address information refers to address information about a server device that provides a low-resolution object. The address information refer to information, such as a uniform/universal resource locator (URL), an IP address, a server name, etc., of the server device, that may be stored in an identifier form or a JAVA program form. In general, a time when releasing a movie using a recording medium having an optical disc type may be a time that does not become 1 month after the movie is shown in a theater. It may be difficult to determine an interested region within such a short time, and although the interested region is determined within the short time, the interested region may be added or changed later. Therefore, the server device may be used after an optical disc is released, to provide interested region information.

If the address information is detected by the driver 110, the controller 130 controls the communicator 160 to access the server device using the detected address information.

The communicator 160 communicates with an external server device using the address information stored on the disc 10. The communicator 160 may access the external server device using WiFi, IEEE, Bluetooth, a local area network (LAN), etc. The external server device may be a server device that is operated by a content maker, a reproducing device manufacturer, a display device manufacturer, etc. The controller 130 receives interested region information of the external server device through the communicator 160 and stores the interested region information in the storage unit 150. As described in the exemplary embodiment of FIG. 19, the interested region information may include information about a reference coordinate value, a width, a height, etc., for designating an interested region.

The controller 130 controls the data processor 120 to crop an interested region image from a video frame to enlarge the interested region image in a frame size using the interested region information stored in the storage unit 150. The video frame generated by the data processor 120 is provided to an external display device through the interface unit 140 to be displayed.

FIGS. 21A through 21C are views illustrating an operation of the reproducing device 100 of FIG. 20, according to an exemplary embodiment. As shown in FIG. 21A, if a UHD display device 200 is connected, the reproducing device 100 decodes UHD image data as it is to provide a video frame. Therefore, the UHD display device 200 displays an original video frame as it is.

As shown in FIGS. 21B and 21C, if an HD display device 300 is connected, the reproducing device 100 may determine whether to perform cropping according to video output mode information. FIG. 21B illustrates the video output mode information that has a value "No". Referring to FIG. 21B, although the HD display device 300 is connected, the reproducing device 100 provides an original video frame as it is.

FIG. 21C illustrates the video output mode information that has a value "Yes". Referring to FIG. 21C, the reproducing device 100 accesses a server device 1000 to receive interested region information. The reproducing device 100 crops and outputs a region according to the received interested region information.

Figure 21:
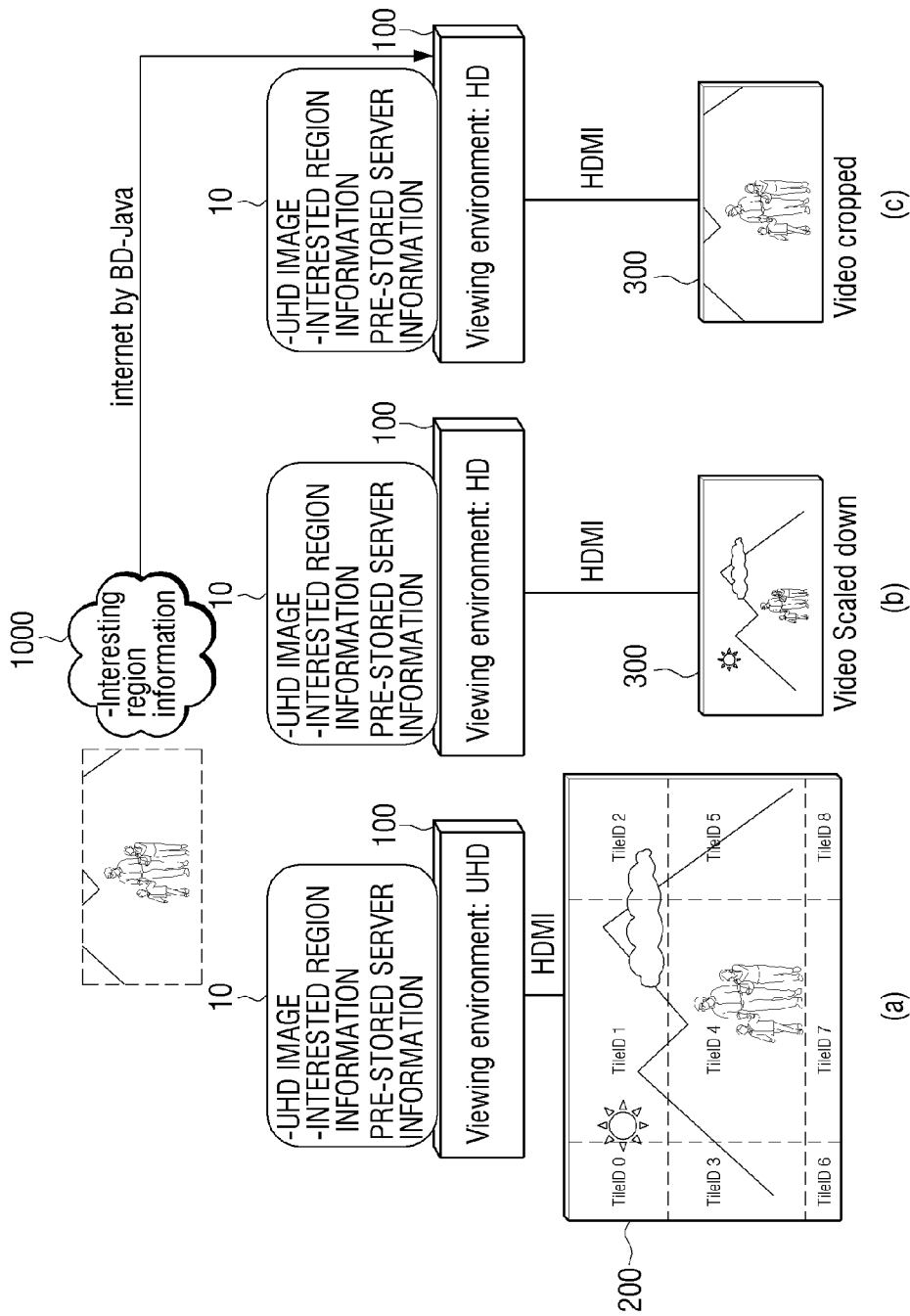
Figure 22:
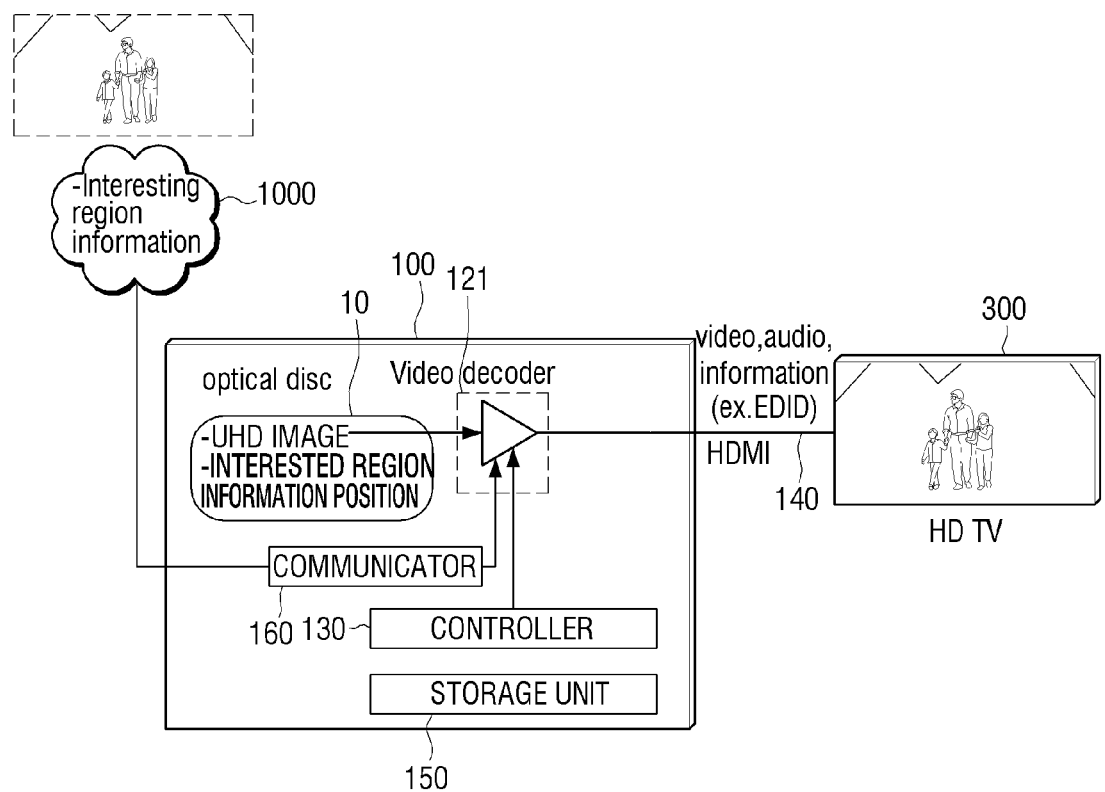

FIG. 22 is a view illustrating an internal structure and an operation of the reproducing device 100 of FIG. 21, according to an exemplary embodiment. Referring to FIG. 22, the communicator 160 of the reproducing device 100 receives the interested region information from the server device 1000 using a position of the interested region information stored on the disc 10, i.e., address information. The received interested region information is provided to the video decoder 121. The video decoder 121 crops an interested region image of a video frame including an interested region based on the interested region information. The cropped interested region image is enlarged in a frame size, and then provided to the HD display device 300.

In the above-described exemplary embodiments, a reproducing device that directly performs reproduction with respect to a recording medium has been illustrated and described. However, the reproducing device may be realized as various types of content processing devices such as a signal receiving device (for example, a set-top box) or a TV (i.e., display device) that receives and processes a signal including a high-resolution content through a broadcasting network or other communication networks, etc.

Figure 23:
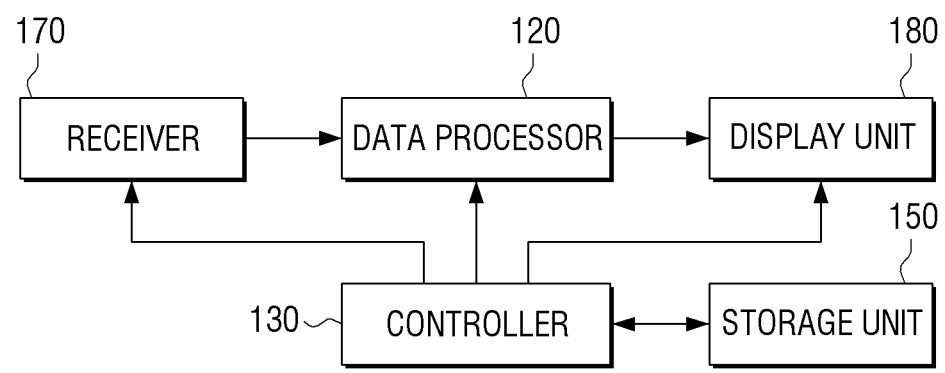
FIG. 23 is a block diagram illustrating a structure of a broadcasting receiving device for providing an interested region enlarging service according to an exemplary embodiment.

FIG. 23 is a block diagram illustrating a content processing device that is realized as a broadcasting receiving device, according to an exemplary embodiment. Referring to FIG. 23, the content processing device 100 includes a receiver 170, a data processor 120, a display unit 180, a controller 130 and a storage unit 150. The same elements of the present exemplary embodiment as those of the previous exemplary embodiments are denoted by the same reference numerals. Thus, their repeated descriptions are omitted.

The receiver 170 may have different structures according to broadcasting communication standards that are used in nations using the content processing device. There are currently various types of digital broadcasting standards such as Advanced Television System Committee (ATSC), Digital Video Broadcasting (DVB), Integrated Services Digital Broadcasting-Terrestrial (ISDB)-T, etc. For example, if the ATSC standard is used, the receiver 170 may include an antenna, a radio frequency (RF) down-converter, a demodulator, an equalizer, etc.

The receiver 170 receives a signal including a high-resolution content through a broadcasting network and transmits the high-resolution content to the data processor 120.

The data processor 120 may include a demultiplexer, an RS decoder, a deinterleaver, etc. Detailed structures for transmitting and receiving signals according to respective broadcasting standards are disclosed in detail in standard documents of the respective broadcasting standards. Thus, their detailed illustrations and descriptions are omitted.

The display 180 includes a display panel. A characteristic of the display panel is stored in the storage unit 150. Therefore, in the present exemplary embodiment, the controller 130 may immediately check the characteristic of the display panel using information recorded in the storage unit 150 without a need to check the characteristic of the display panel installed in an external device, i.e., a viewing environment.

If the display panel is used for a low resolution, and it is determined that the high-resolution content has been received through the receiver 170, the controller 130 controls the data processor 120 to perform operations according to the above-described exemplary embodiments. Therefore, a video frame of the high-resolution content is scaled down in a display size to be displayed, and a video frame including an interested region is replaced with an image of the interested region to be displayed.

The display unit 180 displays a video frame, to which a low-resolution object is added, through the display panel. The display unit 180 may further include a backlight unit or other driving circuits besides the display panel. However, the detailed illustration and description are omitted.

If a high-resolution content is provided through a broadcasting network as shown in FIG. 23, various types of additional information, such as interested region information, notification information, video output mode information, etc., may be recorded in various fields of a broadcasting signal and then transmitted. For example, the various types of additional information may be provided through a terrestrial virtual channel table (TVCT), an event information table (EIT), a program map table (PMT), a metadata stream, or the like.

Figure 24:
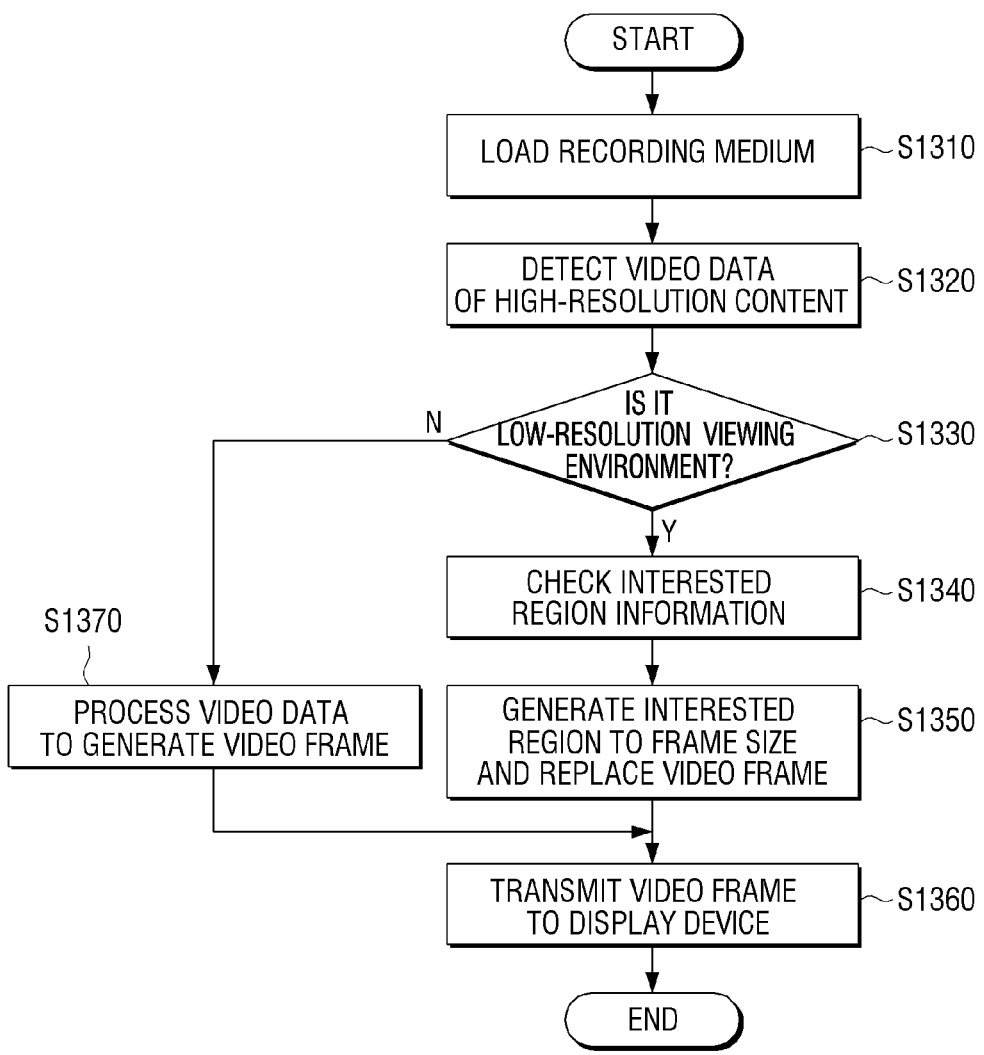
FIG. 24 is a flowchart illustrating a method of providing an interested region enlarging service according to an exemplary embodiment.

FIG. 24 is a flowchart illustrating a method of processing a content according to an exemplary embodiment. Referring to FIG. 24, in operation S1310, a recording medium is attached. In operation S1320, video data of a high-resolution content recorded on the recording medium is detected.

A reproducing device checks a viewing environment of the high-resolution content. If it is determined in operation S1330 that the viewing environment is a low-resolution viewing environment, the reproducing checks interested region information in operation S1340. In operation S1350, the reproducing device replaces a video frame including an interested region with an image of the interested region. For convenience, an operation of generating a video frame may be referred to a data processing operation.

If a bitstream of video data is divided into a plurality of pieces of tile data as in the above-described exemplary embodiment, the interested region information may include identification information of a tile corresponding to the interested region. In this case, the data processing operation may include: selectively decoding only the corresponding title data, and generating and scaling an image of the decoded data in a frame size.

Alternatively, the interested region information may be information that directly designates a coordinate of a region. In this case, the data processing operation may include: decoding all of data of all video frames, cropping a designated coordinate region, and acquiring an interested region image. The interested region information may be recorded on the recording medium, or may be input from an external server device, etc.

Therefore, in operation S1360, at least a portion of the video frame transmitted to a display device may be replaced with the interested region image and then transmitted.

In operation S1370, if the viewing environment is not the low-resolution viewing environment, the video data of the high-resolution content is processed as it is to generate a video frame. The generated video frame is transmitted to the display device in operation S1360.

A method performed by the reproducing device has been described in FIG. 24, but the reproducing device may be realized as a broadcasting receiving device such as a TV described above.

In the above-described exemplary embodiments, a disc is used as an example of a recording medium. In detail, a high-capacity recording medium that may store a UHD content like a BD, a holographic disc, etc., may be used. According to exemplary embodiments, various types of information may be recorded on the recording medium as described above.

A storage of the recording medium may be divided into a plurality of storage areas according to types of recorded information. For example, the recording medium may include first, second, third, fourth, and fifth storage areas. A high-resolution content is stored in the first storage area, and type information indicating a type of the high-resolution content is stored in the second storage area. Interested region information indicating an interested region included in a video frame of the high-resolution content is stored in the third storage area, and information indicating whether the interested region information exists is stored in the fourth storage area. Video output mode information for allowing whether to change a video frame using an interested region is stored in the fifth storage area.

If the interested region information is provided to an external server device as described, a seventh storage area in which address information of the external server device is recorded may be included instead of the fourth and fifth storage areas.

The reproducing device may provide an object adjusting service. An object adjusting service according to an exemplary embodiment will now be described.

Figure 25:
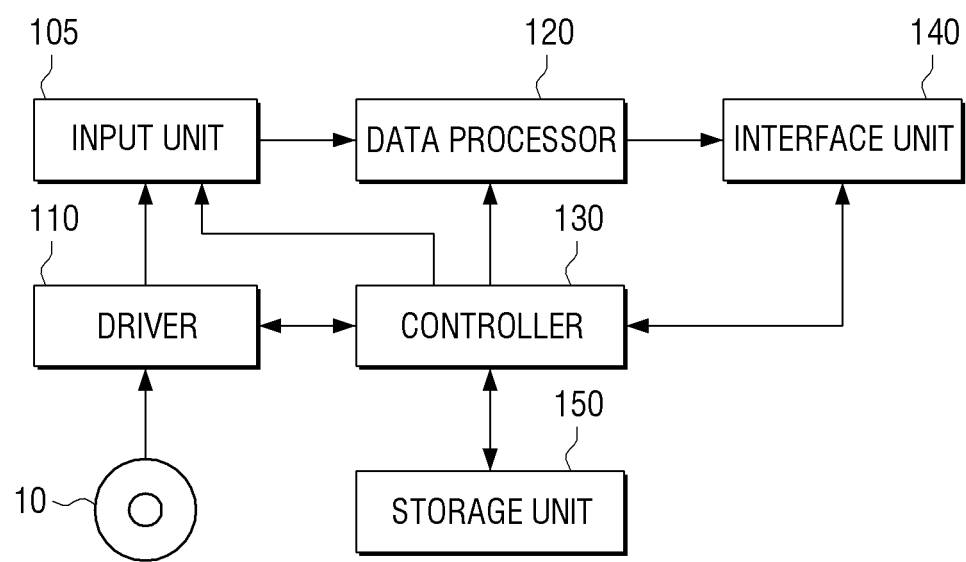
FIGS. 25 through 32 are views illustrating a reproducing device for performing an object adjusting service, according to various exemplary embodiments.

FIG. 25 is a block diagram illustrating a structure of a reproducing device that is realized as a reproducing device performing reproduction with respect to a recording medium and provides an object adjusting service, according to an exemplary embodiment. Referring to FIG. 25, the reproducing device includes an input unit 105, a data processor 120, a controller 130, a driver 110, an interface unit 140, and a storage unit 150.

The input unit 105 receives a high-resolution content. The input unit 105 may be realized as a type that receives a high-resolution content processed by the driver 110 or a type that receives a high-resolution content transmitted from an external broadcasting station or an external server device.

The data processor 120 processes the high-resolution content input through the input unit 105 to generate a video frame.

If a recording medium is installed, the driver 110 drives the recording medium to detect data.

If it is checked that the recording medium recording the high-resolution content has been attached in the driver 110, the controller 130 controls the driver 110 to detect the high-resolution content from the recording medium.

The high-resolution content detected by the driver 110 is input into the input unit 105, and the input unit 105 provides the high-resolution content to the data processor 120. As described above, the data processor 120 generates a video frame of the high-resolution content under control of the controller 130, forms a low-resolution object, and adds the low-resolution object to the video frame. A BD may store image data that is compressed by a codec complying with MPEG-2, H.264/MPEG-4 AVC, or VC-1 standard. The data processor 120 may decode image data by using the codec to generate a video frame.

The controller 130 controls the input unit 105 and the data processor 120 to process the high-resolution content. In detail, the controller 130 checks an output resolution f a display panel that is to display the video frame. If the reproducing device is realized as a reproducing device that performs reproduction with respect to a recording medium, the controller 130 checks an output resolution of a display panel of an external display device to which the reproducing device is connected.

If the reproducing device is realized as a display device including a display panel, the controller 130 checks the output resolution based on characteristic information of the display panel.

If the output resolution of the display panel is a low resolution, the controller 130 controls the data processor 120 to scale down the video frame of the high-resolution content, form an object such as subtitles to be added to the video frame, menus, etc., as a low-resolution object, and add the object to the video frame. As the low-resolution object is provided, the subtitles may be displayed in sizes identifiable by a user.

A low resolution refers to a relative lower resolution than a resolution of a content. For example, if the content is a UHD content having a resolution between 4000 (3840×2160) and 8000 (7680×4320), an output resolution of an HD display device having a resolution of 1920×1080 corresponds to a low resolution. Hereinafter, a high-resolution content will be described as a UHD content, and a low-resolution display panel or device will be described as a display panel or device having an HD resolution. However, the exemplary embodiments are not limited thereto. If a resolution of a content is higher than a display panel or device, the present exemplary embodiment may be applied as is.

The video frame to which the low-resolution object has been added by the data processor 120 is provided to the display panel through the interface unit 150 to be displayed.

The interface unit 150 is connected to the display device including the display panel. In detail, the interface unit 150 may be realized as an HDMI.

Therefore, although the high-resolution content is displayed through a display panel having a relatively low resolution, sizes of subtitles or menus may be prevented from being reduced in proportion to the resolution of the display panel. Therefore, the user may easily identify the subtitles or menus.

The storage unit 150 stores an O/S or various types of programs or data necessary for an operation of the reproducing device. The storage unit 10 may also store information such as the output resolution of the display device to which the reproducing device is connected. The output resolution information may be received from the HD display device 300 and stored in the storage unit 150. In other words, the controller 130 may store various types of data, which are received from the display device through the interface unit 140, in the storage unit 150.

The controller 130 may receive display characteristic information from the display device through the interface unit 150. As described above in the above-described exemplary embodiment, the display characteristic information may include various types of information such as an output resolution, a pixel count, a display size, a viewing distance, a device model name, etc., of the display panel of the display device. The display characteristic information has been described in detail in the above-described exemplary embodiment. Thus, repeated description is omitted.

The controller 130 stores and uses the display characteristic information in the storage unit 150. If the display device and the reproducing device are connected to each other according to a method such as an HDMI, display characteristic information, such as screen size information, may be automatically acquired and stored as viewing environment information in the reproducing device. If an analog connection method is used or the display characteristic information is not acquired due to other reasons, the viewing environment information may be generated as a value set in the manufacture of the reproducing device or a value set by the user and stored in the storage unit 150.

The controller 130 may check the output resolution of the display panel on which the video frame of the high-resolution content is to be displayed, using the display characteristic information stored in the storage unit 150. According to another exemplary embodiment, the reproducing device may provide a UI through which the output resolution may be determined. The UI may be displayed through a touch screen panel of the reproducing device, the display device, etc. The output resolution input through the UI by the user is stored in the storage unit 150.

A method of generating a low-resolution object may be variously realized according to exemplary embodiments. For example, a low-resolution object may be stored separately from a high-resolution object in a recording medium or may be provided from a source device or a medium different from the recording medium. Alternatively, the high-resolution object may be converted into a low-resolution object, and then the low-resolution object may be used. A structure and an operation of the data processor 120 may be changed according to exemplary embodiments. A method of generating a low-resolution object according to various exemplary embodiments will now be described in detail.

Figure 26:
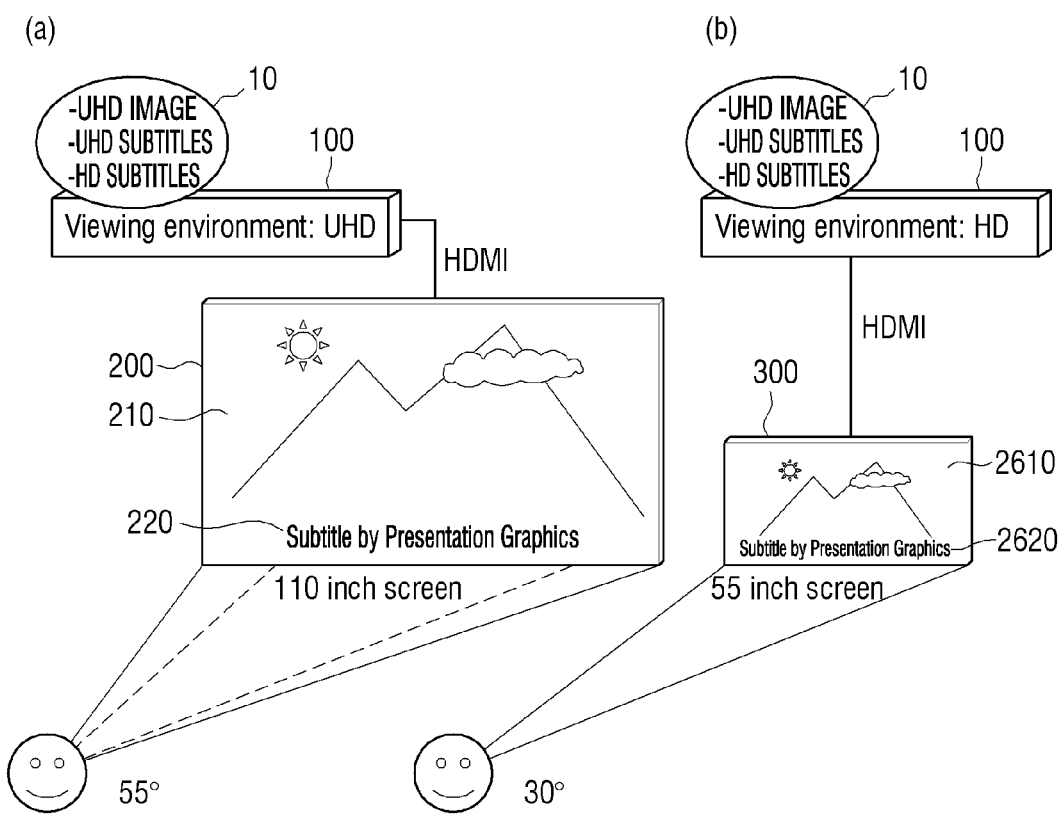

FIGS. 26A and 26B are views illustrating an operation of a reproducing device 100 that provides an object adjusting service, according to an exemplary embodiment.

Referring to FIGS. 26A and 26B, a UHD image, UHD subtitles, and HD subtitles are stored in a disc 10. The UHD image may refer to a high-resolution content, the UHD subtitles may refer to a high-resolution object, and the HD subtitles may refer to a low-resolution object. As described above, an object may include various types of graphic menus besides subtitles. However, for convenience of description, a process of processing subtitles will be mainly described.

If the disc 10 is attached in the reproducing device 100, the reproducing device 100 checks display characteristic information of a display device that is connected to the reproducing device 100. FIG. 26A illustrates a UHD display device 200 that is connected to the reproducing device 100, and FIG. 26B illustrates an HD display device 300 that is connected to the reproducing device 100.

If the UHD display device 200 is connected as shown in FIG. 26A, the controller 130 of the reproducing device 100 adds UHD subtitles 220 to an image frame 210 having a UHD resolution, and provides the image frame 210 to which the UHD subtitles 220 have been added. Therefore, a user may view a high-resolution content through a wide screen (of about 110 inches) of the UHD display device 200

The UHD image 210 is formed to be appropriate for a screen size of the UHD display device 200. However, even when a viewer views the UHD image 210 through the UHD display device 200, the viewer may view the UHD image 210 through the UHD display device 200 at the same distance from that at which the viewer views the UHD image 210 through the HD display device 300. Since the screen size is increased at the same viewing distance, a user who views the UHD image 210 through the UHD display device 200 may secure a wide viewing angle (about 55°). If the UHD display device 200 has the same viewing distance as the HD display device 300, subtitles or menus may not be increased to four times (even though a screen is increased). In other words, the subtitles 220 may be formed in sizes that may be conveniently viewed by the viewer at the same viewing distance as that of the HD display device 300.

Therefore, according to a related art, if a UHD image and UHD subtitles or menus are output from the UHD display device 200, the UHD subtitles or menus are reduced to about 1/4. Thus, in the related art, the viewer may not conveniently read the UHD subtitles or menus. However, if subtitles or menus are adjusted by the reproducing device 100 to be used for a low resolution, sizes of the subtitles or menus may be appropriately maintained.

FIG. 26B illustrates the HD display device 300 that is connected to the reproducing device 100. In this case, the reproducing device 100 scales down a UHD image to be appropriate for a display size of the HD display device 100. The reproducing device 100 mixes subtitles with the downscaled video frame and provides the video frame to the HD display device 300. The HD display device 300 receives a uncompressed video frame through an HDMI and outputs the uncompressed video frame on a screen. As a result, a video frame 2610 of the UHD image is scaled down to be appropriate for an HD size. Also, since HD subtitles 2620 are used, the HD subtitles 2620 have the same sizes as original subtitles or are not greatly scaled down. Therefore, the user may easily identify the subtitles.

Various types of information may be stored on the disc 10, i.e., a recording medium, so that the reproducing device 100 performs the above-described operation.

In detail, in the present exemplary embodiment, the disc 10 may store a high-resolution content, type information indicating a type of the high-resolution content, a first object, a first navigation program for using the first object, a second object, and a second navigation program for using the second object.

The high-resolution content refers to a content such as the above-described UHD image. The type information is information indicating whether the content is a UHD content or an HD content.

As described above, the reproducing device 100 requires display characteristic information to check whether a screen to display the content is a high-resolution screen or an HD screen. The display characteristic information may be regarded as information necessary for selecting and outputting an object appropriate for the screen, but the type information may be information that may be selectively recorded.

Also, the first object may refer to a high-resolution object, i.e., a UHD object, and the second object may refer to a low-resolution object, i.e., an HD object. Each of the first and second objects may include at least one of subtitles and menus. The first object may be stored as an image data form but is not limited thereto. In other words, the first object may be stored as a text form.

The first navigation program refers to a program that navigates the controller 130 to recognize that the first object is the high-resolution object and use the first object. The second navigation program refers to a program that navigates the controller 130 to recognize that the second object is the low-resolution object and use the second object.

The controller 130 may check a type of a content of the disc 10 using the type information. The controller 130 checks an output resolution based on display characteristic information of the display device 200 or 300 to determine whether to normally output the content recorded on the disc 10 through the UHD display device 200 or the HD display device 300.

If a connected display device is the UHD display device 200, the controller 130 selects and processes the first object using the first navigation program. If the connected display device is the HD display device 300, the controller 130 selects and processes the second object using the second navigation program. A navigation program refers to a program that is written and provided by a content maker so as to select and output a UHD object or an HD object using a navigation command for managing a disc. The content maker may provide navigation information including an identifier for identifying whether each of subtitles is an HD subtitle or a UHD subtitle, instead of the navigation program. Therefore, according to another exemplary embodiment, instead of the first and second navigation programs, first and second navigation information may be recorded on the disc 10

As described above, the type information is option information that may be selectively recorded. Thus, the content maker may not record the type information of the content.

If the content maker does not record the type information of the content, the controller 130 may perform the above-described operation with respect to objects except an image content, based on information reflecting a characteristic of the display device.

For example, if the reproducing device 100 is connected to the HD display device 300, the controller 130 controls the data processor 120 not to determine whether the content is a UHD content or an HD content, and to add HD subtitles or HD subtitles to a video frame. If the reproducing device 100 is connected to the UHD display device 200, the controller 130 controls the data processor 120 to select an object such as subtitles or menus as a UHD object and add the UHD object to the video frame. As a result, if the type information does not exist, the controller 130 does not process an image but adjusts only an object according to a screen size.

Figure 27:
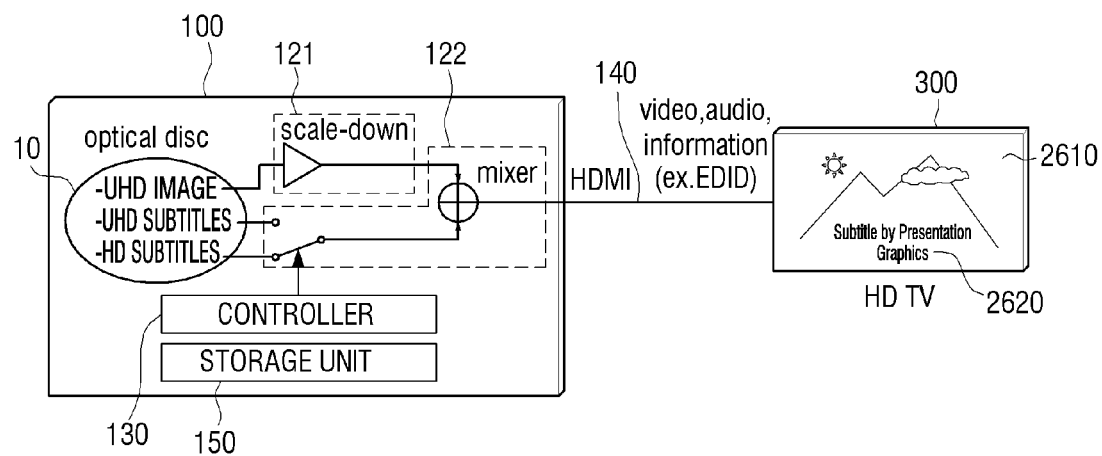

FIG. 27 is a view illustrating an operation of the reproducing device 100 according to the above-described exemplary embodiment. Referring to FIG. 27, the data processor 120 of the reproducing device 100 includes a scaler 121 and a mixer 122.

The scaler 121 scales a video frame of a high-resolution content stored on the disc 10. The mixer 122 selectively detects one of first and second objects stored on the disc 10, and mixes the selected object with the video frame scaled by the scaler 121.

If a display device is connected to the reproducing device 100 through the interface unit 140, the controller 130 receives display characteristic information and stores the display characteristic information in the storage unit 150. As described above, the display characteristic information may be EDID, etc. If it is determined that the HD display device 300 is connected to the reproducing device 100, based on the display characteristic information, the controller 130 controls the scaler 121 to scale down the video frame of the high-resolution content according to an output resolution of the HD display device 300.

The controller 130 loads the second navigation program stored on the disc 10 into the storage unit 150. The controller 130 may include a microcomputer or a central processing unit (CPU), and the storage unit 150 may include various types of memories such as a read only memory (ROM), a random access memory (RAM), a flash memory, a hard disc drive (HDD), etc. The controller 130 controls the mixer 122 to detect the second object from a storage position of the second object by using the second navigation program and mix the second object with the video frame scaled by the scaler 121. The interface unit 140 transmits the video frame, which has been mixed with the second object by the mixer 122, to the HD display device 300. Therefore, the HD display device 300 may display a screen on which a low-resolution object 2620 is added to a down-scaled vide frame 2610 of the high-resolution content.

If it is determined that the UHD display device 200 is connected to the reproducing device 100, the controller 130 controls the scaler 121 to scale a UHD image frame according to a size of the UHD display device 200, and controls the mixer 122 to mix the first object, i.e., the UHD object, with the UHD image frame.

As described above, according to an exemplary embodiment, objects, such as subtitles or menus, are respectively provided as a high-resolution object and a low-resolution object, and then stored on the disc 10. The reproducing device 100 appropriately selects such an object according to an output resolution to increase discrimination.

A storage capacity of the disc 10 may lack storage to store all of the high-resolution and low-resolution objects. Therefore, the low-resolution object may be provided using an additional server device.

FIGS. 28A and 28B are views illustrating an operation of the reproducing device 100 that provides an object adjusting service, according to another exemplary embodiment. In the exemplary embodiment of FIGS. 28A and 28B, a recording medium may store a high-resolution content, type information indicating a type of the high-resolution content, a high-resolution object, and address information. The additional information refers to address information about a server device that provides a low-resolution object. The address information may be stored as identification information such as an URL, an IP address, a server name, etc., of the server device or a JAVA program. In general, a time when releasing a movie using a recording medium of an optical disc type may be a time that does not become 1 month after the movie is shown in a theater. It may be difficult to form subtitles or menus corresponding to various display environments within such a short time. Therefore, after the optical disc is first released, the subtitles or menus may be provided using the server device FIG. 28A illustrates the reproducing device 100 that plays a UHD content and is connected to the UHD display device 200. In this case, UHD subtitles, i.e., a high-resolution object, stored on the disc 10 are used as they are. Therefore, the UHD display device 200 displays a UHD image frame 210 to which UHD subtitles 220 have been added.

FIG. 28B illustrates the reproducing device 100 that plays a UHD content and is connected to the HD display device 300. In this case, the reproducing device 100 accesses the server device 1000 using the address information stored on the disc 10 to receive the low-resolution object. The received low-resolution object is added to a video frame that has been scaled down, and then provided to the HD display device 300. Therefore, HD subtitles 2620 and a video frame 2610 matching with an output resolution and a display size of the HD display device 300 are displayed.

Figure 28:
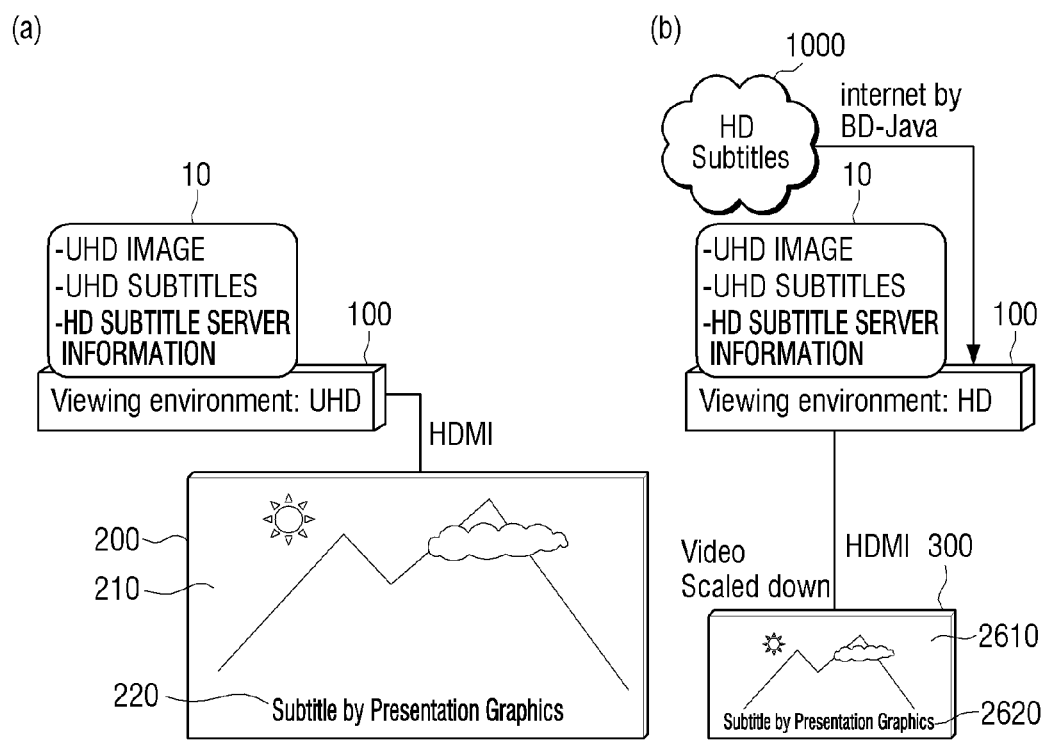
Figure 29:
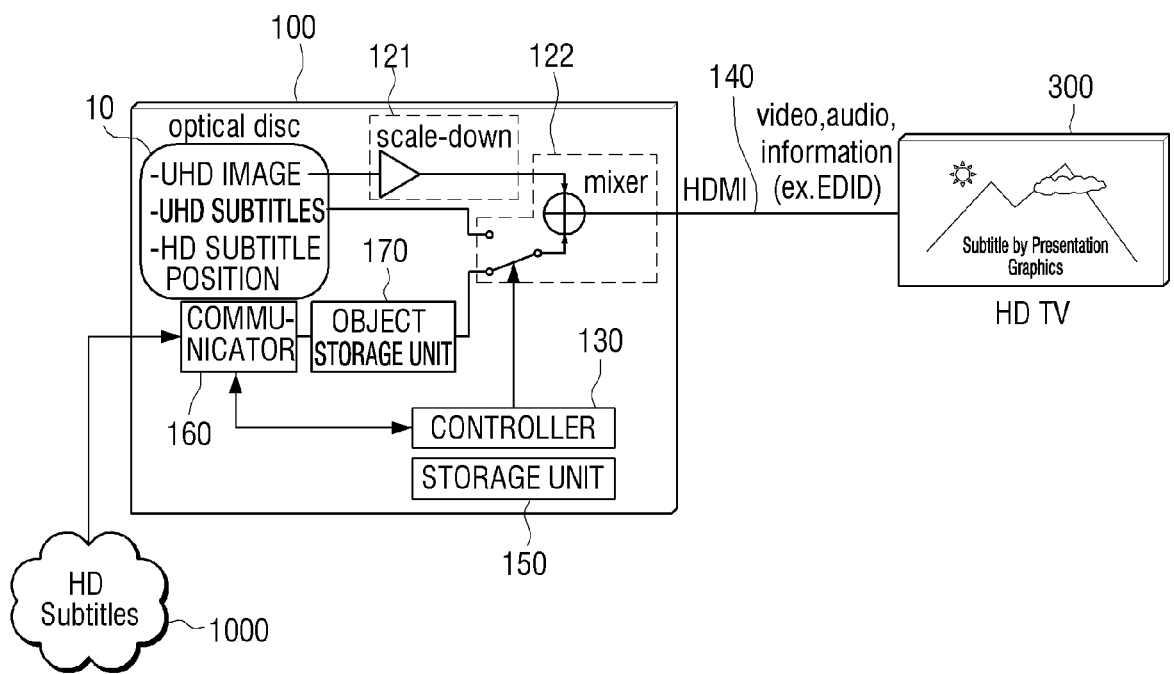

FIG. 29 is a view illustrating an internal structure of the reproducing device 100 of FIG. 28, according to an exemplary embodiment. Referring to FIG. 29, the reproducing device 100 further includes the communicator 160 and an object storage unit 170, besides the input unit 105, the data processor 120, the controller 130, the driver 110, the interface unit 140, and the storage unit 150.

The communicator 160 communicates with an external server device using the address information stored on the disc 10. The communicator 160 may access the external server device using WiFi, IEEE, Bluetooth, an LAN, etc. The external server device may be a server device that is operated by a content maker, a reproducing device manufacturer, a display device manufacturer, etc.

If a low-resolution object is downloaded from the server device, the communicator 160 stores the low-resolution object in the object storage unit 170. The object storage unit 170 is provided separately from the storage unit 150 in FIG. 29, but may be included in the storage unit 150.

The data processor 120 may include the scaler 121 and the mixer 122. If it is checked that the output resolution is a low resolution based on display characteristic information, the controller 130 controls the communicator 160 to receive the low-resolution object from the server device 1000 using the address information. Therefore, if the low-resolution object is received and stored in the object storage unit 170, the controller 130 controls the scaler 121 to scale down a video frame of a content. The controller 130 controls the mixer 122 to add the low-resolution object stored in the object storage unit 170 to the down-scaled video frame.

If it is checked that the output resolution is a high resolution, the controller 130 controls the mixer 122 to mix UHD subtitles stored on the disc 10 with a UHD image frame.

Therefore, objects, such as subtitles or menus, may be displayed in forms matching with an output characteristic of a display device.

Differently from the above-described exemplary embodiments, a high-resolution object may be scaled to generate a low-resolution object.

FIGS. 30A, 30B, and 30C are views illustrating the operation of the reproducing device 100 that provides an object adjusting server, according to another exemplary embodiment. According to the present exemplary embodiment, a recording medium 10, such as a disc, may store a high-resolution content, type information indicating a type of the high-resolution content, a high-resolution object, and object output mode (or subtitle or menu output mode) information.

The object output mode information is information indicating whether the high-resolution object is allowed to be scaled. In other words, the object output mode information may include a bit value corresponding to "Yes" or a bit value corresponding to "No". The object output mode information may be determined by an intention of a content maker. In other words, a maker may not want to determine and process a difference between a content and a viewing environment in the reproducing device 100. An element that controls the maker not to scale an object may be provided in consideration of this case, and the object output mode information may operate as the element.

FIG. 30A illustrates the UHD display device 200 that is connected to the reproducing device 100. In this case, the controller 130 adds UHD subtitles 220 to a UHD image frame 210 without checking the object output mode information and provides the UHD image frame 210, to which the UHD subtitles 220 have been added, to the UHD display device 200.

FIGS. 30B and 30C illustrate the HD display device 300 that is connected to the reproducing device 100. In this case, the controller 130 checks the object output mode information. If the object output mode information has the value corresponding to "No", the controller 130 scales down a high-resolution object 2620 by 1/4 times, adds the down-scaled high-resolution object 2620 to the UHD image frame 210, and provides the UHD image frame 210, to which the down-scaled high-resolution object 2620 has been added, to the HD display device 300. In this case, since subtitles are scales at the same ratio as an image frame as shown in FIG. 30B, the subtitles are displayed in very small sizes.

If the object output mode information has the value corresponding to "Yes", the controller 130 scales down the high-resolution object in consideration of an output resolution and a display size of the HD display device 300. In this case, as shown in FIG. 30C, subtitles 2620 are converted in appropriate sizes, added to the video frame 2610 that has been scaled down, and then provided to the HD display device 300.

Figure 30:
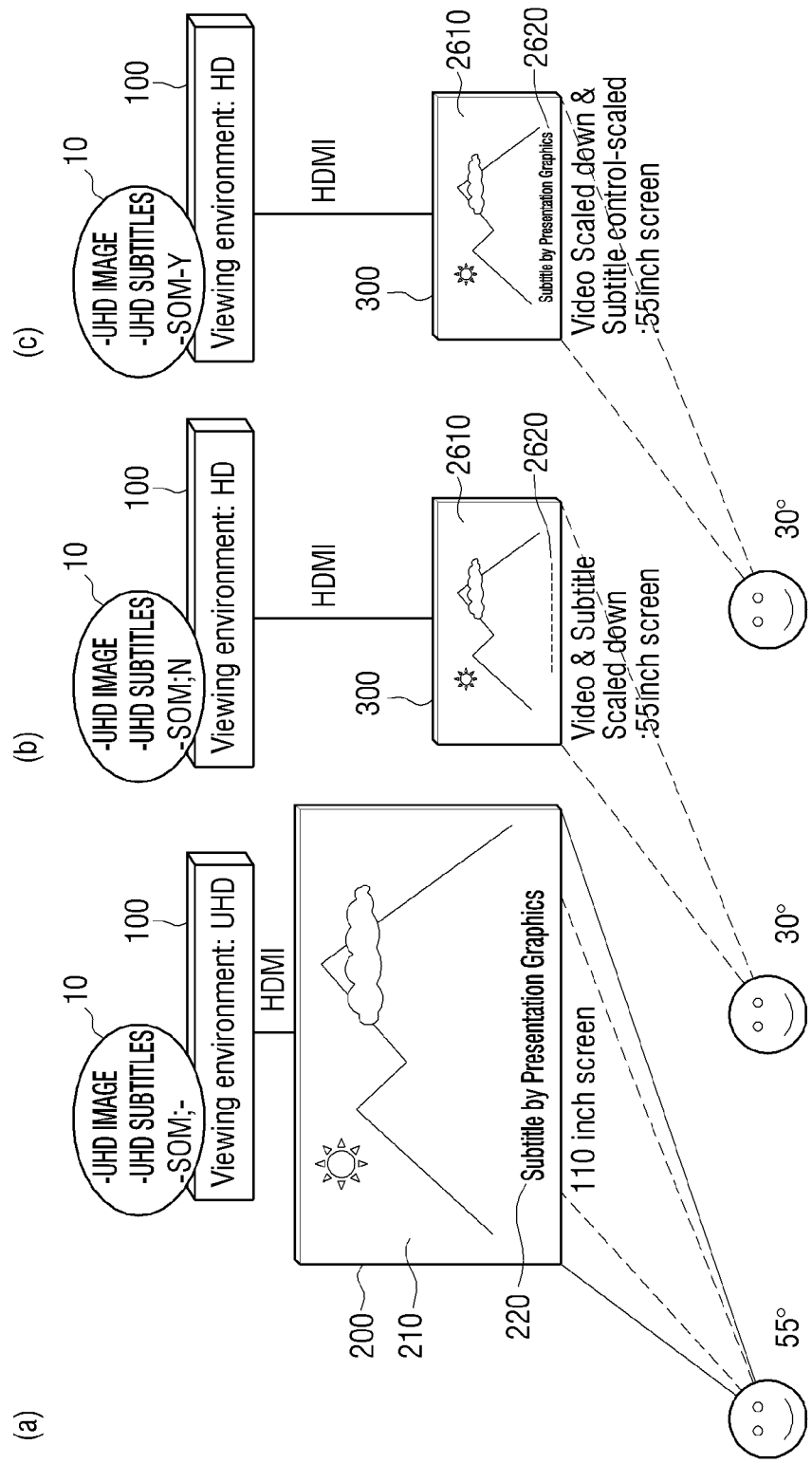
Figure 31:
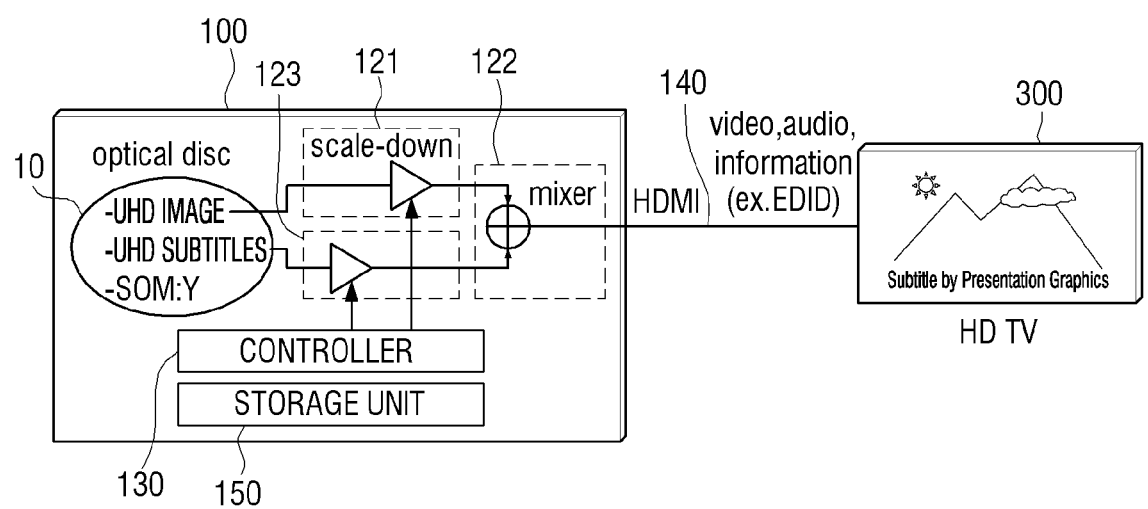

FIG. 31 is a view illustrating an internal structure of the reproducing device 100 of FIG. 30, according to an exemplary embodiment. Referring to FIG. 31, the data processor 120 includes a first scaler 121, a mixer 122, and a second scaler 123.

The first scaler 121 scales a video frame of a high-resolution content. The second scaler 123 scales a high-resolution object. The mixer 122 mixes the video frame output from the first scaler 121 with the object output from the second scaler 123.

If it is checked that an output resolution of a display panel is a low resolution, based on display characteristic information, the controller 130 checks object output mode information. If the object output mode information has a value corresponding to "Yes", the controller 130 determines that the object has been allowed to be scaled. Therefore, the controller 130 controls the data processor 120 to respectively scale and mix the video frame and the high-resolution object of the high-resolution content. A scaling ratio of the high-resolution object may be determined based on a display size of the display device and an object size. This will be described in detail later with reference to the attached drawings.

If the object output mode information has a value corresponding to "No", the controller 130 determines that the object has not been allowed to be scaled. Therefore, the controller 130 controls the data processor 120 to scale down a video frame of a high-resolution content and mix the down-scaled video frame with the high-resolution object.

If the high-resolution object is scaled down, the controller 130 may adjust a down-scaling ratio not to excessively scale down the high-resolution object.

Figure 32:
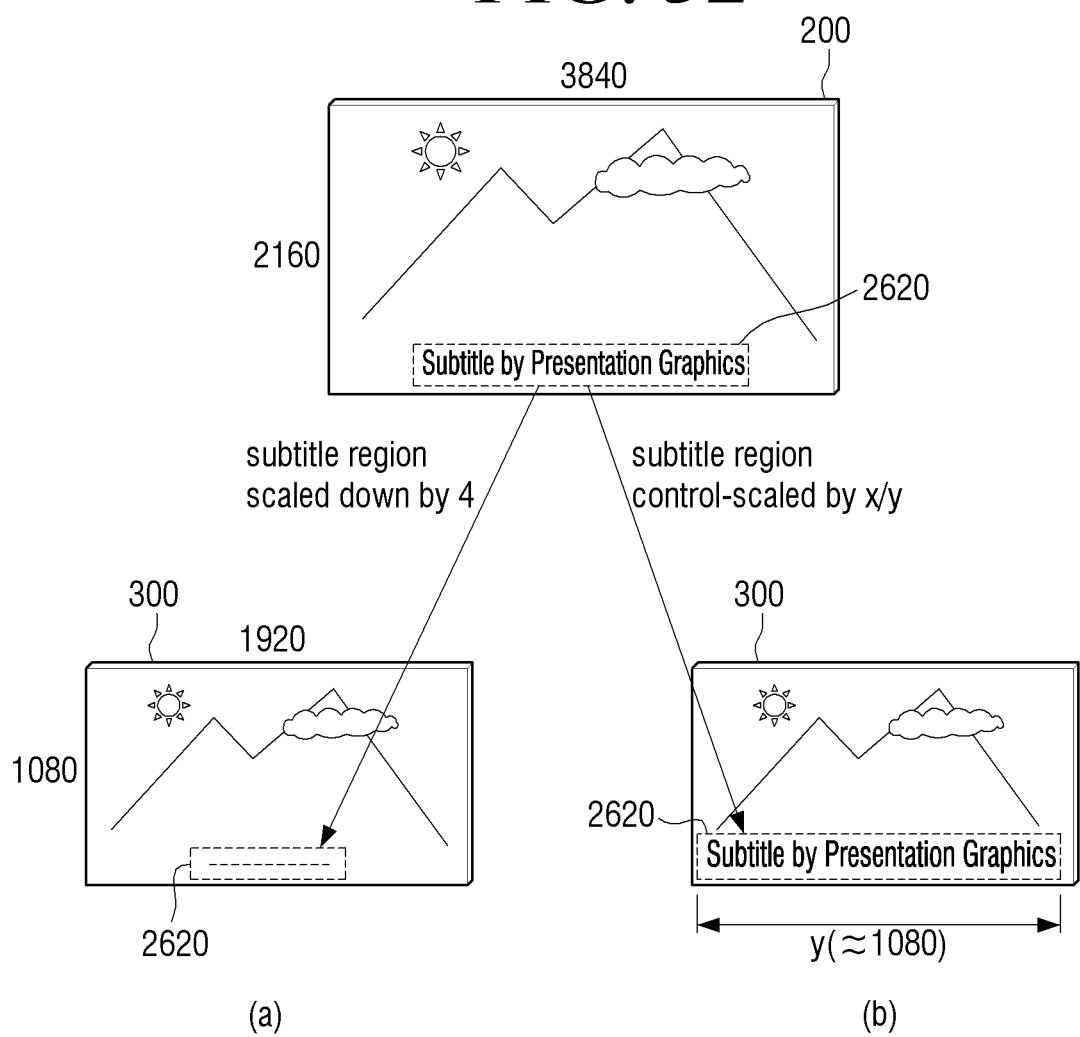

FIGS. 32A and 32B are views illustrating a method of adjusting a scaling ratio of an object in consideration of a display size according to an exemplary embodiment. The controller 130 of the reproducing device 100 may perform a scale control operation with respect to an object such as subtitles or menus. If the scale control operation refers to an operation in which a content maker scales the object with changing the scaling ratio to maximally display the object on a screen of the HD display device 300 using sizes and position information of subtitles provided based on a UHD screen.

If a down-scaling ratio is set to be low, e.g. 4, the subtitles 2620 are displayed very small as shown in FIG. 32A. If the down-scaling ratio is set to be too low, a width of high-resolution subtitles is wider than a width of the HD display device 300 Thus, some of the subtitles may be cut. Therefore, the controller 130 may compare an actual width of high-resolution subtitles with a horizontal width of the HD display device 200 to adjust the down-scaling ratio.

As shown in FIGS. 32A and 32B, if a width of the subtitles 220 is x in the UHD display device 200, and x is sufficiently small, the controller 130 may set the down-scaling ratio to 1:1. Therefore, subtitles may be viewed in actual sizes in the HD display device 300. However, if x is sufficiently great, the controller 130 may scale the subtitles at a down-scaling ratio of y/x, and add the down-scaled subtitles to a video frame. A size of y may be determined as a slightly smaller value than the horizontal width of the HD display device 300. In FIG. 32B, y is set to about 1080 pixels. Therefore, whole subtitles may not be cut and may be displayed in sizes easily identifiable by a user.

As described above, the controller 130 may adaptively determine a scaling ratio in consideration of a display size and an object size.

Also, in the above-described exemplary embodiments, a disc has been used as an example of a recording medium. A high-capacity recording medium that may store a UHD content like a BD, a holographic disc, etc., may be used. Such a recording medium may record various types of information, as described above according to exemplary embodiments. In the above-described exemplary embodiment, the first and second navigation programs may be stored on the recording medium. However, instead of program forms, navigation information such as an identifier may be stored on the recording medium and then provided to the controller 130.

A storage area of the recording medium may be divided into a plurality of storage areas according to types of recorded information. For example, the recording medium may include a first storage area in which a high-resolution content is stored, a second storage area in which type information indicating a type of the high-resolution content, a third storage area in which a high-resolution object is stored, and a fourth storage area in which additional information for displaying an object is stored.

The additional information may vary according to exemplary embodiments. For example, according to exemplary embodiments, the additional information may include at least one or more information of a first navigation program or navigation information, a low-resolution object, a second navigation program or navigation information for indicating the low-resolution object, address information about a server device providing the low-resolution object, and object output mode information indicating whether scaling control is to be performed with respect to a high-resolution object. Also, the recording medium may additionally store a type of each stored information, an identifier of each information, metadata recording a position, etc. of a storage area storing each information, etc.

Figure 33:
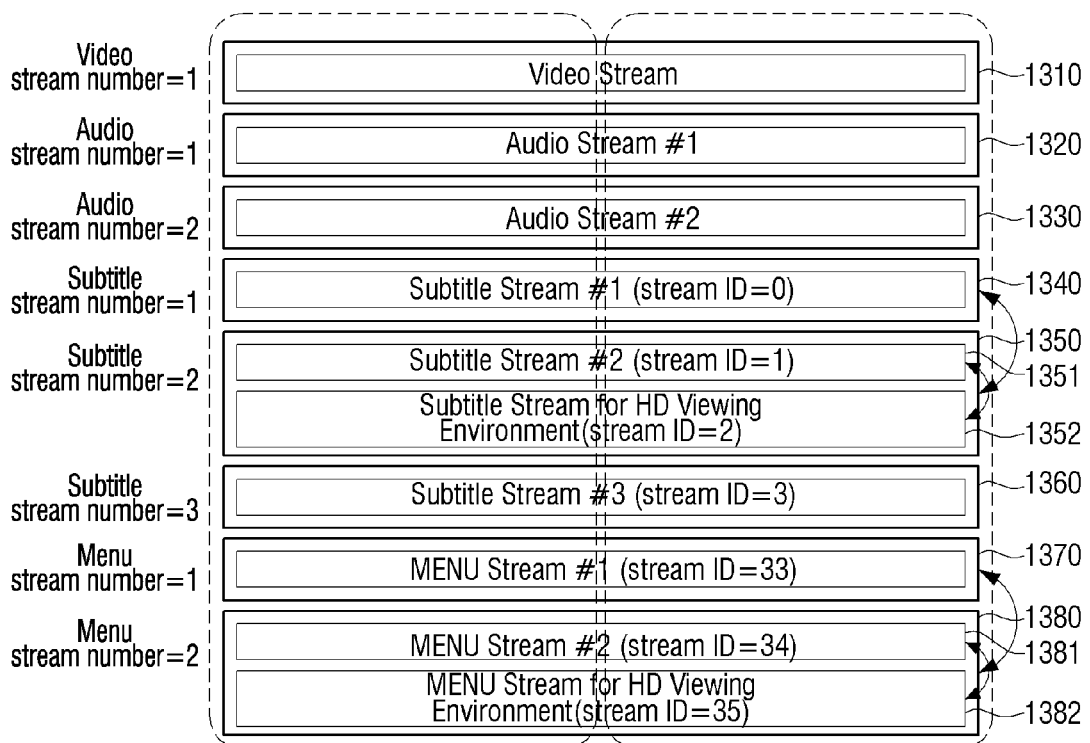
FIGS. 33 through 35 are views illustrating a structure of data stored on a recording medium for performing an object adjusting service, according to various exemplary embodiments.

FIG. 33 is a view illustrating a stream structure of a recording medium that stores a low-resolution object such as HD subtitles or HD menus, according to an exemplary embodiment.

Referring to FIG. 33, a recording medium 10 according to the present exemplary embodiment further includes a subtitle stream #2 1350, UHD subtitle data 1351 in a men stream #2 1380, HD subtitle data 1352 except UHD menu data 1381, and HD menu data 1382. Therefore, a reproducing device may selectively output the subtitle stream #2 of the recording medium 10 and a UHD object or an HD object in the menu stream #2 1380 according to a viewing environment.

Figure 34:
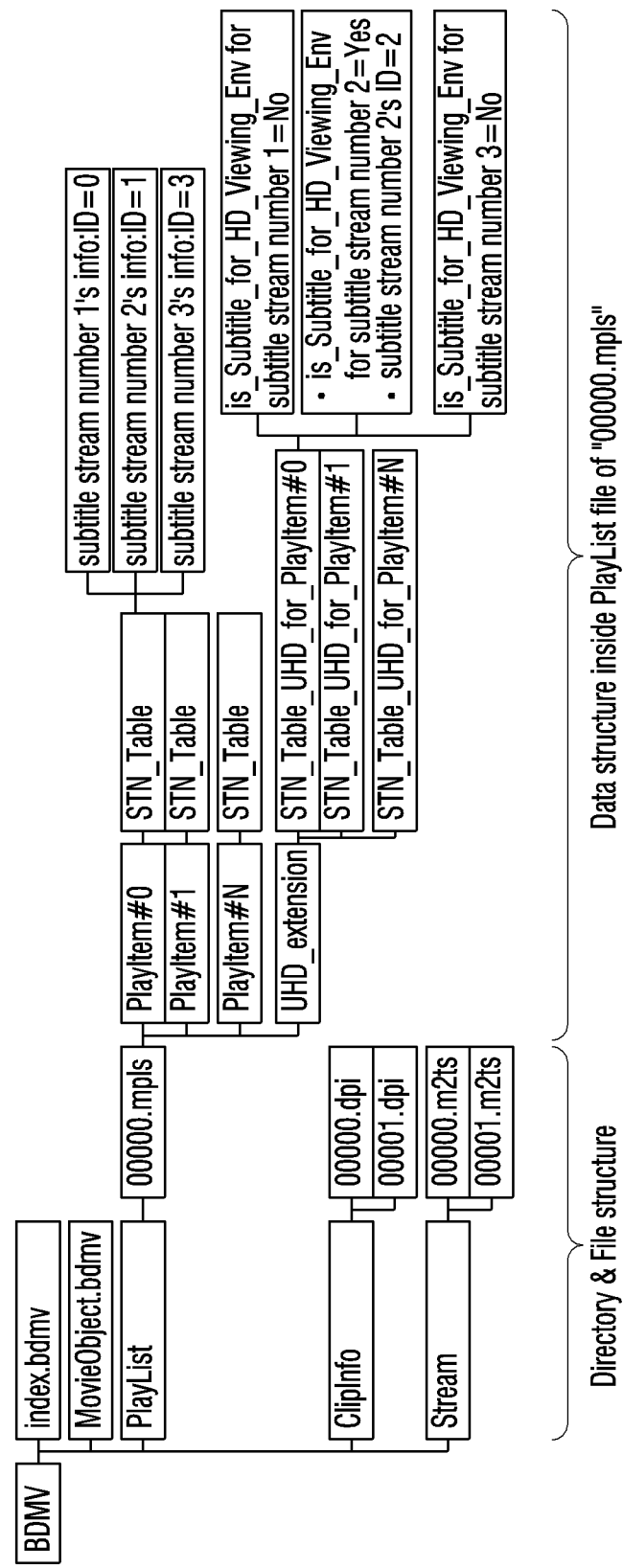

FIG. 34 is a view illustrating an information structure of a recording medium that stores a low-resolution object as shown in FIG. 33, according to an exemplary embodiment.

Referring to FIG. 34, information, such as "is_Subtitle_for_HD_Viewing", is provided in a playlist layer of the recording medium to display whether HD viewing environment subtitles of UHD play items exist.

A reproducing device having a structure as illustrated in FIG. 27 may process subtitles or menus using a recording medium having a data structure as illustrated in FIGS. 32A through 34.

The data structure of FIGS. 32A through 34 will be described as an example. A current play item #0 is played. A user may select a subtitle stream number 2 through a remote controller or other input units. In this case, the reproducing device 100 selects the subtitle stream number 2 according to a selection of the user. The reproducing device 100 determines whether a current output situation is an HD viewing environment. In the present exemplary embodiment, a viewing environment is an HD viewing environment. A method of determining the viewing environment has been described above. Thus, repeated description is omitted.

In this case, the reproducing device 100 analyzes STN_Table of the play item #0 of file 00000.mpls to check that a stream ID of subtitles to be played is 1. If the viewing environment is a UHD viewing environment, an operation of the reproducing device 100 for selecting subtitles is completed. However, if the viewing environment is an HD viewing environment, the reproducing device 100 proceeds to a next operation. In other words, the reproducing device 100 checks UHD extension of the file 00000.mpls to checks whether subtitles used for the HD viewing environment exist. Also, reproducing device 100 finally determines a stream ID that is to be used for playing. The reproducing device 100 checks whether information "is_Subtitle_for_HD_Viewing" of a playlist information structure has a value corresponding to "Yes" to determine that a stream ID 2 is to be played if the information "is_Subtitle_for_HD_Viewing" has the value corresponding to "Yes". If the information "is_Subtitle_for_HD_Viewing" has a value corresponding to "No", the reproducing device 100 determines that a stream ID 1 is to be played. In FIG. 34, "is_Subtitle_for_HD_Viewing" of the stream ID 2 has the value corresponding to "Yes", the reproducing device 100 plays the stream ID 2. As a result, HD subtitles are added to a video frame and then output.

As described above, an object such as subtitles or menus may be made as a bitmap, and then stored on a recording medium. However, exemplary embodiments are not limited thereto. Therefore, the object may be stored as a text form.

Figure 35:
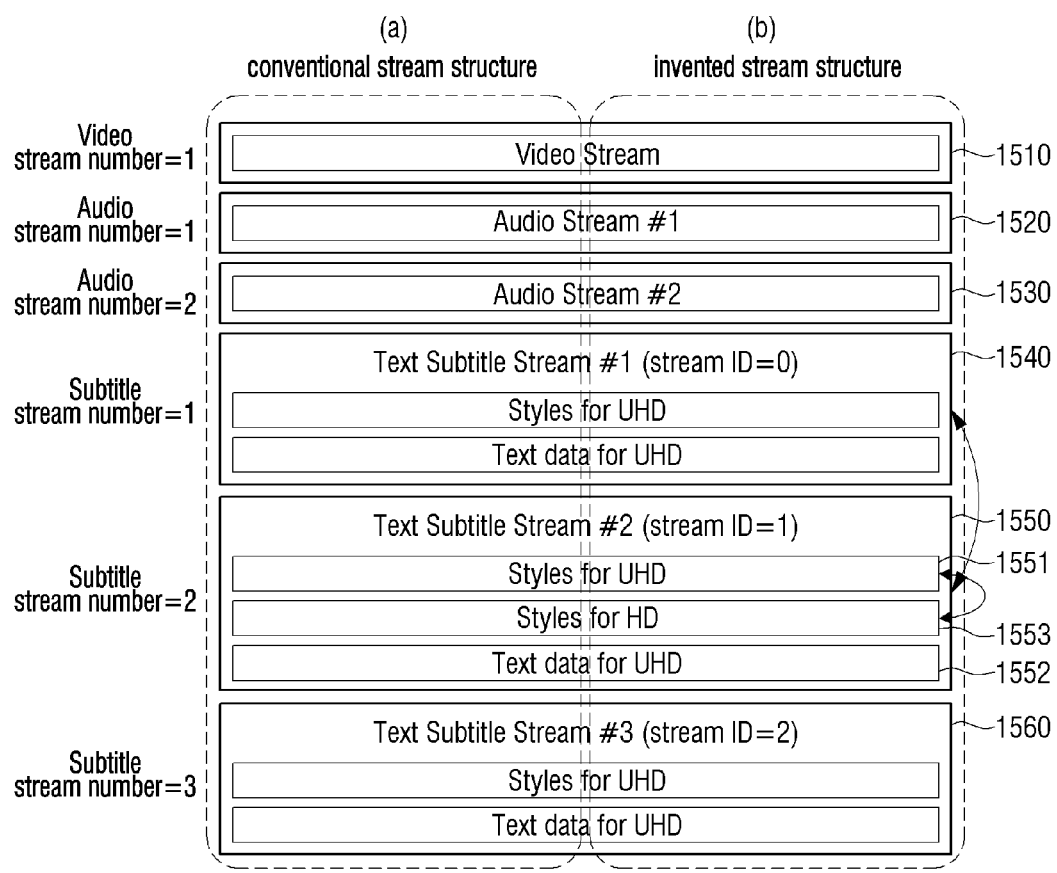

FIGS. 35A and 35B are views illustrating stream structures of a recording medium that stores subtitles and menus made in a text form. Referring to FIGS. 35A and 35B, a recording medium 10 according to the present exemplary embodiment stores a video frame 1510, audio streams #1 and #2 1520 and 1530, a subtitle stream #1 1540, and a subtitle stream #3 1560, as in a related art stream structure. However, a subtitle stream #1550 is different.

In other words, a related art recording medium includes only UHD text data 1552 in a subtitle stream #2 1550 and UHD style data 1551. However, the recording medium 10 further includes HD style data 1553

The UHD text data 1552 includes a code value of a character such as letters or numbers constituting subtitles. Style data indicates a style in which a corresponding text is output. If the UHD display device 200 is connected to the reproducing device 100, the reproducing device 100 processes the UHD text data 1552 using the UHD style data 1551 to generate UHD subtitles. If the HD display device 300 is connected to the reproducing device 100, the reproducing device 100 processes the UHD text data 1552 using HD style data 1553 to generate HD subtitles.

An information structure illustrated in FIG. 34 may be used in a recording medium. In other words, if "is_Subtitle_for_HD_Viewing" has a value corresponding to "Yes", and a viewing environment is an HD viewing environment, the controller 130 of the reproducing device 100 uses the HD style data 1553 to generate subtitles. If not, the reproducing device 100 uses the UHD style data 1551 to generate subtitles.

Only a subtitle stream is illustrated in FIGS. 35A and 35B, but a menu stream may also be processed according to a similar method to the subtitle stream.

As described above, an operation and a detailed structure of a reproducing device that provides an object adjusting service according to various exemplary embodiments has been described. A method of processing a content in a reproducing device according to exemplary embodiments will now be briefly described with reference to flowcharts.

Figure 36:
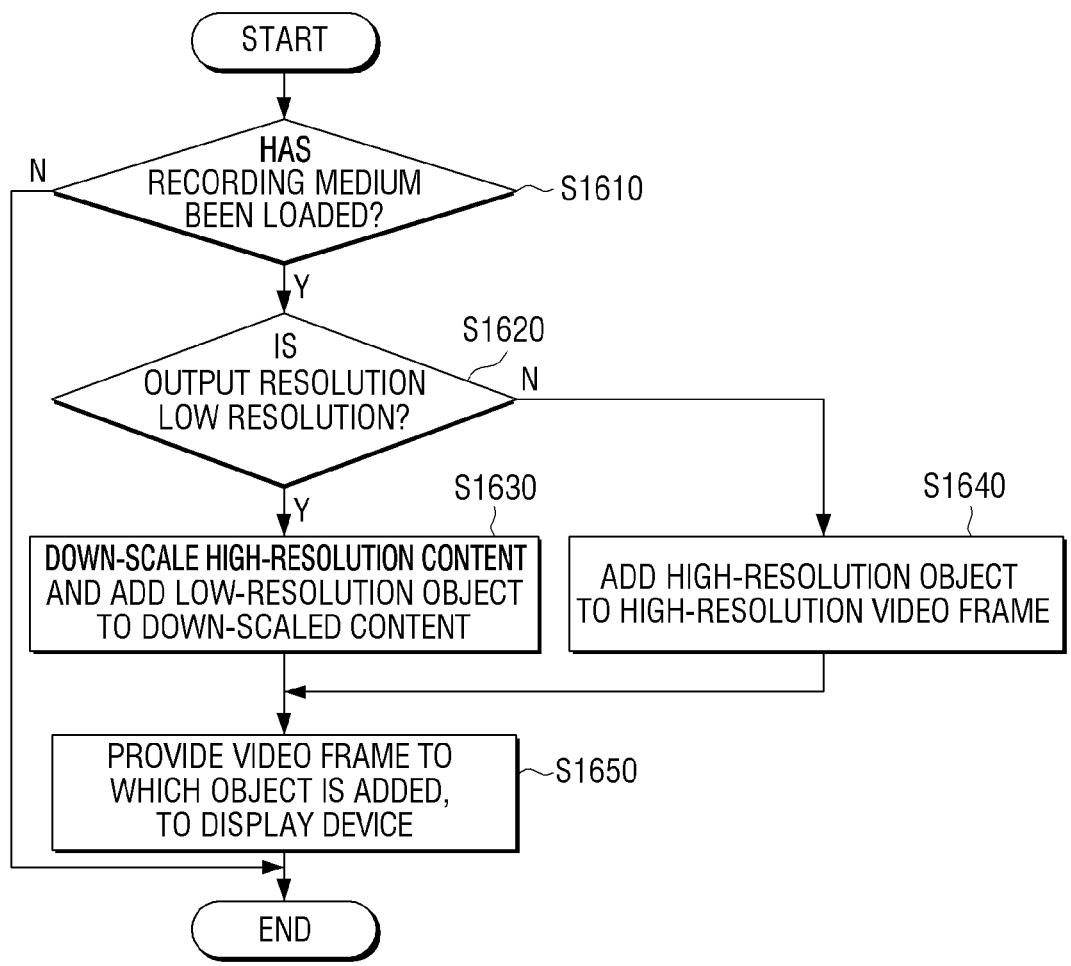
FIGS. 36 through 39 are flowcharts illustrating methods of providing an object adjusting service, according to various exemplary embodiments.

FIG. 36 is a flowchart illustrating a method of processing a content in a reproducing device that is realized as a reproducing device that performs reproduction with respect to a recording medium, according to an exemplary embodiment. Referring to FIG. 36, if a recording medium is attached in operation S1610, the reproducing device checks a viewing environment of a display device connected to the reproducing device to determine whether an output resolution is a low resolution in operation S1620.

If it is determined in operation S1620 that the viewing environment is the low resolution, the reproducing device scales down a high-resolution content and adds a low-resolution object to the high-resolution content that has been scaled down, in operation S1630. The low-resolution object may be acquired according to various methods described above. In operation S1650, the reproducing device provides a video frame, to which the low-resolution object has been added, to the display device.

If the output resolution is a high resolution matching content processing, the reproducing device adds the high-resolution object to a high-resolution video frame in operation S1640, and provides the high-resolution video frame to the display device in operation S1650.

As described above, subtitles or menus having forms matching with a resolution of the display device may be displayed. Thus, an identification may be improved.

As described above, a method of acquiring a low-resolution object may vary according to exemplary embodiments. An operation of generating a low-resolution object and mixing the low-resolution object with a video frame will now be described according to exemplary embodiments.

Figure 37:
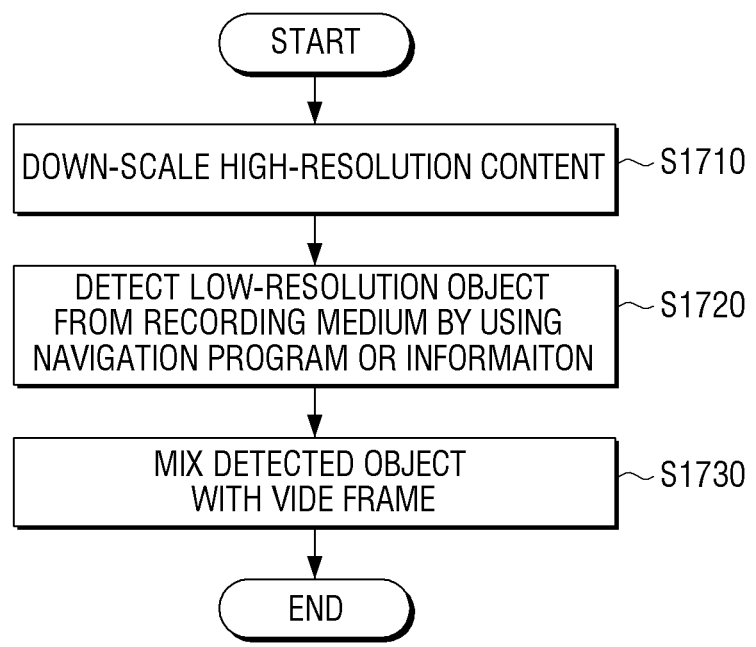

FIG. 37 is a flowchart illustrating a processing method for providing an object adjusting service according to an exemplary embodiment. Referring to FIG. 37, in operation S1710, a reproducing device demultiplexes a high-resolution content to detect video data, decodes the video data to generate a video stream, and scales the video stream to generate a video stream in a size that may be displayed in a low-resolution display device.

In operation S1720, the reproducing device detects a low-resolution object stored on a recording medium using a navigation program or navigation information stored on the recording medium. If the navigation program is used, the controller 130 of the reproducing device may load the navigation program into an RAM to execute the navigation program, and detect an object according to the navigation program. If the navigation information is used, the controller 130 analyzes the navigation information to check a position in which the low-resolution object is stored and reads an object from the position.

In operation S1730, the reproducing device mixes the detected low-resolution object with a video frame. A buffer, etc., may be used in a mixing process. In the above-described exemplary embodiments, descriptions of subsidiary elements are omitted.

Figure 38:
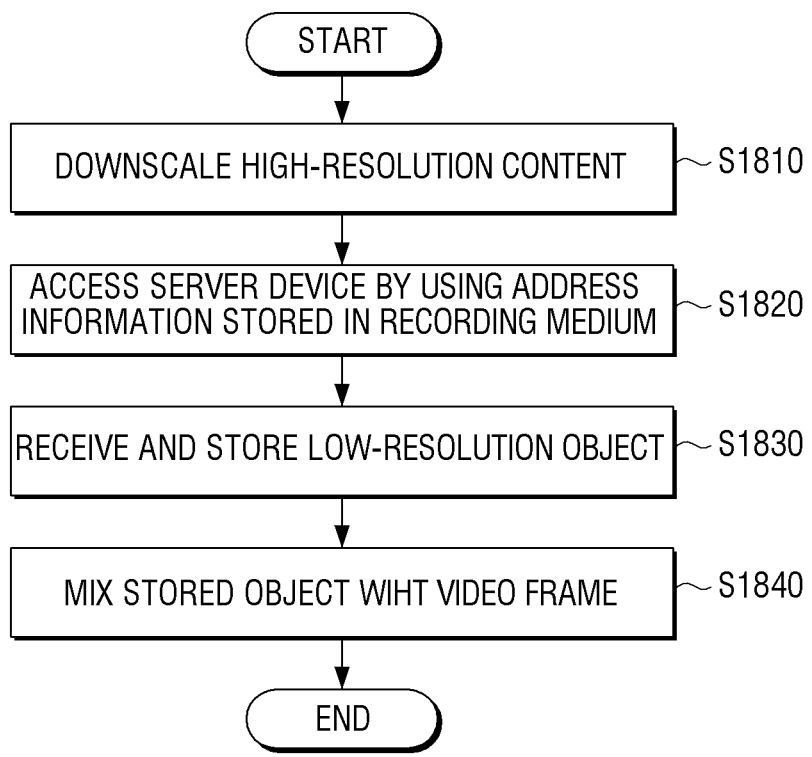

FIG. 38 is a flowchart illustrating a processing method for providing an object adjusting service according to another exemplary embodiment. Referring to FIG. 38, in operation S1810, the reproducing device scales down a video frame of a high-resolution content. In operation S1820, the reproducing accesses a server device using address information stored on a recording medium. The server device may transmit data about a low-resolution object corresponding to the high-resolution content. In operation S1830, the reproducing device receives and stores the transmitted low-resolution object. In operation S1840, the reproducing device detects an object stored at a time to display the object and mixes the object with the video frame.

Figure 39:
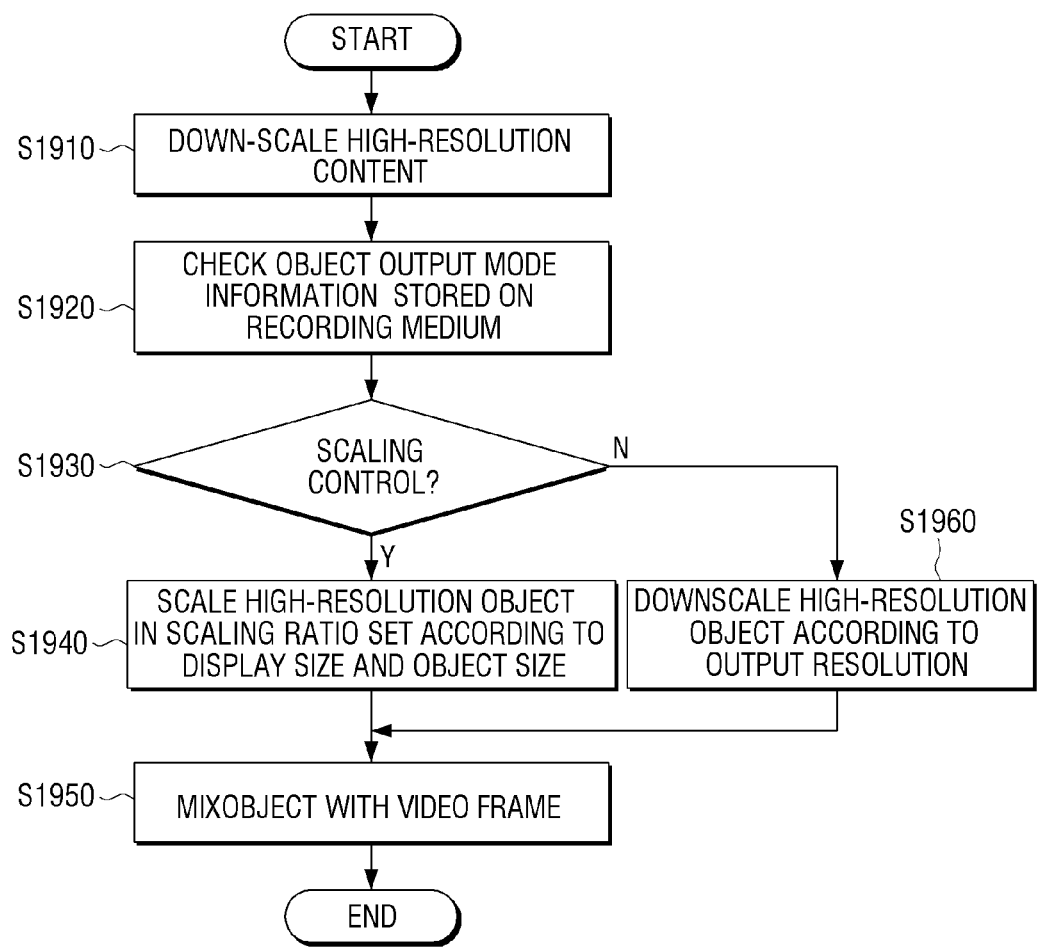

FIG. 39 is a flowchart illustrating a processing method for providing an object adjusting service according to another exemplary embodiment. Referring to FIG. 39, in operation S1910, the reproducing device scales down a video frame of a high-resolution content. In operation S1920, the reproducing device checks object output mode information stored on a recording medium. If a scaling control is allowed in operation S1930, the reproducing device scales a high-resolution object in a scaling ration that is set according to a display size and an object size, in operation S1940. A principle and a method for setting the scaling ratio have been described in detail with reference to FIGS. 32A and 32B. Thus, repeated descriptions are omitted. In operation S1950, the reproducing device mixes the scaled object with the video frame.

If the scaling control is not allowed in operation S1930, the reproducing device scales down a high-resolution object according to an output resolution in operation S1960. In this case, if a UHD content is connected to an HD display device, subtitles or menus may be scaled down in a ratio of about 1/4.

In FIGS. 37 through 39, processing of a video frame is performed prior to processing of an object. However, processing orders may be variously changed according to products.

For example, object processing may be first performed, and then video frame processing may be performed. Alternatively the object processing and the video frame processing may be performed in parallel. Also, in FIGS. 37 through 39, the low-resolution display device is connected. An operation performed when a high-resolution display device is connected has been described above. Thus, repeated description is omitted.

In the above-described exemplary embodiments, a structure and an operation of a reproducing device that performs reproducing with respect to a recording medium has been described. However, the reproducing device may be realized as a display device. For example, the reproducing device may be realized as a TV. In this case, a high-resolution content may not be played through a recording medium, but may be received through a broadcasting network.

Figure 40:
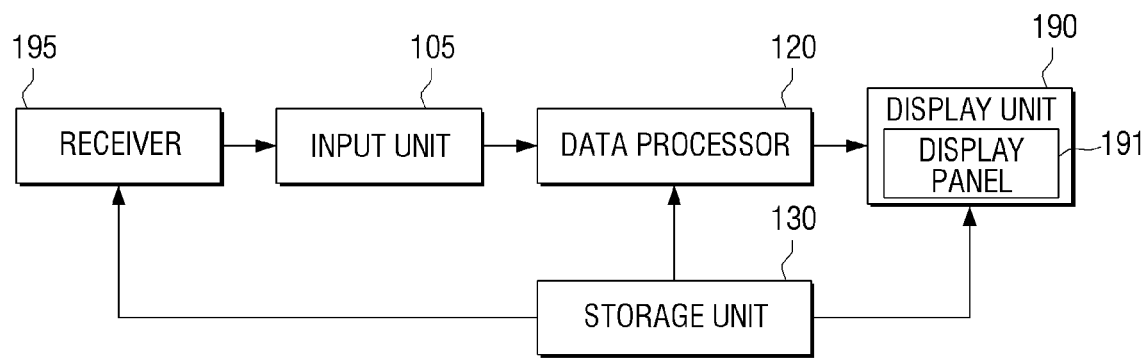
FIG. 40 is a block diagram illustrating a structure of a broadcasting receiving device for providing an object adjusting service, according to an exemplary embodiment.

FIG. 40 is a block diagram illustrating a structure of the reproducing device 100 that is realized as a display device, according to an exemplary embodiment. Referring to FIG. 40, the reproducing device includes an input unit 105, a data processor 120, a controller 130, a receiver 195, and a display unit 190.

The receiver 195 may have different structures according to a broadcasting communication standard that is used in a nation that uses the reproducing device. Currently, there are various types of digital broadcasting standards, such as ATSC, DVB, and ISDB-T methods, etc. If the ATSC standard is used, the receiver 195 may include an antenna, an RF down-converter, a demodulator, an equalizer, etc. The data processor 120 may include a demultiplexer, an RS decoder, a deinterleaver, etc. A detailed structure for transmitting and receiving a signal according to each broadcasting standard is disclosed in a standard document of each broadcasting standard. Thus, detailed illustration and description are omitted.

The receiver 195 receives a signal including a high-resolution content through a broadcasting network, and inputs the signal into the input unit 105.

The input unit 105 transmits the high-resolution content to the data processor 120.

The display unit 190 includes a display panel 191. Therefore, in the present exemplary embodiment, the controller 130 may immediately check a characteristic of a display panel of an external device, i.e., a viewing environment, using spec information recorded in an internal memory or a storage unit without checking the characteristic of the display panel.

If the display panel 191 is used for a low resolution, and it is determined that the high-resolution content has been received through the receiver 195, the controller 130 controls the data processor 120 to perform operations according to the above-described exemplary embodiments.

The display unit 190 displays a video frame, to which a low-resolution object has been added, through the display panel 191. The display unit 190 may further include a backlight unit or other driving circuits, besides the display panel 191. However, detailed illustration and description are omitted.

As shown in FIG. 40, a high-resolution content is provided through a broadcasting network, additional information may be recorded in various fields of a broadcasting signal and then transmitted. For example, a low-resolution object may be transmitted in an independent elementary stream (ES) form like a video stream, an audio stream, a high-resolution subtitle data, etc., and other types of information may be transmitted according to various methods such as a TVCT, an EIT, a PMT, a metadata stream, etc.

If the recording medium 10 is realized as a BD, data may be recorded in a form compatible with Blue-ray standards to provide such a service. These types of data may be recorded in various parts of the recording medium 10. A syntax of these types of data and a method of recording these types of data will now be described.

As described above, the recording medium 10 may be realized as a BD. As described above with reference to FIG. 10, the BD includes four layers such as an index table 1110, a movie object/BD-J object 1120, a playlist 1130, and a clip 1140.

An STN table is recorded in a playlist file. A value of ID1 and a value of ID2 of extension data of "ext_data_entry( )" may be respectively set to "0x000Y" and "0x000Z" in the playlist file to recognize the extension data as "STN_table_UHD( )". "STN_table_UHD( )" indicates that a UHD video exists in a playlist.

If a primer video of the playlist is an MPEG-2 video stream, an MPEG4 AVC stream, or a VC-1 video stream, "STN_table_UHD( )" may not exist in the playlist "STN_table_UHD" provides the following information:
   First information that defines a coded structure of a video sequence to perform a uniform trick play job on players.
   Second information that defines an interested region to conveniently view a UHD video in an HD viewing environment.
   Third information that changes a non-video visual content (i.e., subtitles, menus, etc.) to conveniently view the non-video visual content in an HD viewing environment.

In other words, the first information refers to information that is used in the above-described exemplary embodiments to provide a trick play. The second information refers to information that is used in the exemplary embodiments to provide an interested region enlargement service. The third information refers to information that is used in the exemplary embodiments to provide an object changing service.

FIG. 41 is a view illustrating a syntax of a table "STN_table_UHD" that provides the above-described various types of additional information, according to an exemplary embodiment.

Referring to FIG. 41, in the table "STN_table_UHD", video output mode information "video_output_mode" 4110, information "is_there_interesting_region" 1420 indicating whether an interested region exists, the number 4130 and numbers 4140 "Num_of_tiles_of_IR, Tile_num_of_IR [t_id]" of tiles corresponding to the interested region, information "Is_subtitle_for_HD_viewing_env" 4150 indicating whether subtitles are HD viewing subtitles, information 4160 "Is_IG_for_HD_viewing_env", etc., may be expressed as various bit values.

In FIG. 41, the table "STN_table_UHD( )" defines stream numbers of loops of pi_id values as follows:

Primary_video_stream_number[pi_id]
PG_textST_stream_number[pi_id]
IG_stream_number[pi_id]

"Primary_video_stream_number[pi_id]" may be calculated as "Primary_video_stream_id+1". Also, "PG_textST_stream_number[pi_id]" may be calculated as "PG_textST_stream_id+1", and "IG_stream_number [pi_id]" may be calculated as "IG_stream_id+1".

One PG TextST stream entry (i.e., an entry defined in the STN table) and a PG TextST stream related to an HD viewing environment have the same stream number value. Also, one IG stream entry (i.e., an entry defined in the STN table) and an IG stream related to the HD viewing environment have the same stream number value.

In FIG. 41, the video output mode information "video_output_mode" 4110 may be expressed as various bits like 0 or 1. If the video output mode information "video_output_mode" 4110 is 1, an interested region may be extracted and then output to a display device. The video output mode information "video_output_mode" 4110 is effective on a playlist. A horizontal display size of Player Status Registers 23 (PSR23) becomes a criterion to determine whether a current viewing environment is a UHD or HD viewing environment. The PSR23 are used for a profile 5 player and a profile ZZ player The information "Is_there_interesting_region" 4120 indicates whether the interested region exists. If the interested region exists in a frame of a play item, the information "Is_there_interesting_region" 4120 is recorded as 1

The number "Num_of_tiles_of_IR" 4130 is information indicating how many tiles exist in the interested region, and the numbers "Tile_num_of_IR[t_id]" 4140 is information indicating tile numbers in the interested region.

If the PG TextSt stream of "PG_textST_stream_id" is provided to be displayed in an HD viewing environment, the information "Is_subtitle_for_HD_viewing_env" 4150 may be set to 1. If the IG stream of "IG_stream_id" is provided to be displayed in the HD viewing environment, the information "Is_IG_for_HD_viewing_env" 4160 may be set to 1.

Various types of information as described above may be included in a clip information file recorded on a BD.

FIG. 42 is a view illustrating a syntax of "CPI_UHD( )" of a clip information file, according to an exemplary embodiment. In "ext_data_entry( )", values of ID1 and ID2 of extension data may be respectively set to "0x000x" and "0x000y" to identify the extension data as "CPI_UHD( )".

If a corresponding clip AV stream file includes an HEVC video stream, "CPI_UHD( )" may exist in "ExtensionData( )" of the clip information file. If not, any "CPI_UHD( )" may not exist in "ExtensionData( )" of the clip information file.

In FIG. 42, a length field includes 32 bits indicating the number of bytes from "CPI_UHD( )" right after the length field to last "CPI_UHD( )".

"CPI_type" may be set to 1 which indicates that a type of a CPI database (DB) is "EP_map_type"

"Number_of_frames_in_GOP" indicates the number of frames of a GOP. If a video sequence is a field format, a complementary field pair may be regarded as frames, and may be smaller than or equal to the maximum number of video frames displayed in the GOP. "Number_of_frames" may not be changed in one clip.

If a Br frame exists in the GOP, "is_Br_present" may be set to 1. If Br_present is set to 1, all GOPs in a sequence may have Br frames.

"Number_of_B_frames" indicates the number of B pictures between I and P frames, right before and after the I and P frames. This value may be greater than or equal to 1, or may be smaller than or equal to 3. "Number_of_B_frames" may not be changed in one clip "Padding_word" indicates zero or more parentheses that may be inserted according to a definition of "CPI_UHD( )". "N1" may be an arbitrary positive number corresponding to a 32-bit arrangement state of the above-described length field. "Padding_word" may have an arbitrary value.

FIG. 43 is a view illustrating a syntax of "EP_map_UHD( )" according to an exemplary embodiment. Referring to FIG. 43, the syntax of "EP_map_UHD( )" has information "Trick_play_info" and information "EP_map_for_UHD_trickplay_PID(EP_stream_type, Nf)", besides "EP_map( )" defined in existing Blue-ray standards.

FIG. 44 is a view illustrating a syntax of "EP_map_for_UHD_trickplay" according to an exemplary embodiment. In FIG. 44, a length field includes 32 bits indicating the total number of bits from a bit right after the length field to a last bit "Position_of_Br" indicates a position of a Br frame of consecutive Bs frames. Three consecutive Bs frames may exist. Thus, "Position_of_Br" may be one of 0, 1, and 2 respectively indicating first one, second one, and third one of consecutive B2 frames.

"Temporal_ids" indicates a temporal ID of an I or P frame. In an exemplary embodiment for performing a trick play as described above, a determination may be made as to which P picture may be skipped or which P picture may be read and decoded according to a play speed. "N_of_key_frames_in_GOP" may be calculated using Equation 1 below:

$$N\_of\_key\_frames\_in\_GOP = number\_of\_frames\_in\_GOP/(1 + number\_of\_B\_pictures)\ldots(1)$$

In equation 1 above, "number_of_frames_in_GOP" and "number_of_B_pictures" are defined in "CPI_UHD( )" For example, if a GOP includes 24 frames, and the number of consecutive B frames is 3, the number of key frames of one GOP is 6.

"Immediately_following_key_frame_offset" refers to an offset from an immediately preceding I or P frame according to a decoding order. Also, "key_frame_size" refers to a coding size of an I or P picture.

Figure 46:
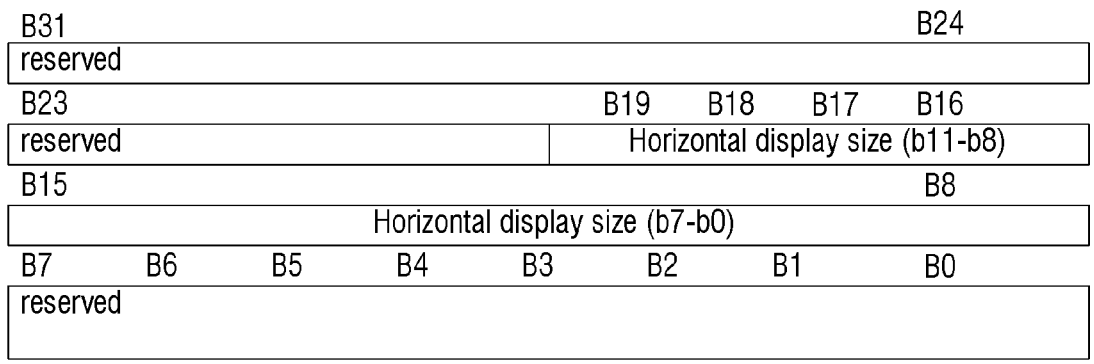

FIGS. 45 and 46 are views illustrating a player state register for UHD playing according to various exemplary embodiments.

FIG. 45 illustrates a structure of PSR21. The PSR21 includes HD portion output mode preference information. In FIG. 45, if the HD portion output mode preference information is 0b, a full HD frame is decoded and output. If the HD portion output mode preference information is 1b, an HD part of the UHD frame is decoded and output.

Only the HD portion output mode preference information is illustrated in FIG. 45, but output mode preference information may also be included according to another exemplary embodiment. If the output mode preference information is 0b, the output mode information indicates a 2D output mode. If the output mode preference information is 1b, the output mode preference information indicates a stereoscopic output mode.

FIG. 46 illustrates a structure of PSR23. The PSR23 indicates a characteristic value of a display connected to a BD-ROM player. Referring to FIG. 46, information, such as a horizontal display size, may be recorded in the PSR23. The horizontal display size is information that indicates a horizontal size of the connected display expressed in a centimeter unit. The horizontal display size may be recorded as various values such as "0x001" through "0xFFE) according to the horizontal size of the connected display. "0xFFE" indicates a horizontal length of 4094 cm. "0x000" is not defined, and "0xFFF" indicates a horizontal length greater than 255 cm.

If a display device does not provide a value through an interface, a BD-ROM player, i.e., the reproducing device 100 may automatically set a value thereof before starting playing. If the value is not automatically set, the value may be set by a user.

According to exemplary embodiments, only one of the above-described services may be provided in one reproducing device, but a plurality of services may be supported in one reproducing device. In this case, a service may be selectively provided according to a selection of a user. If a user command to select one of a trick play service, an interested region enlargement service, and an object adjusting service is input, the controller 130 of the reproducing device 100 detects additional information corresponding to the selected service.

As described above, if a recording medium is a BD that includes four layers such as an index table, a movie object/BD-J object, a playlist, and a clip, additional information may be recorded in at least one of a table "STN_table_UHD" included in a playlist file, and "CPI_UHD( )" and "EP_map_for_UHD_trickplay" recorded in a clip file. The additional information may also be provided in various forms.

The controller 130 may detect additional information corresponding to a service selected by the user from such additional information and provide a service using the detected additional information. A method of providing a service has been described in detail in the above-described exemplary embodiments. Thus, repeated description is omitted.

According to various exemplary embodiments as described above, data for providing various services may be recorded on a recording medium according to a preset structure. Also, a reproducing device may provide various services by using the data.

As described above, according to various exemplary embodiments, various types of services, such as a trick play service, an interested region enlargement service, an object adjusting service, etc., may be provided by using additional information stored on a recording medium.

Methods of providing a service according to the above-described exemplary embodiments may be respectively coded as software, and then recorded on a non-transitory computer-readable medium.

For example, if a recording medium that records video data encoded according to an HEVC method and additional information is attached, a service providing method may include: loading the recording medium, and providing a service corresponding to the additional information. The service may include at least one of a trick play service, an interested region enlargement service, and an object adjusting service.

The non-transitory computer-readable medium may be attached in various types of devices such as a reproducing device, a display device, etc. Therefore, the above-described services may be provided in the various types of devices.

The non-transitory computer-readable medium refers to a medium which does not store data for a short time such as a register, a cache memory, a memory, etc., but semi-permanently stores data and is readable by a device. The above-described applications or programs may be stored and provided on a non-transitory computer readable medium such as a CD, a DVD, a hard disk, a blue-ray disk, a universal serial bus (USB), a memory card, a ROM, etc.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims. Many alternatives, modifications, and variations will be apparent to those skilled in the art.

What is claimed is:

1. A reproducing device comprising:
   a driver configured to load a recording medium in response to the recording medium being attached, wherein the attached recording medium, recorded by the driver, has recorded upon it High Efficiency Video Coding (HEVC) data comprising video data and additional information encoded according to a HEVC method;
   a data processor configured to process the video data;
   a controller configured to provide a service according to the HEVC encoded additional information,
   wherein the service comprises at least one of a trick play service, an interested region enlargement service, and an object adjusting service
   wherein the object adjusting service for the HEVC data comprises a service which scales a size of an object displayed with the video data according to the HEVC encoded additional information.

2. The reproducing device of claim 1, wherein the recording medium is a blue-ray disc (BD) which is divided into four layers including an index table, an object/BD-J object, a playlist, and a clip file,
   wherein the additional information is recorded in at least one of a STN-table_UHD table comprised in the playlist, CPI_UHD( ) recorded in the clip file, and EP_map_for_UHD_trickplay recorded in the clip file.

3. The reproducing device of claim 1, wherein the controller is configured to selectively perform the at least one of the trick play service, the interested region enlargement service, and the object adjusting service according to a user selection.

4. The reproducing device of claim 1, wherein the service comprises the object adjusting service wherein:
   the video data is configured to be displayed, with subtitles, by an ultra-high definition (UHD) display,
   a display of the video data is scaled, by the object adjusting service, at a first ratio to be displayed by a high-definition (HD) display having a size smaller than the UHD display, and
   the object adjusting service scales the subtitles at the first ratio.

5. The reproducing device of claim 1, wherein the service comprises the object adjusting service wherein:
   the video data is configured to be displayed, with subtitles, by an ultra-high definition (UHD) display,
   a display of the video data is scaled, by the object adjusting service, at a first ratio to be displayed by a high-definition (HD) display having a size smaller than the UHD display, and
   the object adjusting service scales the subtitles at a second ratio which is less than the first ratio.

6. The reproducing device of claim 1, wherein the additional information includes a plurality of subtitle streams wherein at least a first subtitle stream is for an ultra-high definition (UHD) display and a second subtitle stream is a scaled version of the first subtitle stream to be displayed for a high definition (HD) display.

7. The reproducing device of claim 1, wherein the service comprises the interested region enlargement service which:
   extracts a rectangular tile from the video data, which is to be displayed by an ultra-high definition (UHD) display,
   scales the rectangular tile according to a size of a high definition (HD) display, and
   displays the extracted rectangular tile by the HD display which has a smaller size than the UHD display.

8. The reproducing device of claim 1, wherein the service comprises the interested region enlargement service which:
   extracts a rectangular tile from the video data, which is to be displayed by an ultra-high definition (UHD) display, such that the rectangular tile fits the size of a high definition (HD) display,
   crops any other tiles from the recorded video data, and
   displays the rectangular tile by the HD display having a smaller size than the UHD display.

9. The reproducing device of claim 1, wherein the service comprises the interested region enlargement service which uses the internet to access interesting region information to enlarge a tile corresponding to the interesting region information from the recorded video data such that only the tile is displayed.

10. The reproducing device of claim 1, wherein the service comprises the interested region enlargement service which uses the internet to access interesting region information to crop a plurality of tiles not corresponding to the interesting region information from the recorded video data such that only a tile, other than the plurality of tiles, of the video data is displayed.

11. The reproducing device of claim 1, wherein the additional information comprises information for all of the trick play service, the interested region enlargement service, and the object adjusting service, wherein
the object adjusting service is configured to scale a subtitle.

12. The reproducing device of claim 1, wherein the service comprises the trick play service and the additional information comprises:
structure information about a structure of a group of pictures (GOP),
HEVC information about temporal IDs determined according to different protocols with respect to each layer of a decoded picture buffer (DPB) respectively, and
offset information for determining a subsequent position that is to be decoded during the trick play service.

13. The reproducing device of claim 1, wherein the service comprises the object adjusting service and the additional information comprises:
address information about a network accessible server device configured to provide a low-resolution object to be displayed along with at least a portion of the video data.

14. The reproducing device of claim 1, wherein the object is a menu, and
wherein the service scales a size of the menu, displayed with the video data, at a different scaling ratio than a scaling ratio of the video data.

15. A method of providing a service, the method comprising:
loading a recording medium in response to the recording medium being attached, wherein the attached recording medium, recorded by a driver, has recorded upon it High Efficiency Video Coding (HEVC) data comprising video data and additional information encoded according to a HEVC method;
providing a service according to the HEVC encoded additional information,
wherein the service comprises at least one of a trick play service, an interested region enlargement service, and an object adjusting service,
wherein the object adjusting service for the HEVC data comprises a service which scales a size of an object displayed with the video data according to the HEVC encoded additional information.

16. The method of claim 15, wherein the recording medium is a blue-ray disc (BD) which is divided into four layers including an index table, an object/BD-J object, a playlist, and a clip file,
wherein the additional information is recorded in at least one of a STN-table_UHD table comprised in the playlist, CPI_UHD( ) recorded in the clip file, and EP_map_for_UHD_trickplay recorded in the clip file.

17. The method of claim 15, further comprising:
detecting additional information corresponding to a selected service from the recording medium in response to the at least one of the trick play service, the interested region enlargement service, and the object adjusting service being selected according to a user selection.

* * * * *